US007206700B2

(12) United States Patent
Neacsu et al.

(10) Patent No.: US 7,206,700 B2
(45) Date of Patent: Apr. 17, 2007

(54) METHOD AND MACHINE FOR IDENTIFYING A CHEMICAL COMPOUND

(75) Inventors: Florin Aniel Neacsu, Spokane, WA (US); David Eugene Pennington, Waco, TX (US)

(73) Assignee: Baylor University, Waco, TX (US)

( * ) Notice: Subject to any disclaimer, the term of this patent is extended or adjusted under 35 U.S.C. 154(b) by 0 days.

(21) Appl. No.: 11/188,594

(22) Filed: Jul. 25, 2005

(65) Prior Publication Data

US 2006/0085141 A1 Apr. 20, 2006

Related U.S. Application Data

(60) Provisional application No. 60/590,790, filed on Jul. 23, 2004.

(51) Int. Cl.
*G01N 31/00* (2006.01)

(52) U.S. Cl. ........................................................ 702/23

(58) Field of Classification Search ................... 702/23
See application file for complete search history.

(56) References Cited

U.S. PATENT DOCUMENTS 2,769,910 A 11/1956 Elings
2,818,507 A 12/1957 Britten
2,939,952 A 6/1960 Paul et al.
2,950,389 A 8/1960 Paul et al.
3,334,255 A 8/1967 Langmuir
5,089,702 A 2/1992 Allemann et al.
6,906,320 B2 * 6/2005 Sachs et al. ................ 250/282
2003/0236634 A1 * 12/2003 Yoshinari et al. ............. 702/23

OTHER PUBLICATIONS

Lange's Handbook Of Chemistry; Dean, J. A. Ed.; McGraw-Hill, 1985.Chapter 3, pp. 16-117.
Wentzel, E.; Ovcharov, L.; *Applied Problems In Probability Theory*; Mir: Moscow, 1986; pp. 30-31.
Reid, C. E.; *Chemical Thermodynamics*; McGraw-Hill; 1990; p. 278.
Davis, C. M.; Royer, A. C.; Vincent, J. B.; *Inorg. Chem.* 1997, 36, 5316-5320.
Pavia, D. L.; Lampman, G. M.; Kriz, G. S.; *Introduction To Spectroscopy—A Guide For Students Of Organic Chemistry*; Saunders College Publishing, 1996; Chapter 7.4, p. 310-313.
Platzner, I. T.; Habfart, K.; Walder, A. J.; Goetz, A.; *Modern Isotope Ratio Mass Spectrometry*; Wiley, 1997; p. 450.

(Continued)

*Primary Examiner*—John Barlow
*Assistant Examiner*—Jonathan Moffat
(74) *Attorney, Agent, or Firm*—Jackson Walker L.L.P.

(57) ABSTRACT

The present invention is designed to efficiently calculate isotopic distribution in order to simulate mass spectra data for any chemical compound of interest. The simulated spectra considers the various isotopes of the compound based upon a probability calculation that takes into consideration the natural abundance of each isotope of individual elements of the compound. The probability calculation generates a relative probability associated with each isotope species of the subject compound. The simulated spectra are displayed on an x-y coordinate illustrating the calculated formula weight on the abscissa (x-axis) and the intensity of the specific species on the ordinate (y-axis). This theoretical data is then compared to experimental data taken from a mass spectrometer in order to identify the chemical compound at issue.

12 Claims, 7 Drawing Sheets

OTHER PUBLICATIONS

Davis, R.; Frearson, M.; *Mass Spectrometry*; Wiley, 1987; p. 155.
Mullica, D. F.; Pennington, D. E.; Bradshaw, J. E.; Sappenfield, E. L.; *Inorg. Chim. Acta* 1992, 191, 3-6.
Genty, C.; *Anal. Chem.* 1973, 45, 505-511.
Brownawell, M.L.; San Filippo, J.; *J. Chem. Educ.* 1982, 59, 663-665.
Rockwood, A. L.; Van Orden, S. L.; Smith, R. D.; *Anal. Chem.* 1995, 67, 2699-2704.
Rockwood, A. L.; Van Orden, S. L.; *Anal. Chem.* 1996, 68, 2027-2030.
Frevel, L. K.; Lee, W.-L.; Tecklenburg, R. E.; *J. Am. Soc. Mass Spectrom.* 1999, 10, 231-240.
Florin Neacsu; *Investigations Of Di—And Trinuclear Amino Acid Complexes Of Chromium* (*III*), Ph. D. Thesis, Baylor University, Waco, Texas, U. S. A., 2000.

* cited by examiner

| | H-1 | H-2 | C-12 | C-13 | N-14 | N-15 | O-16 | O-17 | O-18 | Cr-50 | Cr-52 | Cr-53 | Cr-54 |
|---|---|---|---|---|---|---|---|---|---|---|---|---|---|
| 1 | 24 | 0 | 12 | 0 | 6 | 0 | 13 | 0 | 0 | 0 | 3 | 0 | 0 |
| 2 | 24 | 0 | 12 | 0 | 6 | 0 | 13 | 0 | 0 | 0 | 2 | 1 | 0 |
| 3 | 24 | 0 | 12 | 0 | 6 | 0 | 13 | 0 | 0 | 1 | 2 | 0 | 0 |
| 4 | 24 | 0 | 11 | 1 | 6 | 0 | 13 | 0 | 0 | 0 | 3 | 0 | 0 |
| 5 | 24 | 0 | 12 | 0 | 6 | 0 | 13 | 0 | 0 | 0 | 2 | 0 | 1 |
| 6 | 24 | 0 | 11 | 1 | 6 | 0 | 13 | 0 | 0 | 0 | 2 | 1 | 0 |
| 7 | 24 | 0 | 12 | 0 | 6 | 0 | 13 | 0 | 0 | 0 | 1 | 2 | 0 |
| 8 | 24 | 0 | 12 | 0 | 6 | 0 | 13 | 0 | 0 | 1 | 1 | 1 | 0 |
| 9 | 24 | 0 | 12 | 0 | 6 | 0 | 12 | 0 | 1 | 0 | 3 | 0 | 0 |
| 10 | 24 | 0 | 12 | 0 | 5 | 1 | 13 | 0 | 0 | 0 | 3 | 0 | 0 |
| 11 | 24 | 0 | 11 | 1 | 6 | 0 | 13 | 0 | 0 | 1 | 2 | 0 | 0 |
| 12 | 24 | 0 | 12 | 0 | 6 | 0 | 13 | 0 | 0 | 0 | 1 | 1 | 1 |
| 13 | 24 | 0 | 11 | 1 | 6 | 0 | 13 | 0 | 0 | 0 | 2 | 0 | 1 |
| 14 | 24 | 0 | 12 | 0 | 6 | 0 | 12 | 0 | 1 | 0 | 2 | 1 | 0 |
| 15 | 24 | 0 | 12 | 0 | 6 | 0 | 13 | 0 | 0 | 1 | 1 | 0 | 1 |
| 16 | 24 | 0 | 10 | 2 | 6 | 0 | 13 | 0 | 0 | 0 | 3 | 0 | 0 |
| 17 | 24 | 0 | 12 | 0 | 6 | 0 | 13 | 0 | 0 | 2 | 1 | 0 | 0 |
| 18 | 24 | 0 | 12 | 0 | 5 | 1 | 13 | 0 | 0 | 0 | 2 | 1 | 0 |
| 19 | 24 | 0 | 11 | 1 | 6 | 0 | 13 | 0 | 0 | 0 | 1 | 2 | 0 |
| 20 | 24 | 0 | 12 | 0 | 6 | 0 | 12 | 1 | 0 | 0 | 3 | 0 | 0 |
| 21 | 24 | 0 | 11 | 1 | 6 | 0 | 13 | 0 | 0 | 1 | 1 | 1 | 0 |
| 22 | 24 | 0 | 12 | 0 | 6 | 0 | 12 | 0 | 1 | 1 | 2 | 0 | 0 |
| 23 | 23 | 1 | 12 | 0 | 6 | 0 | 13 | 0 | 0 | 0 | 3 | 0 | 0 |
| 24 | 24 | 0 | 11 | 1 | 6 | 0 | 12 | 0 | 1 | 0 | 3 | 0 | 0 |
| 25 | 24 | 0 | 12 | 0 | 5 | 1 | 13 | 0 | 0 | 1 | 2 | 0 | 0 |
| 26 | 24 | 0 | 11 | 1 | 5 | 1 | 13 | 0 | 0 | 0 | 3 | 0 | 0 |
| 27 | 24 | 0 | 10 | 2 | 6 | 0 | 13 | 0 | 0 | 0 | 2 | 1 | 0 |
| 28 | 24 | 0 | 11 | 1 | 6 | 0 | 13 | 0 | 0 | 0 | 1 | 1 | 1 |
| 29 | 24 | 0 | 12 | 0 | 6 | 0 | 13 | 0 | 0 | 0 | 1 | 0 | 2 |
| 30 | 24 | 0 | 12 | 0 | 6 | 0 | 12 | 0 | 1 | 0 | 2 | 0 | 1 |
| 31 | 24 | 0 | 12 | 0 | 6 | 0 | 13 | 0 | 0 | 1 | 0 | 2 | 0 |
| 32 | 24 | 0 | 12 | 0 | 5 | 1 | 13 | 0 | 0 | 0 | 2 | 0 | 1 |
| 33 | 24 | 0 | 12 | 0 | 6 | 0 | 12 | 1 | 0 | 0 | 2 | 1 | 0 |
| 34 | 24 | 0 | 12 | 0 | 6 | 0 | 13 | 0 | 0 | 0 | 0 | 3 | 0 |
| 35 | 24 | 0 | 10 | 2 | 6 | 0 | 13 | 0 | 0 | 1 | 2 | 0 | 0 |
| 36 | 23 | 1 | 12 | 0 | 6 | 0 | 13 | 0 | 0 | 0 | 2 | 1 | 0 |
| 37 | 24 | 0 | 11 | 1 | 6 | 0 | 12 | 0 | 1 | 0 | 2 | 1 | 0 |
| 38 | 24 | 0 | 11 | 1 | 6 | 0 | 13 | 0 | 0 | 1 | 1 | 0 | 1 |
| 39 | 24 | 0 | 12 | 0 | 6 | 0 | 13 | 0 | 0 | 0 | 0 | 2 | 1 |
| 40 | 24 | 0 | 11 | 1 | 6 | 0 | 13 | 0 | 0 | 2 | 1 | 0 | 0 |
| 41 | 24 | 0 | 12 | 0 | 6 | 0 | 12 | 0 | 1 | 0 | 1 | 2 | 0 |
| 42 | 24 | 0 | 11 | 1 | 5 | 1 | 13 | 0 | 0 | 0 | 2 | 1 | 0 |
| 43 | 24 | 0 | 12 | 0 | 6 | 0 | 13 | 0 | 0 | 1 | 0 | 1 | 1 |
| 44 | 24 | 0 | 12 | 0 | 6 | 0 | 12 | 0 | 1 | 1 | 1 | 1 | 0 |
| 45 | 24 | 0 | 12 | 0 | 6 | 0 | 13 | 0 | 0 | 2 | 0 | 1 | 0 |
| 46 | 24 | 0 | 12 | 0 | 5 | 1 | 13 | 0 | 0 | 0 | 1 | 2 | 0 |
| 47 | 24 | 0 | 12 | 0 | 5 | 1 | 13 | 0 | 0 | 1 | 1 | 1 | 0 |
| 48 | 24 | 0 | 12 | 0 | 6 | 0 | 12 | 1 | 0 | 1 | 2 | 0 | 0 |
| 49 | 24 | 0 | 10 | 2 | 6 | 0 | 13 | 0 | 0 | 0 | 2 | 0 | 1 |
| 50 | 24 | 0 | 11 | 1 | 6 | 0 | 12 | 1 | 0 | 0 | 3 | 0 | 0 |
| 51 | 24 | 0 | 12 | 0 | 5 | 1 | 12 | 0 | 1 | 0 | 3 | 0 | 0 |
| 52 | 23 | 1 | 12 | 0 | 6 | 0 | 13 | 0 | 0 | 1 | 2 | 0 | 0 |
| 53 | 24 | 0 | 11 | 1 | 6 | 0 | 12 | 0 | 1 | 1 | 2 | 0 | 0 |
| 54 | 24 | 0 | 12 | 0 | 6 | 0 | 12 | 0 | 1 | 0 | 1 | 1 | 1 |
| 55 | 23 | 1 | 11 | 1 | 6 | 0 | 13 | 0 | 0 | 0 | 3 | 0 | 0 |
| 56 | 24 | 0 | 11 | 1 | 5 | 1 | 13 | 0 | 0 | 1 | 2 | 0 | 0 |
| 57 | 24 | 0 | 12 | 0 | 5 | 1 | 13 | 0 | 0 | 0 | 1 | 1 | 1 |
| 58 | 24 | 0 | 12 | 0 | 6 | 0 | 12 | 1 | 0 | 0 | 2 | 0 | 1 |
| 59 | 24 | 0 | 12 | 0 | 6 | 0 | 11 | 0 | 2 | 0 | 3 | 0 | 0 |
| 60 | 24 | 0 | 11 | 1 | 6 | 0 | 13 | 0 | 0 | 0 | 1 | 0 | 2 |
| 61 | 24 | 0 | 10 | 2 | 6 | 0 | 13 | 0 | 0 | 0 | 1 | 2 | 0 |
| 62 | 24 | 0 | 9 | 3 | 6 | 0 | 13 | 0 | 0 | 0 | 3 | 0 | 0 |
| 63 | 23 | 1 | 12 | 0 | 6 | 0 | 13 | 0 | 0 | 0 | 2 | 0 | 1 |
| 64 | 24 | 0 | 11 | 1 | 6 | 0 | 12 | 0 | 1 | 0 | 2 | 0 | 1 |
| 65 | 24 | 0 | 10 | 2 | 6 | 0 | 13 | 0 | 0 | 1 | 1 | 1 | 0 |
| 66 | 24 | 0 | 12 | 0 | 6 | 0 | 13 | 0 | 0 | 0 | 0 | 1 | 2 |
| 67 | 24 | 0 | 11 | 1 | 6 | 0 | 13 | 0 | 0 | 1 | 0 | 2 | 0 |
| 68 | 24 | 0 | 11 | 1 | 5 | 1 | 13 | 0 | 0 | 0 | 2 | 0 | 1 |
| 69 | 24 | 0 | 12 | 0 | 6 | 0 | 12 | 0 | 1 | 1 | 1 | 0 | 1 |
| 70 | 24 | 0 | 12 | 0 | 6 | 0 | 13 | 0 | 0 | 2 | 0 | 0 | 1 |
| 71 | 24 | 0 | 11 | 1 | 6 | 0 | 12 | 1 | 0 | 0 | 2 | 1 | 0 |
| 72 | 24 | 0 | 10 | 2 | 6 | 0 | 12 | 0 | 1 | 0 | 3 | 0 | 0 |
| 73 | 24 | 0 | 12 | 0 | 6 | 0 | 12 | 0 | 1 | 2 | 1 | 0 | 0 |

Figure 5A

| | M/z | p | ps | pres |
|---|---|---|---|---|
| 1 | 615.961678 | 0.4857 | 100.00 | 0.5143 |
| 2 | 616.961818 | 0.1661 | 34.20 | 0.3482 |
| 3 | 613.967219 | 0.0750 | 15.44 | 0.2733 |
| 4 | 616.965032 | 0.0653 | 13.44 | 0.2080 |
| 5 | 617.960046 | 0.0414 | 8.52 | 0.1666 |
| 6 | 617.965172 | 0.0223 | 4.60 | 0.1442 |
| 7 | 617.961958 | 0.0189 | 3.90 | 0.1253 |
| 8 | 614.967359 | 0.0171 | 3.52 | 0.1082 |
| 9 | 617.965923 | 0.0129 | 2.66 | 0.0953 |
| 10 | 616.958712 | 0.0107 | 2.20 | 0.0846 |
| 11 | 614.970573 | 0.0101 | 2.08 | 0.0745 |
| 12 | 618.960186 | 0.0094 | 1.94 | 0.0651 |
| 13 | 618.9634 | 0.0056 | 1.15 | 0.0595 |
| 14 | 618.966063 | 0.0044 | 0.91 | 0.0551 |
| 15 | 615.965587 | 0.0043 | 0.88 | 0.0508 |
| 16 | 617.968386 | 0.0040 | 0.83 | 0.0468 |
| 17 | 611.97276 | 0.0039 | 0.79 | 0.0430 |
| 18 | 617.958852 | 0.0037 | 0.75 | 0.0393 |
| 19 | 618.965312 | 0.0025 | 0.52 | 0.0368 |
| 20 | 616.965896 | 0.0023 | 0.48 | 0.0344 |
| 21 | 615.970713 | 0.0023 | 0.47 | 0.0321 |
| 22 | 615.971464 | 0.0020 | 0.41 | 0.0301 |
| 23 | 616.967955 | 0.0017 | 0.36 | 0.0284 |
| 24 | 618.969277 | 0.0017 | 0.36 | 0.0266 |
| 25 | 614.964253 | 0.0016 | 0.34 | 0.0250 |
| 26 | 617.962066 | 0.0014 | 0.30 | 0.0236 |
| 27 | 618.968526 | 0.0014 | 0.28 | 0.0222 |
| 28 | 619.96354 | 0.0013 | 0.26 | 0.0209 |
| 29 | 619.958414 | 0.0012 | 0.24 | 0.0197 |
| 30 | 619.964291 | 0.0011 | 0.23 | 0.0186 |
| 31 | 615.967499 | 0.0010 | 0.20 | 0.0177 |
| 32 | 618.95708 | 0.0009 | 0.19 | 0.0168 |
| 33 | 617.966036 | 0.0008 | 0.16 | 0.0160 |
| 34 | 618.962098 | 0.0007 | 0.15 | 0.0152 |
| 35 | 615.973927 | 0.0006 | 0.13 | 0.0146 |
| 36 | 617.968095 | 0.0006 | 0.12 | 0.0140 |
| 37 | 619.969417 | 0.0006 | 0.12 | 0.0134 |
| 38 | 616.968941 | 0.0006 | 0.12 | 0.0128 |
| 39 | 619.960326 | 0.0005 | 0.11 | 0.0123 |
| 40 | 612.976114 | 0.0005 | 0.11 | 0.0118 |
| 41 | 619.966203 | 0.0005 | 0.10 | 0.0113 |
| 42 | 618.962206 | 0.0005 | 0.10 | 0.0108 |
| 43 | 616.965727 | 0.0005 | 0.10 | 0.0103 |
| 44 | 616.971604 | 0.0005 | 0.09 | 0.0099 |
| 45 | 612.9729 | 0.0004 | 0.09 | 0.0094 |
| 46 | 618.958992 | 0.0004 | 0.09 | 0.0090 |
| 47 | 615.964393 | 0.0004 | 0.08 | 0.0086 |
| 48 | 614.971437 | 0.0004 | 0.07 | 0.0083 |
| 49 | 619.966754 | 0.0003 | 0.07 | 0.0079 |
| 50 | 617.96925 | 0.0003 | 0.06 | 0.0076 |
| 51 | 618.962957 | 0.0003 | 0.06 | 0.0073 |
| 52 | 614.973496 | 0.0003 | 0.06 | 0.0071 |
| 53 | 616.974818 | 0.0003 | 0.06 | 0.0068 |
| 54 | 620.964431 | 0.0003 | 0.05 | 0.0065 |
| 55 | 617.971309 | 0.0002 | 0.05 | 0.0063 |
| 56 | 615.967607 | 0.0002 | 0.05 | 0.0061 |
| 57 | 619.95722 | 0.0002 | 0.04 | 0.0059 |
| 58 | 618.964264 | 0.0002 | 0.04 | 0.0057 |
| 59 | 619.970168 | 0.0002 | 0.03 | 0.0055 |
| 60 | 620.961768 | 0.0002 | 0.03 | 0.0054 |
| 61 | 619.968666 | 0.0002 | 0.03 | 0.0052 |
| 62 | 618.97174 | 0.0002 | 0.03 | 0.0050 |
| 63 | 618.966323 | 0.0001 | 0.03 | 0.0049 |
| 64 | 620.967645 | 0.0001 | 0.03 | 0.0047 |
| 65 | 616.974067 | 0.0001 | 0.03 | 0.0046 |
| 66 | 620.958554 | 0.0001 | 0.03 | 0.0045 |
| 67 | 616.970853 | 0.0001 | 0.03 | 0.0043 |
| 68 | 619.960434 | 0.0001 | 0.03 | 0.0042 |
| 69 | 617.969832 | 0.0001 | 0.02 | 0.0041 |
| 70 | 613.971128 | 0.0001 | 0.02 | 0.0040 |
| 71 | 618.96939 | 0.0001 | 0.02 | 0.0039 |
| 72 | 619.972631 | 0.0001 | 0.02 | 0.0038 |
| 73 | 613.977005 | 0.0001 | 0.02 | 0.0037 |

Figure 5 B

| | M/z | p | ps | pres |
|---|---|---|---|---|
| 1 | 615.961678 | 0.485656 | 100. | 0.514344 |
| 2 | 616.961818 | 0.166118 | 34.2049 | 0.348226 |
| 3 | 613.967219 | 0.0749706 | 15.437 | 0.273255 |
| 4 | 616.965032 | 0.0652963 | 13.445 | 0.207959 |
| 5 | 617.960046 | 0.0413991 | 8.52436 | 0.16656 |
| 6 | 617.965172 | 0.0223345 | 4.59883 | 0.144225 |
| 7 | 617.961958 | 0.0189402 | 3.89991 | 0.125285 |
| 8 | 614.967359 | 0.0170957 | 3.52013 | 0.108189 |
| 9 | 617.965923 | 0.0129107 | 2.65841 | 0.0952784 |
| 10 | 616.958712 | 0.0106748 | 2.19802 | 0.0846036 |
| 11 | 614.970573 | 0.0100798 | 2.0755 | 0.0745238 |
| 12 | 618.960186 | 0.00944033 | 1.94383 | 0.0650835 |
| 13 | 618.9634 | 0.00556609 | 1.1461 | 0.0595174 |
| 14 | 618.966063 | 0.0044161 | 0.909305 | 0.0551013 |
| 15 | 615.965587 | 0.00426051 | 0.877268 | 0.0508408 |
| 16 | 617.968386 | 0.00402374 | 0.828516 | 0.0468171 |
| 17 | 611.97276 | 0.00385773 | 0.794333 | 0.0429593 |
| 18 | 617.958852 | 0.00365131 | 0.751831 | 0.039308 |
| 19 | 618.965312 | 0.0025465 | 0.524342 | 0.0367615 |
| 20 | 616.965896 | 0.00234165 | 0.482162 | 0.0344199 |
| 21 | 615.970713 | 0.00229852 | 0.47328 | 0.0321214 |
| 22 | 615.971464 | 0.00199302 | 0.410377 | 0.0301283 |
| 23 | 616.967955 | 0.00174863 | 0.360054 | 0.0283797 |
| 24 | 618.969277 | 0.00173584 | 0.357422 | 0.0266439 |
| 25 | 614.964253 | 0.00164787 | 0.339308 | 0.024996 |
| 26 | 617.962066 | 0.00143523 | 0.295524 | 0.0235608 |
| 27 | 618.968526 | 0.00137632 | 0.283393 | 0.0221845 |
| 28 | 619.96354 | 0.00126925 | 0.261347 | 0.0209152 |
| 29 | 619.958414 | 0.00117633 | 0.242215 | 0.0197389 |
| 30 | 619.964291 | 0.00110056 | 0.226612 | 0.0186383 |
| 31 | 615.967499 | 0.000974595 | 0.200676 | 0.0176637 |
| 32 | 618.95708 | 0.000909961 | 0.187367 | 0.0167538 |
| 33 | 617.966036 | 0.000800958 | 0.164923 | 0.0159528 |
| 34 | 618.962098 | 0.000719829 | 0.148218 | 0.015233 |
| 35 | 615.973927 | 0.000621144 | 0.127898 | 0.0146118 |
| 36 | 617.968095 | 0.000598115 | 0.123156 | 0.0140137 |
| 37 | 619.969417 | 0.000593743 | 0.122256 | 0.01342 |

| | M/z | p | ps | pres |
|---|---|---|---|---|
| 38 | 616.968941 | 0.000572824 | 0.117948 | 0.0128471 |
| 39 | 619.960326 | 0.000538176 | 0.110814 | 0.012309 |
| 40 | 612.976114 | 0.00051867 | 0.106798 | 0.0117903 |
| 41 | 619.966203 | 0.000503507 | 0.103675 | 0.0112868 |
| 42 | 618.962206 | 0.000490918 | 0.101083 | 0.0107959 |
| 43 | 616.965727 | 0.000485767 | 0.100023 | 0.0103101 |
| 44 | 616.971604 | 0.000454474 | 0.0935793 | 0.00985563 |
| 45 | 612.9729 | 0.000439844 | 0.0905668 | 0.00941579 |
| 46 | 618.958992 | 0.000416309 | 0.0857209 | 0.00899948 |
| 47 | 615.964393 | 0.000375768 | 0.0773732 | 0.00862371 |
| 48 | 614.971437 | 0.00036148 | 0.0744312 | 0.00826223 |
| 49 | 619.966754 | 0.000342998 | 0.0706257 | 0.00791923 |
| 50 | 617.96925 | 0.000314834 | 0.0648265 | 0.0076044 |
| 51 | 618.962957 | 0.000283781 | 0.0584324 | 0.00732062 |
| 52 | 614.973496 | 0.000269935 | 0.0555814 | 0.00705068 |
| 53 | 616.974818 | 0.000267961 | 0.0551751 | 0.00678272 |
| 54 | 620.964431 | 0.000250962 | 0.0516749 | 0.00653176 |
| 55 | 617.971309 | 0.000235102 | 0.0484092 | 0.00629666 |
| 56 | 615.967607 | 0.000221556 | 0.0456199 | 0.0060751 |
| 57 | 619.95722 | 0.000207501 | 0.0427258 | 0.0058676 |
| 58 | 618.964264 | 0.000199611 | 0.0411012 | 0.00566799 |
| 59 | 619.970168 | 0.000158409 | 0.0326175 | 0.00550958 |
| 60 | 620.961768 | 0.000158158 | 0.0325658 | 0.00535142 |
| 61 | 619.968666 | 0.000156922 | 0.0323114 | 0.0051945 |
| 62 | 618.97174 | 0.000150275 | 0.0309427 | 0.00504423 |
| 63 | 618.966323 | 0.000149059 | 0.0306923 | 0.00489517 |
| 64 | 620.967645 | 0.000147969 | 0.0304679 | 0.0047472 |
| 65 | 616.974067 | 0.000141641 | 0.0291648 | 0.00460556 |
| 66 | 620.958554 | 0.000134121 | 0.0276165 | 0.00447144 |
| 67 | 616.970853 | 0.000131034 | 0.0269808 | 0.0043404 |
| 68 | 619.960434 | 0.000122344 | 0.0251915 | 0.00421806 |
| 69 | 617.969832 | 0.000113262 | 0.0233213 | 0.0041048 |
| 70 | 613.971128 | 0.000109615 | 0.0225706 | 0.00399518 |
| 71 | 618.96939 | 0.000107689 | 0.0221738 | 0.00388749 |
| 72 | 619.972631 | 0.000106967 | 0.0220253 | 0.00378052 |
| 73 | 613.977005 | 0.000102554 | 0.0211166 | 0.00367797 |

Figure 5C

METHOD AND MACHINE FOR IDENTIFYING A CHEMICAL COMPOUND

RELATED APPLICATIONS

This application claims priority to U.S. Provisional Patent Application Ser. No. 60/590,790 entitled "Method and System for Identifying a Chemical Compound," filed on Jul. 23, 2004, having Florin Aniel Neacsu and David Eugene Pennington listed as the inventors, the entire content of which is hereby incorporated by reference.

REFERENCE TO COMPUTER PROGRAM LISTING

Computer files 1.nb and FB.nb, and provided herein on compact disk (CD-R) are incorporated herein by reference. Replacement Copy 1 and Replacement Copy 2 of the compact disks are identical. These files comprise Mathematica Notebook files. Notebook files are electronic documents that combine text, typeset equations, graphics, and sounds in a single platform-independent file format. MathReader 5.0 for Windows is required to review the files 1.nb and FB.nb. An installation version of Math Reader 5.0 (MathReader_5.0.1_win.exe) is available on each of Replacement CD 1 and CD 2, but no claim is made to the MathReader program. The machine format is IBM-PC and the operating system compatibility is MS-Windows. Computer file 1.nb is 263 KB in size and was created on Nov. 17, 2002 and imprinted on each of Replacement CDs 1 and 2 on Nov. 7, 2005. Computer file FB.nb is 1,266 KB in size and was created on Nov. 10, 2002 and imprinted on each of Replacement CDs 1 and 2 on Nov. 7, 2005. Computer file MathReader_5.0.1_win.exe is 11,229 KB in size and was created on Jul. 15, 2005 and was imprinted on each of Replacement CDs 1 and 2 on Nov. 7, 2005.

STATEMENT OF RIGHTS TO INVENTIONS MADE UNDER FEDERALLY SPONSORED RESEARCH

No federal grants or funds were used to develop the present invention.

BACKGROUND

The present invention is generally related to a method and machine used for the mass analysis of known and unknown chemical compounds. More specifically, the current invention is related to method of obtaining analytical mass spectrum data that is free from computational errors for a chemical compound and corresponding machine for identifying an unknown compound from experimental mass spectrum data using simulating mass spectrum data.

Mass spectrometry. Generally, mass spectrometer is a weighing machine for molecules. The basic principle of a mass spectrometer is that accelerated ions of atoms can be deflected into a detector by magnetic fields. Many patents have been issued describing different mass spectrometers, (e.g. U.S. Pat. No. 2,769,910; U.S. Pat. No. 2,818,507; U.S. Pat. No. 2,939,952; U.S. Pat. No. 2,950,389; U.S. Pat. No. 3,334,225; and U.S. Pat. No. 5,089,702 which are hereby incorporated by reference). Mass spectrometry is a technique for measuring the mass/charge ratio of molecular ions, and over the last 100 years many methods of creating molecular ions have evolved, including: an Electrospray ("ESI") ion source; an Atmospheric Pressure Chemical Ionization ("APCI") ion source; an Atmospheric Pressure Photo Ionization ("APPI") ion source; a Matrix Assisted Laser Desorption Ionization ("MALDI") ion source; a Laser Desorption Ionization ("LDI") ion source; an Inductively Coupled Plasma ("ICP") ion source; an Electron Impact ("EI") ion source; a Chemical Ionization ("CI") ion source; a Fast Atom Bombardment ("FAB") ion source; and a Liquid Secondary Ions Mass Spectrometry ("LSIMS") ion source).

In practice, a chemical sample is ionized, accelerated, deflected, and then the mass and charge of the ion is detected. However, ionization typically leads to further fragmentation of the test compound. The masses of these molecular fragments are also measured, which gives insight to the specific class of molecule that is being examined. The analysis of mass spectrometry data can be simplified further by spreading out the timing of the arrival of the individual component ions or fragmentation ions of a chemical mixture to the mass spectrometry detector. For this reason, many mass spectrometers are used in conjunction with other analysis tools such as gas chromatography and liquid chromatography. Reducing the number of different molecular species in the mass spectrometer at any one time simplifies the separation of mass spectrum peaks. This procedure works for chemical samples that contain on the order of 10 to 20 different molecular ion species, but may be inadequate for analyzing samples that contain thousands of different species. Mass spectrometry is a widely used technique for the identification of molecules, both organic and inorganic chemistry. Examples of useful mass spectrometry analysis include drug development, drug manufacture, pollution control analysis, and chemical quality control.

By understanding how specific fragments of an original compound break up during ionization, it is possible to generate a chemical structure of an original molecule from the mass spectrum data of that compound. Similarly, it should be possible to generate a simulated mass spectrum data for a known chemical structure. Currently, there is not a big interest in mass spectra simulations because many investigators are usually only interested in obtaining the mass of a specific species from mass spectra. Simulated mass spectrum data can be utilized as a reference for comparing experimental mass spectrum data for an unknown compound to determine the unknown compound's chemical structure. However, as with all scientific techniques, the devil is in the details.

Fourier Transforms and Simulated Mass Spectra. Many mass spectrometers include software that generate simulated mass spectra that can be used for comparing experimentally generated mass spectra to aid a user in the determination of the identity of a chemical compound. Unfortunately, the "state of the art" mass spectra simulations often give results that are not an exact match, and at best are interpreted as: ". . . it looks like . . . ," which is not a very scientific interpretation of experimental data for an unknown compound. Additionally, published results sometimes are erroneous, which is a deterrent in using simulations of mass spectra as an analysis tool.

Generally, mass spectrum simulation software performs Fourier Transforms on subject compounds in order to generate the simulated mass spectra data that is used for comparison with experimental results. Because the Fourier Transform is an approximation, calculation errors are inherent and there is no control over the errors involved in calculation. For example, one such Fourier Transform method is disclosed in an article by Alan Rockwood and Steven Van Ordern titled "Ultra High-Speed Calculation of Isotope Distribution" in Analytical Chemistry Volume 68, No. 13, dated Jul. 1, 1996, ("the Rockwook '1996 Paper"), and is hereby incorporated by reference. Briefly, the Rockwood '1996 Paper describes a method based on (1) temporarily setting the masses of the isotopes to their nucleon numbers rather than their true masses, (2) calculating the mass distribution of the compound using a Fourier Transform-based method that produces correct intensity ratios for the nominal isotope peaks, and (3) adjusting the mass scale to correct for the errors made in the mass scale by step (1).

In general, isotope distribution calculation techniques utilize polynomial expressions generated by a formula $(a+b)^n$, for an element with two stable isotopes, where "a" represents the relative abundance of the light isotope, "b" represents the relative abundance of the heavy isotope, and "n" represents the number of atoms of the particular element in the particular compound. As is apparent, a large number of terms will be present as the number of atoms, i.e., "n" increases. Thus, there remains a need for a system and method capable of quickly determining the identity of a subject compound without the accompanying error provided by prior art systems.

The actual mass of a molecule and the actual mass of its fragmentation ions are useful pieces of information for the identification of an unknown molecule, or in the identification of a known molecule in an unknown mixture of molecules. Mass spectrometers are extremely sensitive and even small changes in isotopes abundance of a compound can be detected, which complicates an experimental mass spectrum of an unknown compound. In contrast, simulated mass spectrum data contain inherent calculation errors that generally approximate isotope abundances. Such approximations, in turn, produce unreliable results when comparing directly the simulated spectrum data with the experimental mass spectrum data. The invention disclosed herein describes a method of generating simulated mass spectrum data that is free from calculation errors, which allows a user to obtain the theoretically correct mass spectrum of a chemical species of interest and compare the experimental mass spectrum data of an unknown compound with a database of or simulated mass spectra. The invention described herein is an improvement over Fourier Transform-based methods of determining the mass spectrum data of a chemical structure.

SUMMARY

A first aspect of the current invention is a method of obtaining analytical mass spectrum data that is free from computational errors for a chemical compound. The method described herein works with chemical composition having a preferred molecular weight of up to about 1,000 AMU. Briefly, the analytical mass spectrum data that is free from computational errors for a chemical compound can be obtained by first selecting an isotope abundance value for each elemental isotope of a molecular formula representing the chemical compound. The molecular formula will contain one or more elemental atoms and each elemental atom will have at least one elemental isotope forming an elemental isotope combination. The elemental atoms in a molecular formula can be selected from any element represented in the periodic table of elements. The relative occurrence probability for each elemental isotope combination of the molecular formula can be calculated using the following formula (I):

$$p = \frac{\prod_{i}^{n}(ai!)}{\prod_{i}^{n}\prod_{j}^{n^{Ai}}(aij!)}\prod_{i}^{n}\prod_{j}^{n^{Ai}}\left(\frac{p_{Aij}}{100}\right)^{aij} \qquad \text{(I)}$$

For this occurrence probability equation, p represents the relative occurrence probability (the p's for all elemental isotope combinations corresponding to a chemical formula/compound add up to 1 of course which is certainty)—p is proportional to the intensity of the peak observed in a mass spectrum; ai represents a number of elemental atoms in the molecular formula and $ai=n^{Ai}$; aij represents a number of elemental isotopes in the molecular formula; and $p_{Aij}$ represents the isotope abundance value expressed as a percentage for the elemental isotope. Once the (i) the occurrence probability for each elemental isotope combination; and (ii) the relative molecular mass corresponding to each elemental isotope combination of the chemical compound have been determined, this data is recorded onto a retrievable media source (e.g. magnetic media, optical media, paper media, digital media, or a microprocessor). Together, the occurrence probability and the relative molecular mass are considered the analytical mass spectrum data that is free from computational errors for the chemical compound.

Simulated mass spectra for the chemical compound that is free from computational errors can be plotted using an X-Y coordinate system. The relative molecular mass corresponding to each elemental isotope combination is plotted as an x-coordinate of the X-Y coordinate system and the relative occurrence probability for each elemental isotope combination is plotted as a y-coordinate of the X-Y coordinate system, which forms the simulated mass spectra. Similarly, a columnar table having at least a first column containing the relative molecular mass corresponding to each elemental isotope combination and a second column containing the occurrence probability for each elemental isotope combination can be constructed using the analytical mass spectrum data described above. This is of value because many laboratories are interested in obtaining the mass of a specific species of interest.

In a third embodiment of the invention, the analytical mass spectrum data can be compared to experimental mass spectrum data of an unknown compound. The experimental mass spectrum data should contain at least a mass/charge ratio and a relative abundance value. The mass/charge ratio vs. the relative abundance value of the experimental mass spectrum data can be superimposed with the relative molecular mass vs. the relative occurrence probability of the analytical mass spectrum data. Furthermore, this type of comparison can lead to a potential match of the superimposed values if the relative probability calculated and scaled is less than or equal to the intensity measured by spectrometer. In contrast the superimposed value is not considered matched if the relative probability (calculated and scaled) is greater than the observed intensity. By assigning a probability threshold for elemental isotope combinations having a value of the probability below the assigned probability threshold, it is possible to select or discard specific isotope data. This assigned probability threshold gives as result of the simulation the residual probability.

Although the calculations for obtaining analytical mass spectrum data that is free from computational errors for a chemical compound can be completed by hand for simple molecules (as shown in Example 1–8), using a computer is faster and can automate the process. A fourth embodiment of the current invention is a modified Mathematica notebook file that contains all the information needed to perform relative occurrence probability calculations for most elements of the periodic table of elements. Additionally, the modified Mathematica notebook file described in Example 10 allows experimental mass spectra data of an unknown compound to be compared to different theoretical spectra in a database in order to identify the compound.

A second aspect of the current invention is a machine for identifying an unknown compound from experimental mass spectrum data. The machine has: (a) a memory which is able to store a series of analytical mass spectrum data that is free from computational errors at a first memory address, wherein the analytical mass spectrum data comprises at least a relative molecular mass value and a relative occurrence probability value; (b) a mass spectrum data input means that enables a series of experimental mass spectrum data for the unknown compound to be collected and stored at a second memory address, wherein the experimental mass spectrum data comprises at least a mass/charge ratio and a relative abundance value; (c) a data calculation means that enables a mathematical comparison of the series of analytical mass spectrum data stored in the first memory address to the series of experimental mass spectrum data stored in the second memory address, wherein a result from the mathematical comparison is stored at a third memory address; (d) a display that is operatively connected to said memory for displaying any information stored in any addresses of the memory; and (e) a data input means that an operator can use to manipulate any series of data stored in any addresses of the memory.

In a fifth specific embodiment, the machine for identifying an unknown compound from experimental mass spectrum data is a computer having a microprocessor unit, a storage device, a keyboard, a monitor, a set of instructions for configuring the computer, a software program which is able to perform relative occurrence probability calculations, and parallel, USB or serial ports for input/output functions. Additionally, the computer may also be connected to a network that is in data communication and capable of sending and receiving data to and from a remote device (e.g. a second computer, a network drive, the internet, or a mass spectrometer). The software program of the computer is able to obtain analytical simulated mass spectrum data that is free from computational errors for a chemical compound, as was described above. The software program is able to (i) retrieve the analytical simulated mass spectrum data from the first memory address; (ii) retrieve the experimental mass spectrum data from the second memory address, in which the experimental mass spectrum data comprises at least a mass/charge ratio and a relative abundance value; (iii) compare a plot of the relative abundance value vs. the mass/charge ratio (experimental mass spectrum) to a superimposed plot of the relative occurrence probability vs. the relative molecular mass (theoretical or simulated mass spectrum), in which the superimposed plot is a potential match if the relative occurrence probability is less than or equal to the relative abundance ratio ratio, and the superimposed plot is not matched if the relative molecular mass is greater than the mass/charge ratio; and (iv) send a graphic representation of the superimposed plot of the potential match to the display.

BRIEF DESCRIPTION OF THE DRAWINGS

FIG. 5 shows three tables of mass spectrum data generated for ($H_{24}C_{12}N_6O_{13}Cr_3$) using the modified Mathematica notebook file described in Example 10. FIG. 5A shows the composition of the isotopic combinations after the final pruning. FIG. 5B shows the numerical values for mass/charge and probabilities for the species listed with 4 decimal digits being used for the absolute probabilities and 2 decimal digits being used for the scaled probability. FIG. 5C shows the numerical values for mass/charge and probabilities for the species listed with more significant figures being used for the absolute probabilities and scaled probability than reported in FIG. 5B.

DETAILED DESCRIPTION OF THE PREFERRED EMBODIMENTS

Figure 1:
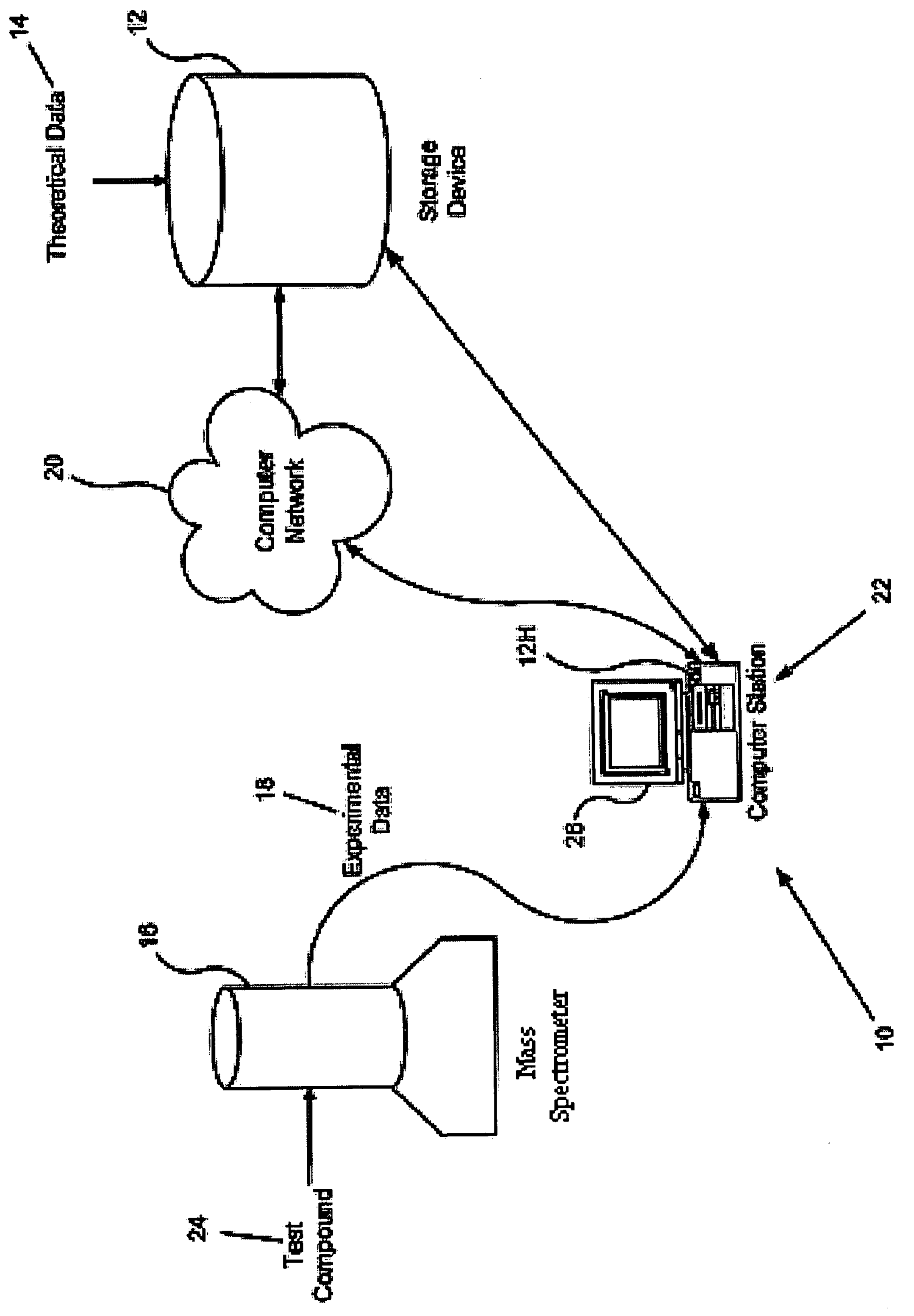
FIG. 1 shows a component diagram of one embodiment of the present invention.

It will be readily apparent to one skilled in the art that various substitutions and modifications may be made in the invention disclosed herein without departing from the scope and spirit of the invention.

The term "a" or "an" as used herein in the specification may mean one or more. As used herein in the claim(s), when used in conjunction with the word "comprising", the words "a" or "an" may mean one or more than one. As used herein "another" may mean at least a second or more.

The term "Mathematica" as used herein refers to a software package distributed by Wolfram Research, Inc. (Champaign, Ill.). The Mathematica software contains numeric and symbolic computational engines, graphics system, programming language, documentation system and advanced connectivity for linking to other applications. Other similar software applications known in the art can also be utilized for this invention.

The term "retrievable media source" as used herein is defined as any type of media that can be used to record and retrieve data. In specific embodiments, a retrievable media source comprises a computer hard drive, digital storage devices, optical storage devices, and hard copy printer pages.

The present invention is generally related to the analysis of chemical compounds using mass spectrometry. More specifically, the current invention is related to method of obtaining analytical mass spectrum data that is free from computational errors for a chemical compound and system for identifying an unknown compound from experimental mass spectrum data and simulated mass spectrum data. Other embodiments of the current invention are related to a system for identifying an unknown compound from experimental mass spectrum data; a method of managing electronic data relating to mass spectrum data that is free from computational errors. The system including a computer system for managing electronic data that is related to known and unknown chemical compounds, and a method of identification of chemical compounds through the use of mass spectrometry and simulated mass spectra.

Simulated Mass Spectrum Data: A mass spectrometer is an instrument used for determining the mass and abundance of molecular ions based upon the amount of deflection that each different ion has in a magnetic field. The amount of deflection for any particular ion depends upon the mass of the ion and the charge on the ion. Typically, the mass and charge for each ion striking the detector are combined into a mass/charge (m/z) ratio. The number of ions arriving at the detector is an indicator of the relative abundance of a particular ion. Thus, the relative sizes of the peaks can be direct measure of the relative abundance of different isotopes, and the tallest peak is often given an arbitrary height of 100. Thus, a typical mass spectrum looks like a stick diagram having a plot of the (m/z) ratio on the abscissa (x-axis), and the "relative abundance" or "relative intensity" of the ion plotted on the ordinate (y-axis).

In order to simulate mass spectrum data (e.g. (m/z) ratio and relative intensity) for a specific chemical composition Fourier Transforms have been utilized. Because Fourier Transforms are approximations, the resultant calculation errors that are inherent can yield erroneous simulated mass spectrum data.

Removing Calculation Errors from Simulated Data. In one embodiment, a probability calculation is accomplished through application of mathematical probability equations, applied to each possible isotope species of any given chemical compound. Specifically, the probability of the sum of two mutually exclusive events is equal to the sum of the probabilities of those events; the probability of the product of two events is equal to the probability of one of them multiplied by the conditional probability of the other provided that the first event has occurred; such that the number of arrangements of a1 bodies of type A1, a2 bodies of type A2, . . . and an bodies of type An, on $$\sum_{i}^{n}$$

ai places is given by $$\left(\sum_{i}^{n} ai\right)! \Big/ \prod_{i}^{n} (ai!)).$$

Applying these to the problem of finding the probability that a species of composition $A11_{a_{11}} \ldots A1n_{a_{1n}A1}{}^{A1} \ldots Ann_{a_{nn}An}{}^{An}$ in a homogeneous sample, in fact a compound (The various isotopes of one element are presumed to have identical ability to combine to form the compound.) of the composition $A1_{a1} \ldots An_{an}$, where Aij are the isotopes occurring for the element Ai (as many as $n^{Ai}$) one finds Formula I:

$$p = \frac{\prod_{i}^{n} (ai!)}{\prod_{i}^{n} \prod_{j}^{n^{Ai}} (aij!)} \prod_{i}^{n} \prod_{j}^{n^{Ai}} \left(\frac{p_{Aij}}{100}\right)^{aij} \quad \text{(I)}$$

where $p_{Aij}$ is the natural abundance of the isotope Aij.

In one embodiment, Formula I can be used to populate a database with a relative occurrence probability for virtually any chemical compound having a known molecular formula. One embodiment of the invention is a system for generating, storing, and retrieving simulated mass spectrum data. Other embodiments include a system for comparing simulated mass spectrum data with experimental mass spectrum data received from a mass spectrometer. Referring to FIG. 1, the present invention comprises a computer system 10 having one or more storage devices 12 capable of retaining electronic data. The storage device of the present invention is populated with natural abundance data 14 relating to naturally occurring isotopes of one or more chemical elements. As is well known in the art, many chemical compounds have a plurality of isotopes associated thereto.

Natural abundance data 14 may be utilized to calculate the relative probability of each possible isotope combination for any given compound. In one embodiment, the present invention utilizes natural abundance data to calculate and display the relative probability of occurrence for each possible isotope species for any given chemical compound.

Figure 2:
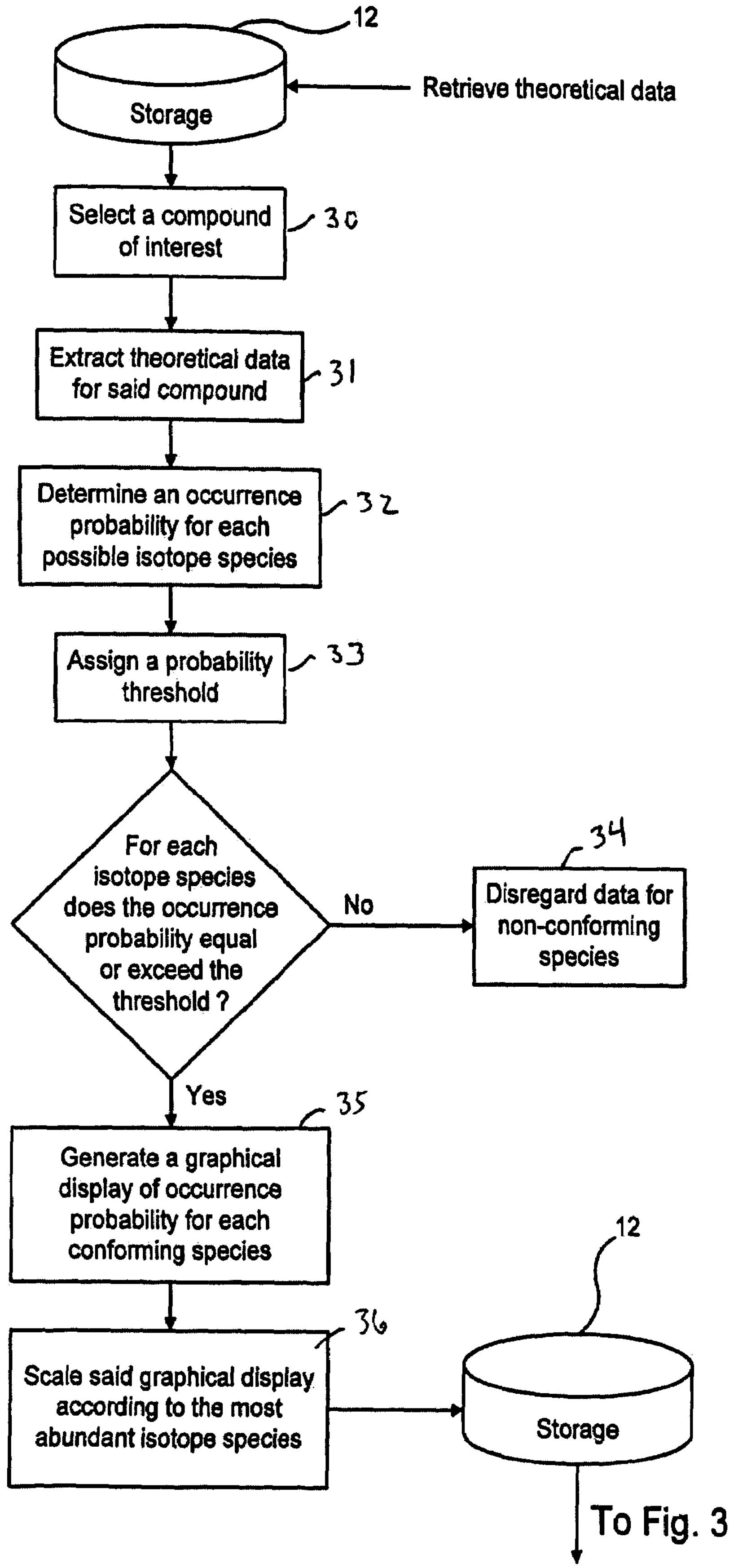
FIG. 2 shows a process flow diagram illustrating theoretical data process of one embodiment of the present invention.

Once the relative occurrence probabilities have been calculated, a probability threshold is assigned, as illustrated in FIG. 2. Through the use of a probability threshold, isotope species having a relatively low likelihood of occurrence may be removed from subsequent computations, thus improving the overall efficiency of the present invention.

The computer system 10 of the present invention is ideally suited for use in conjunction with a mass spectrometer 16. As is well known in the art, a computer has at least a processor unit, including at least one memory cache, a storage device, which may be internal or external, a user input interface, an output device, and an input/output port. The input device may be a keyboard or other device for introducing data to the processor. The output device can be a printer, monitor or data storage device. The computer system can be configured to perform the functions described herein through the use of software or firmware. The software or firmware is adapted to create through the processor, and thereafter maintain, a database in the storage device comprising tables with pre-determined relationships. The software or firmware configures the processor such that it permits the search of data in the database according to certain parameters, rules or instructions and the output of such data, e.g., through a display, upon request. The software or firmware uses a set of instructions to configure the processor so as to correlate commands or information that are provided through an input to the processor to data stored in the storage device. In one embodiment, the computer system of the present invention may be coupled to a mass spectrometer through the input/output port such that experimental data 18 may pass there between. Thus, theoretical data for a plurality of compounds is generated, stored and compared to experimental data received from the mass spectrometer, as discussed further below.

The present invention allows the probability threshold to be adjusted according to user preferences. In one embodiment, the probability threshold is determined in light of the capacity of the mass spectrometer 16 being utilized. As discussed in detail above, a mass spectrometer is designed to determine the intensity and mass of each isotope species associated with any given chemical compound being analyzed.

Isotope species having very low intensity readings may be indiscernible to the mass spectrometer 16. In one embodiment, isotope species that are indiscernible by the mass spectrometer are removed from subsequent calculations, via the assignment of a probability threshold, in order to provide the system 10 with enhanced accuracy during later comparisons with experimental data 18. In short, the threshold value may be set so as to be at or below the level at which the mass spectrometer 16 may register a reading. This allows the system 10 to disregard possible isotope species having a relatively low occurrence probability.

The sum probability of those isotope species falling below the assigned probability threshold is referred to as the residual probability. In one embodiment, the residual probability is determined to be about 2.4%. In this embodiment, theoretical data 14 for the remaining 97.6% is retained for further processing.

In one embodiment, the computer system of the present invention may be preprogrammed with one or more probability thresholds arranged according to mass spectrometer type and intensity discernment capability. Thus, the user may select a threshold level consistent with the mass spectrometer being utilized in his or her laboratory or office. By utilizing only those probabilities above the threshold, the present invention greatly decreases the time required to calculate and display the probability results. Further, the efficiency of the present invention allows the use of actual abundance values in each probability calculation. Thus, the present invention virtually eliminates calculation error prevalent in known systems requiring the use of approximate (i.e., rounded off) values and using Fourier Transform methods (with truncated series) to lower calculation timeframes.

Once the threshold probability has been determined, the present invention generates a graphical display of the occurrence probability for each isotope species above the threshold. In one embodiment, such a graphical display comprises a graph illustrating probability/intensity data on the ordinate (y-axis) and the formula weight on the abscissa (x-axis). Further, graphical displays of the relative probabilities above the threshold are scaled according to the isotope species found to be the most abundant by the aforementioned probability calculations. These graphical displays are generated for a plurality of possible isotope species and stored upon the storage device 12 for later use, as illustrated by FIG. 2. To further help illustrate the use of the current invention, Example 10 has been provided below. Example 10 comprises the computer code for a Mathematica notebook file (Wolfram Research Inc. Champaign Ill.). The Mathematica notebook file incorporates the aforementioned probability calculations and isotope abundance data. Mathematica notebook files are electronic documents that combine text, typeset equations, graphics, and sounds in a single platform—independent file format.

Referring back to FIG. 1, in one embodiment, theoretical data may be stored on a hard drive associated with a local or remote computer system, or upon an external storage device. Further, external storage devices may be accessed through a computer network 20 or other transmission means.

In one embodiment, a remote computer station 22 is coupled to a mass spectrometer such that experimental data may readily pass there between. The computer station may, in turn, contain a storage device 12H containing the theoretical data described above, or, alternatively, receive theoretical data via download over a computer network 20. In one embodiment, a test compound 24 is inserted into the mass spectrometer for testing and generating a spectrum. The results of such testing are provided directly to the computer station 22 located in a laboratory or scientist's workspace.

Figure 3:
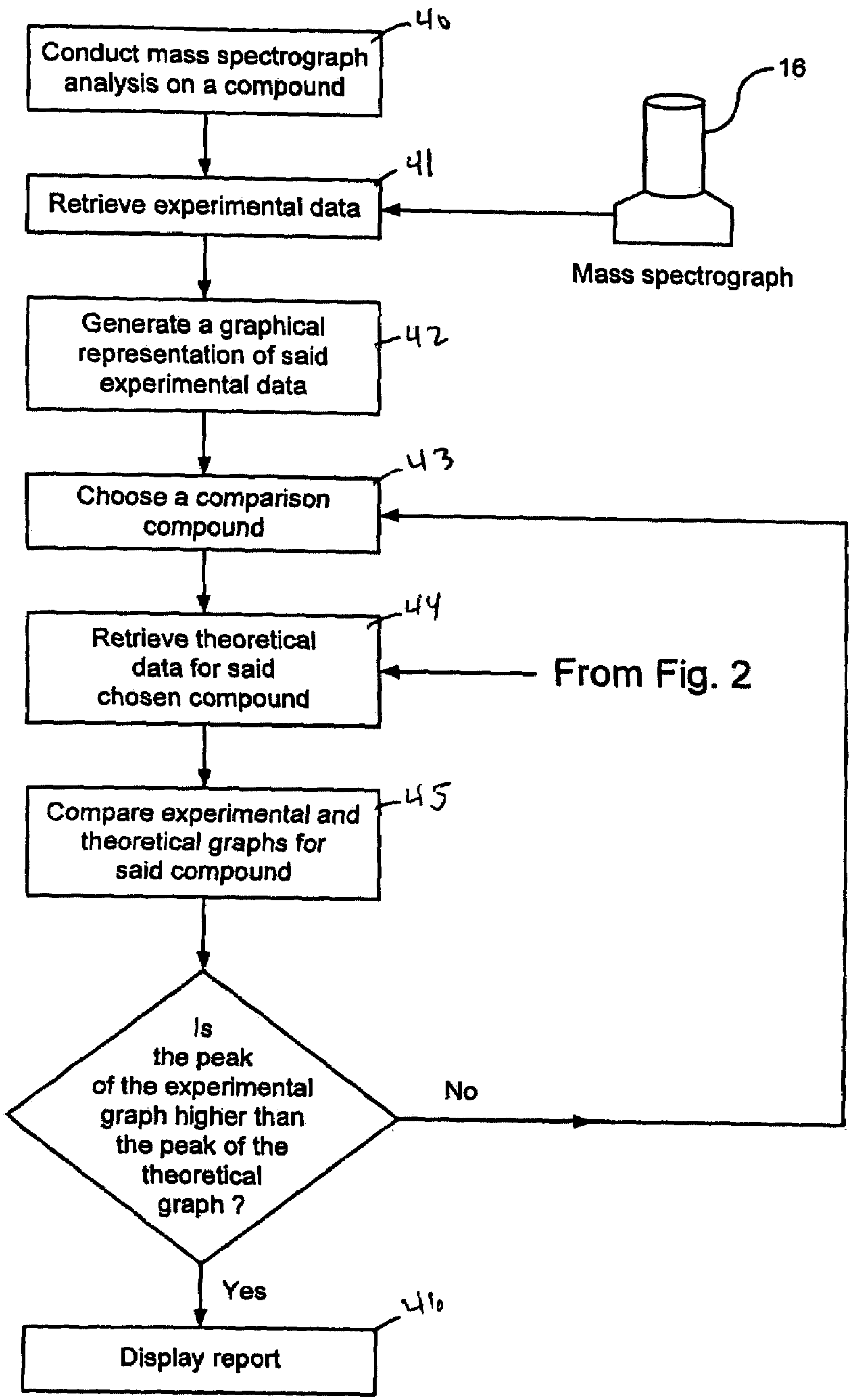
FIG. 3 shows a process flow diagram illustrating the experimental data process and comparison process of one embodiment of the present invention.

In one embodiment, experimental data received from the mass spectrograph 16 is processed and then displayed upon a display device 26 such as a monitor, associated with the computer station 22. Experimental data is displayed according to the conventions discussed above for display of theoretical data, e.g., ordinate: probability(calculated)/intensity(actual); abscissa: formula weight. Referring to FIG. 3, the use of these display conventions allows the system to superimpose experimental and theoretical graphical displays for comparison purposes, if desired. Hard copies of such displays or other information may be prepared by an output device (not shown) such as a printer.

In one embodiment, the system automatically selects one or more possible matches for the compound being tested and displays same upon the display device 26. In short, the graphical display of the experimental mass spectrum is analyzed to determine a matching compound for which theoretical data is held upon the storage device 12, 12H. In one embodiment, the peak or cluster of peaks exhibited by the experimental mass spectrum is utilized to narrow the number of possible matches for the chemical compound being tested.

In another embodiment, the computer system 10 of the present invention may be programmed to suggest one or more potential matches upon receipt of the mass spectrum experimental data. In one embodiment, the system conducts a search of an electronic library of theoretical mass spectrum data and their accompanying graphical displays.

Once a potentially matching compound has been selected, information relating to this compound is extracted from the storage device 12, 12H and displayed upon the display device 26 for review by the user. As described above, this allows the experimental mass spectrum graph and the theoretical mass spectrum graph to be compared and analyzed at the same moment. If the potential match is a viable one, the isotope species illustrated by each graph should exhibit substantially the same peaks and/or clusters of intensity peaks.

In one embodiment, an initial determination is made to ensure that the selected match is viable. This involves a review of the intensities shown for the peaks of each graph. If some of the intensity values (1 value or more) for the peaks of the experimental graph are less than the intensity values of the peaks for the theoretically determined matching compound, the proposed match is invalid. In short, it is impossible for a viable theoretical mass spectrum peak to have a greater intensity value than the experimental mass spectrum peak. Thus, if this scenario occurs, the potential match must be discarded and another potential match explored.

However, if the reverse is found, i.e., the intensity values for the peaks of the experimental graph are greater than or equal with the intensity value for the peaks of the potential theoretical match, the results may be deemed viable. In this example, the difference in intensity between the experimental peak and the theoretical peak may be satisfactorily explained by impurities in the mass spectrometer beam or in the instrument itself.

In one embodiment, once an initial viability determination has been made, the remaining peak clusters of each graph are subjected to further examination in order to ensure that the proposed match is indeed the compound being tested to provide an additional level of confidence to the user that the correct match has been found.

The present invention allows the calculation with zero error of the mass spectrum for any chemical species of interest using a laptop/desktop computer and appropriate software program such as Mathematica, Matlab, etc. The present invention is adaptable for use with small species (molecular weights being ~1000 atomic mass units) providing in less than one second the simulated data and a comparison of simulated versus experimental data (this calculation time has been obtained using a Desktop PC/computer 3.0 GHz with Mathematica 5.1 using a Pentium IV processor).

The present invention allows the fast analysis of mass spectra of a chemical compound, the user being able to assign the peak observed in the experimental spectrum. The present invention allows the user to determine whether, in a particular sample, the elements have the natural abundances found in literature. For example, if a molecular peak observed in the experimental spectrum is very obvious but it does not fit the simulated spectrum this phenomenon may be caused by different isotopic abundances in the sample than the values used in simulation.

The present invention is the most precisely efficient method and system to interpret mass spectra due to the fact that it provides all the data needed in such analysis: intensities (or probabilities) and masses. Without the use of the present invention, a user is limited to using only half of the available data, masses.

There are a number of useful applications in which the present invention can be utilized. Wherever mass spectrometry is used, the present invention could be used in tandem therewith. For example, mass spectrometry is used to: analyze battlefields for chemical warfare and other applications; date prehistoric cave paintings; analyze the urine markers that signal mouse matrimony; detect ammonia, rocket propellant, oxygen, nitrogen and water leaks outside a space station; show that organic molecules on a comet could survive an impact with Earth; determine the age of maize cobs in Oaxaco (accelerator mass spectrometry); (using ion mobility mass spectrometry) detect a few parts per trillion of explosives or drugs, which cling to clothes and skin; test athletes for anabolic steroids, analgesics, diuretics and stimulants (gas chromatography mass spectrometer (GC-MS)); dating bones; sample airline passengers tickets for explosives by detecting a billionth of a gram of explosives in a few seconds; test urine for radiation exposure by depleted uranium from armor-piercing shells; classify foods (by analyzing the off cheeses the foods can be classified); identify new forms of elements, such as O4, a new form of oxygen; detect and identify the female sex hormone estrogen in river water, responsible for sex changes in male fish, detrimental effects on human male fertility and increases in testicular cancer (gas chromatography-negative chemical ionization mass spectrometry); identify tiny differences in the ratio of oxygen isotopes in the coral cores by measuring precisely how the monthly sea water temperatures changed over a 112 year period; catch criminals, such as those who use poison to commit assault and murder; study stratospheric air samples by gas chromatography-mass spectrometry (GC-MS) so as to, for example, identify a potentially new greenhouse gas—trifluoromethyl sulfur pentafluoride was detected at concentrations of 0.1 ppt (parts per trillion); and study the isotopic composition of iron in deep sea crusts (inductively-coupled plasma source mass spectrometry (ICP-MS)) to show small variations between two to six million years ago and larger variation within past two million years with no biological implications. Also mass spectrometry is used in: space probe fly-bys of asteroids and comets; identification of proteins that inhibit the human immunodeficiency virus; drug discovery and development (modern liquid chromatography/mass spectrometry LC/MS), using the various forms of atmospheric-pressure ionization (API) and matrix-assisted laser desorption ionization (MALDI)); analysis of oligonucleotides, peptides, proteins and small-molecule drug candidates; artifact carbon dating; other scientific experiments (as an example, recently a scientific laboratory has started studies on "teleportation"—and yes it is the same phenomenon described in science fiction work such as Star Trek, etc. and yes, it is legitimate scientific research—using mass spectrometry).

The flow charts of FIGS. 2 and 3 provide in detail the specific steps of the method of the present invention. As seen therein, theoretical data, an example of which is provided herein below, is stored in storage 12. The user selects a compound of interest 30. Theoretical data is extracted for said compound 31. An occurrence probability for each possible isotope species is determined 32. A probability threshold is assigned 3. For each isotope species, if the occurrence probability does not equal or exceed the threshold, then data is disregarded for non-conforming species 34. For each isotope species, if the occurrence probability does equal or exceed the threshold, then a graphical display of occurrence probability for each conforming species is generated 35. The graphical display is scaled according to the most abundant isotope species 36 and is stored in storage 12. As seen in FIG. 3, a mass spectral analysis is conducted on a compound 40. Experimental data is retrieved 41 from mass spectrometer 16. A graphical representation of said experimental data is then generated 42. A compound is chosen for comparison 43 and the theoretical data for said chosen compound is retrieved 44 from storage 12. Experimental and theoretical graphs for said compound are compared 45. If the peaks of the experimental graph are not higher than the peaks of the theoretical graph, then another comparison compound is chosen 43. If the peaks of the experimental graph are higher than the peaks of the theoretical graph, then a report is displayed 46.

EXAMPLES

The following examples are provided to further illustrate this invention and the manner in which it may be carried out. It will be understood, however, that the specific details given in the examples have been chosen for purposes of illustration only and not be construed as limiting the invention.

The present invention can be applied to other classes of objects with other types of properties; here the property studied is mass (here is found how abundant is a species of a certain mass within a complex combination of species, each having a different mass). Referring back to FIG. 1, the theoretical data used in the present invention is stored in storage 12. A set of theoretical data is hereinafter provided as an example. The following values are used in the calculation of the theoretical data (given as triplets isotope, natural abundance or $p_{Aij}$ in text for the particular isotope and atomic mass in atomic units for that particular isotope):

Hydrogen H
H-1, 99.9885, 1.007825
H-2, 0.0115, 2.014102

Carbon C
C-12, 98.93, 12.000000
C-13, 1.07, 13.003355

Oxygen O
O-16, 99.757, 15.994915
O-17, 0.038, 16.999131
O-18, 0.205, 17.999160

Chlorine Cl
Cl-35, 75.78, 34.968853
Cl-37, 24.22, 36.965903

Chromium Cr
Cr-50, 4.345, 49.946046
Cr-52, 83.789, 51.940510
Cr-53, 9.501, 52.940651
Cr-54, 2.365, 53.938883

Specific composition examples have been outlined in the examples below. The probability calculation to determine a theoretical spectrum free from calculation errors of a known chemical species is as follows in Formula (I):

$$p = \frac{\prod_{i}^{n}(ai!)}{\prod_{i}^{n}\prod_{j}^{nAi}(aij!)}\prod_{i}^{n}\prod_{j}^{nAi}\left(\frac{p_{Aij}}{100}\right)^{aij} \tag{I}$$

The examples listed below contain calculations using the natural abundance data for the individual atoms as described above. However, one of ordinary skill in the art will understand that the calculations, atomic weight and isotope information can be integrated with many useful computer software packages to produce theoretical mass spectra for virtually any chemical composition having any natural or enriched elemental abundance data. Examples 1–8 contain manual calculations in order to demonstrate how simulated mass data can be produced free from computational errors. Example 10 illustrates how calculations and abundance data can be incorporated into programs to generate simulated mass data.

Example 1

I. Molecular carbon monoxide (CO). This composition has one carbon and one oxygen (i.e. aC=1, aO=1). The probability of a specific isotopic combination to be found in a beam of CO is given by the formula: p=(((aC!)(aO!))/((aC-12!)(aC-13!)(aO-16!)(aO-17!)(aO-18!)))((pC-12/100)^(aC-12))((pC-13)^(aC-13))((pO-16)^(aO-16))((pO-17)^(aO-17))((pO-18)^(aO-18)). The relative molecular mass for that specific isotopic combination being M=(AMC-12)(aC-12)+(AMC-13)(aC-13)+(AMO-16)(aO-16)+(AMO-17)(aO-17)+(AMO-18)(aO-18), where AMC-12 is the Atomic Mass of the Carbon isotope C-12, aC-12 means the number of isotopes of carbon (C) C-12, pC-12 means the natural abundance (as percentage) of the isotope of carbon (C) C-12, aC means the number of carbon (C) atoms (all for the specific isotopic combination considered in the simulation), etc., (2^2 means 2 to the second or (2)(2)=4).

Calculations for the possible isotopic combinations of Carbon Monoxide (CO) are as follows:

1. (C-12)(O-16), (aC-12)=1,(aC-13)=0,(aO-16)=1,(aO-17)=0,(aO-18)=0 with the probability of finding this isotopic combination in a beam of CO being p=((1!)(1!)/((1!)(0!)(1!)(0!)(0!)))((98.93/100)^1)((1.07/100)^0)((99.757/100)^1)((0.038/100)^0)((0.205/100)^0)=0.9869.

The relative molecular mass of the isotopic combination being M=(12.000000)(1)+(13.003355)(0)+(15.994915)(1)+(16.999131)(0)+(17.999160)(0)=27.995.

Thus, the theoretical spectrum for CO would present a line at a mass of 27.995 atomic mass units with an intensity of 98.96% due to the species having in composition carbon-12 and oxygen-16 (this will be the molecular peak or the M species peak).

2. (C-12)(O-17), (aC-12)=1,(aC-13)=0,(aO-16)=0,(aO-17)=1,(aO-18)=0 with the probability of finding this isotopic combination in a beam of CO being p=((1!)(1!)/((1!)(0!)(0!)(1!)(0!)))((98.93/100)^1)((1.07/100)^0) ((99.757/100)^0)((0.038/100)^1)((0.205/100)^0)=3.8×10^(−4).

The relative molecular mass of the isotopic combination being: M=(12.000000)(1)+(13.003355)(0)+(15.994915)(0)+(16.999131)(1)+(17.999160)(0)=28.999.

Thus, the theoretical spectrum for CO would present a line at a mass of 28.999 atomic mass units with an intensity of 0.00038% due to the species having in composition carbon-12 and oxygen-17.

3. (C-12)(O-18), (aC-12)=1,(aC-13)=0,(aO-16)=0,(aO-17)=0,(aO-18)=1 with the probability of finding this isotopic combination in a beam of CO being p=((1!)(1!)/((1!)(0!)(0!)(0!)(1!)))((98.93/100)^1)((1.07/100)^0)((99.757/100)^0)((0.038/100)^0)((0.205/100)^1)=2.03×10^(−3).

The relative molecular mass of the isotopic combination being: M=(12.000000)(1)+(13.003355)(0)+(15.994915)(0)+(16.999131)(0)+(17.999160)(1)=29.999.

Thus, the theoretical spectrum for CO would present a line at 29.999 atomic mass units with an intensity of 0.00203% due to the species having in composition carbon-12 and oxygen-18.

4. (C-13)(O-16), (aC-12)=0,(aC-13)=1,(aO-16)=1,(aO-17)=0,(aO-18)=0 with the probability of finding this isotopic combination in a beam of CO being p=((1!)(1!)/((0!)(1!)(1!)(0!)(0!)))((98.93/100)^0)((1.07/100)^1)((99.757/100)^1)((0.038/100)^0)((0.205/100)^0)=1.07×10^(−2). The relative molecular mass of the isotopic combination being M=(12.000000)(0)+(13.003355)(1)+(15.994915)(1)+(16.999131)(0)+(17.999160)(0)=28.998.

Thus, the theoretical spectrum for CO would present a line at 28.998 atomic mass units with an intensity of 0.0107% due to the species having in composition carbon-13 and oxygen-16.

5. (C-13)(O-17), (aC-12)=0,(aC-13)=1,(aO-16)=0,(aO-17)=1,(aO-18)=0 with the probability of finding this isotopic combination in a beam of CO being p=((1!)(1!)/((0!)(1!)(0!)(1!)(0!)))((98.93/100)^0)((1.07/100)^1)((99.757/100)^0)((0.038/100)^1)((0.205/100)^0)=4.1×10^(−6).

The relative molecular mass of the isotopic combination being: M=(12.000000)(0)+(13.003355)(1)+(15.994915)(0)+(16.999131)(1)+(17.999160)(0)=30.002.

Thus, the theoretical spectrum for CO would present a line at 30.002 atomic mass units with an intensity of 0.0107% due to the species having in composition carbon-13 and oxygen-17.

6. (C-13)(O-18), (aC-12)=0,(aC-13)=1,(aO-16)=0,(aO-17)=0,(aO-18)=1 with the probability of finding this isotopic combination in a beam of CO being p=((1!)(1!)/((0!)(1!)(0!)(0!)(1!)))

((98.93/100)^0)((1.07/100)^1)((99.757/100)^0)((0.038/100)^0)((0.205/100)^1)=2.19×10^(−5).

The relative molecular mass of the isotopic combination being: M=(12.000000)(0)+(13.003355)(1)+(15.994915)(0)+(16.999131)(0)+(17.999160)(1)=31.003

Thus, the theoretical spectrum for CO would present a line at 31.003 atomic mass units with an intensity of 0.0000219% due to the species having in composition carbon-13 and oxygen-18.

The above calculated results demonstrate that simulated intensities for CO can be determined without computational errors.

Example 2

A second example of using the calculation for chemical species is as follows:

II. $O_2$ molecule or Oxygen, aO=2 where the probability of a specific isotopic combination to be found in a beam of $O_2$ is given by the formula p=((aO!)/((aO-16!)(aO-17!)(aO-18!)))((pO-16/100)^(aO-16))((pO-17)^(aO-17))((pO-18)^(aO-18)) and the relative molecular mass for that specific isotopic combination being M=(AMO-16)(aO-16)+(AMO-17)(aO-17)+(AMO-18)(aO-18) Calculations for the possible isotopic combinations:

1. (O-16)(O-16), (aO-16)=2,(aO-17)=0,(aO-18)=0 with the probability of finding this isotopic combination in a beam of $O_2$ being p=((2!)/((2!)(0!)(0!)))((99.757/100)^2)((0.038/100)^0)((0.205/100)^0)=0.99515 the relative molecular mass of the isotopic combination being M=(15.994915)(2)+(16.999131)(0)+(17.999160)(0)=31.990

2. (O-16)(O-17), (aO-16)=1,(aO-17)=1,(aO-18)=0 with the probability of finding this isotopic combination in a beam of $O_2$ being p=((2!)/((1!)(1!)(0!)))((99.757/100)^1)((0.038/100)^1)((0.205/100)^0)=7.6×10^(−4)

the relative molecular mass of the isotopic combination being M=(15.994915)(1)+(16.999131)(1)+(17.999160)(0)=32.994

3. (O-16)(O-18), (aO-16)=1,(aO-17)=0,(aO-18)=1 with the probability of finding this isotopic combination in a beam of $O_2$ being p=((2!)/((1!)(0!)(1!)))((99.757/100)^1)((0.038/100)^0)((0.205/100)^1)=4.09×10^(−3)

the relative molecular mass of the isotopic combination being M=(15.994915)(1)+(16.999131)(0)+(17.999160)(1)=33.994

4. (O-17)(O-17), (aO-16)=0,(aO-17)=2,(aO-18)=0 with the probability of finding this isotopic combination in a beam of $O_2$ being p=((2!)/((0!)(2!)(0!)))((99.757/100)^0)((0.038/100)^2)((0.205/100)^0)=1.4×10^(−7)

the relative molecular mass of the isotopic combination being M=(15.994915)(0)+(16.999131)(2)+(17.999160)(0)=33.998

5. (O-17)(O-18), (aO-16)=0,(aO-17)=1,(aO-18)=1 with the probability of finding this isotopic combination in a beam of $O_2$ being p=((2!)/((0!)(1!)(1!)))((99.757/100)^0)((0.038/100)^1)((0.205/100)^1)=1.6×10^(−6)

the relative molecular mass of the isotopic combination being M=(15.994915)(0)+(16.999131)(1)+(17.999160)(1)=34.998

6. (O-18)(O-18), (aO-16)=0,(aO-17)=0,(aO-18)=2 with the probability of finding this isotopic combination in a beam of $O_2$ being p=((2!)/((0!)(0!)(2!)))((99.757/100)^0)((0.038/100)^0)((0.205/100)^2)=4.20×10^(−6) the relative molecular mass of the isotopic combination being M=(15.994915)(0)+(16.999131)(0)+(17.999160)(2)=35.998

Example 3

An example of using the calculation for chemical species is as follows:

III. $Cl_2$ molecule or Chlorine, aCl=2 where the probability of a specific isotopic combination to be found in a beam of $Cl_2$ is given by the formula p=((aCl!)/((aCl-35!)(aCl-37!)))((pCl-35/100)^(aCl-35))((pCl-37)^(aCl-37))

and the relative molecular mass for that specific isotopic combination being M=(AMCl-35)(aCl-35)+(AMCl-37)(aCl-37)

Calculations for the possible isotopic combinations:

1. (Cl-35)(Cl-35), (aCl-35)=2,(aCl-37)=0 with the probability of finding this isotopic combination in a beam of $Cl_2$ being p=((2!)/((2!)(0!)))((75.78/100)^2)((24.22/100)^0)=0.5743 the relative molecular mass of the isotopic combination being M=(34.968853)(2)+(36.965903)(0)=69.938

2. (Cl-35)(Cl-37), (aCl-35)=1,(aCl-37)=1 with the probability of finding this isotopic combination in a beam of $Cl_2$ being p=((2!)/((1!)(1!)))((75.78/100)^1)((24.22/100)^1)=0.3671 the relative molecular mass of the isotopic combination being M=(34.968853)(1)+(36.965903)(1)=71.935

3. (Cl-37)(Cl-37), (aCl-35)=0,(aCl-37)=2 with the probability of finding this isotopic combination in a beam of $Cl_2$ being p=((2!)/((0!)(2!)))((75.78/100)^0)((24.22/100)^2)=5.866×10^(−2)

the relative molecular mass of the isotopic combination being M=(34.968853)(0)+(36.965903)(2)=73.932

Example 4

An example of using the calculation for chemical species is as follows:

IV. $Cr_2$ species, aCr=2 where the probability of a specific isotopic combination to be found in a beam of $Cr_2$ is given by the formula p=((aCr!)/((aCr-50!)(aCr-52!)(aCr-53!)(aCr-54!)))((pCr-50/100)^(aCr-50))((pCr-52)^(aCr-52))((pCr-53)^(aCr-53))((pCr-54)^(aCr-54))

and the relative molecular mass for that specific isotopic combination being M=(AMCr-50)(aCr-50)+(AMCr-52)(aCr-52)+(AMCr-53)(aCr-53)+(AMCr-54)(aCr-54)

Calculations for the possible isotopic combinations:

1. (Cr-50)(Cr-50), (aCr-50)=2,(aCr-52)=0,(aCr-53)=0,(aCr-54)=0 with the probability of finding this isotopic combination in a beam of $Cr_2$ being $$p=((2!)/((2!)(0!)(0!)(0!)))((4.345/100)^2)((83.789/100)^0)((9.501/100)^0)((2.365/100)^0)=1.888\times 10^(-3)$$

the relative molecular mass of the isotopic combination being M=(49.946046)(2)+(51.940510)(0)+(52.940651)(0)+(53.938883)(0)=99.892

2. (Cr-50)(Cr-52), (aCr-50)=1,(aCr-52)=1,(aCr-53)=0, (aCr-54)=0 with the probability of finding this isotopic combination in a beam of $Cr_2$ being $$p=((2!)/((1!)(1!)(0!)(0!)))((4.345/100)^1)((83.789/100)^1)((9.501/100)^0)((2.365/100)^0)=7.281\times 10^(-2)$$

the relative molecular mass of the isotopic combination being M=(49.946046)(1)+(51.940510)(1)+(52.940651)(0)+(53.938883)(0)=101.887

3. (Cr-50)(Cr-53), (aCr-50)=1,(aCr-52)=0,(aCr-53)=1, (aCr-54)=0 with the probability of finding this isotopic combination in a beam of $Cr_2$ being $$p=((2!)/((1!)(0!)(1!)(0!)))((4.345/100)^1)((83.789/100)^0)((9.501/100)^1)((2.365/100)^0)=8.256\times 10^(-3)$$

the relative molecular mass of the isotopic combination being M=(49.946046)(1)+(51.940510)(0)+(52.940651)(1)+(53.938883)(0)=102.887

4. (Cr-50)(Cr-54), (aCr-50)=1,(aCr-52)=0,(aCr-53)=0, (aCr-54)=1 with the probability of finding this isotopic combination in a beam of $Cr_2$ being $$p=((2!)/((1!)(0!)(0!)(1!)))((4.345/100)^1)((83.789/100)^0)((9.501/100)^0)((2.365/100)^1)=2.055\times 10^(-3)$$

the relative molecular mass of the isotopic combination being M=(49.946046)(1)+(51.940510)(0)+(52.940651)(0)+(53.938883)(1)=103.885

5. (Cr-52)(Cr-52), (aCr-50)=0,(aCr-52)=2,(aCr-53)=0, (aCr-54)=0 with the probability of finding this isotopic combination in a beam of $Cr_2$ being $$p=((2!)/((0!)(2!)(0!)(0!)))((4.345/100)^0)((83.789/100)^2)((9.501/100)^0)((2.365/100)^0)=0.70206$$

the relative molecular mass of the isotopic combination being M=(49.946046)(0)+(51.940510)(2)+(52.940651)(0)+(53.938883)(0)=103.881

6. (Cr-52)(Cr-53), (aCr-50)=0,(aCr-52)=1,(aCr-53)=1, (aCr-54)=0 with the probability of finding this isotopic combination in a beam of $Cr_2$ being $$p=((2!)/((0!)(1!)(1!)(0!)))((4.345/100)^0)((83.789/100)^1)((9.501/100)^1)((2.365/100)^0)=0.1592$$

the relative molecular mass of the isotopic combination being M=(49.946046)(0)+(51.940510)(1)+(52.940651)(1)+(53.938883)(0)=104.881

7. (Cr-52)(Cr-54), (aCr-50)=0,(aCr-52)=1,(aCr-53)=0, (aCr-54)=1 with the probability of finding this isotopic combination in a beam of $Cr_2$ being p=((2!)/((0!)(1!)(0!)(1!)))((4.345/100)^0)((83.789/100)^1)((9.501/100)^0)((2.365/100)^1)=3.963×10^(−2)

the relative molecular mass of the isotopic combination being M=(49.946046)(0)+(51.940510)(1)+(52.940651)(0)+(53.938883)(1)=105.879

8. (Cr-53)(Cr-53), (aCr-50)=0,(aCr-52)=0,(aCr-53)=2, (aCr-54)=0 with the probability of finding this isotopic combination in a beam of $Cr_2$ being $$p=((2!)/((0!)(0!)(2!)(0!)))((4.345/100)^0)((83.789/100)^0)((9.501/100)^2)((2.365/100)^0)=9.027\times 10^(-3)$$

the relative molecular mass of the isotopic combination being M=(49.946046)(0)+(51.940510)(0)+(52.940651)(2)+(53.938883)(0)=105.881

9. (Cr-53)(Cr-54), (aCr-50)=0,(aCr-52)=0,(aCr-53)=1, (aCr-54)=1 with the probability of finding this isotopic combination in a beam of $Cr_2$ being $$p=((2!)/((0!)(0!)(1!)(1!)))((4.345/100)^0)((83.789/100)^0)((9.501/100)^1)((2.365/100)^1)=4.494\times 10^(-3)$$

the relative molecular mass of the isotopic combination being M=(49.946046)(0)+(51.940510)(0)+(52.940651)(1)+(53.938883)(1)=106.880

10. (Cr-54)(Cr-54), (aCr-50)=0,(aCr-52)=0,(aCr-53)=0, (aCr-54)=2 with the probability of finding this isotopic combination in a beam of $Cr_2$ being $$p = ((2!)/((0!)(0!)(0!)(2!)))((4.345/100)\wedge 0)((83.789/100)\wedge 0)((9.501/100)\wedge 0)((2.365/100)\wedge 2) = 5.593\times 10\wedge(-4)$$

the relative molecular mass of the isotopic combination being M=(49.946046)(0)+(51.940510)(0)+(52.940651)(0)+(53.938883)(2)=107.878

Example 5

An example of using the calculation for chemical species is as follows:

V. $Cr_3$ species, aCr=3 where the probability of a specific isotopic combination to be found in a beam of $Cr_3$ is given by the formula p=((aCr!)/((aCr-50!)(aCr-52!)(aCr-53!)(aCr-54!)))((pCr-50/100)ˆ(aCr-50))((pCr-52)ˆ(aCr-52))((pCr-53)ˆ(aCr-53))((pCr-54)ˆ(aCr-54))

and the relative molecular mass for that specific isotopic combination being M=(AMCr-50)(aCr-50)+(AMCr-52)(aCr-52)+(AMCr-53)(aCr-53)+(AMCr-54)(aCr-54)

Calculations for the possible isotopic combinations:

1. (Cr-50)(Cr-50)(Cr-50), (aCr-50)=3,(aCr-52)=0,(aCr-53)=0,(aCr-54)=0 with the probability of finding this isotopic combination in a beam of $Cr_3$ being $$p = ((3!)/((3!)(0!)(0!)(0!)))((4.345/100)\wedge 3)((83.789/100)\wedge 0)((9.501/100)\wedge 0)((2.365/100)\wedge 0) = 8.203\times 10\wedge(-5)$$

the relative molecular mass of the isotopic combination being M=(49.946046)(3)+(51.940510)(0)+(52.940651)(0)+(53.938883)(0)=149.838

2. (Cr-50)(Cr-50)(Cr-52), (aCr-50)=2,(aCr-52)=1,(aCr-53)=0,(aCr-54)=0 with the probability of finding this isotopic combination in a beam of $Cr_3$ being $$p = ((3!)/((2!)(1!)(0!)(0!)))((4.345/100)\wedge 2)((83.789/100)\wedge 1)((9.501/100)\wedge 0)((2.365/100)\wedge 0) = 4.746\times 10\wedge(-3)$$

the relative molecular mass of the isotopic combination being M=(49.946046)(2)+(51.940510)(1)+(52.940651)(0)+(53.938883)(0)=151.833

3. (Cr-50)(Cr-50)(Cr-53), (aCr-50)=2,(aCr-52)=0,(aCr-53)=1,(aCr-54)=0 with the probability of finding this isotopic combination in a beam of $Cr_3$ being $$p = ((3!)/((2!)(0!)(1!)(0!)))((4.345/100)\wedge 2)((83.789/100)\wedge 0)((9.501/100)\wedge 1)((2.365/100)\wedge 0) = 5.381\times 10\wedge(-4)$$

the relative molecular mass of the isotopic combination being M=(49.946046)(2)+(51.940510)(0)+(52.940651)(1)+(53.938883)(0)=152.833

4. (Cr-50)(Cr-50)(Cr-54), (aCr-50)=2,(aCr-52)=0,(aCr-53)=0,(aCr-54)=1 with the probability of finding this isotopic combination in a beam of $Cr_3$ being $$p = ((3!)/((2!)(0!)(0!)(1!)))((4.345/100)\wedge 2)((83.789/100)\wedge 0)((9.501/100)\wedge 0)((2.365/100)\wedge 1) = 1.339\times 10\wedge(-4)$$

the relative molecular mass of the isotopic combination being M=(49.946046)(2)+(51.940510)(0)+(52.940651)(0)+(53.938883)(1)=153.831

5. (Cr-50)(Cr-52)(Cr-52), (aCr-50)=1,(aCr-52)=2,(aCr-53)=0,(aCr-54)=0 with the probability of finding this isotopic combination in a beam of $Cr_3$ being $$p = ((3!)/((1!)(2!)(0!)(0!)))((4.345/100)\wedge 1)((83.789/100)\wedge 2)((9.501/100)\wedge 0)((2.365/100)\wedge 0) = 9.151\times 10\wedge(-2)$$

the relative molecular mass of the isotopic combination being M=(49.946046)(1)+(51.940510)(2)+(52.940651)(0)+(53.938883)(0)=153.827

6. (Cr-50)(Cr-52)(Cr-53), (aCr-50)=1,(aCr-52)=1,(aCr-53)=1,(aCr-54)=0 with the probability of finding this isotopic combination in a beam of $Cr_3$ being $$p = ((3!)/((1!)(1!)(1!)(0!)))((4.345/100)\wedge 1)((83.789/100)\wedge 1)((9.501/100)\wedge 1)((2.365/100)\wedge 0) = 2.075\times 10\wedge(-2)$$

the relative molecular mass of the isotopic combination being M=(49.946046)(1)+(51.940510)(1)+(52.940651)(1)+(53.938883)(0)=154.827

7. (Cr-50)(Cr-52)(Cr-54), (aCr-50)=1,(aCr-52)=1,(aCr-53)=0,(aCr-54)=1 with the probability of finding this isotopic combination in a beam of $Cr_3$ being $$p = ((3!)/((1!)(1!)(0!)(1!)))((4.345/100)^1)((83.789/100)^1)((9.501/100)^0)((2.365/100)^1) = 5.166\times 10^(-3)$$

the relative molecular mass of the isotopic combination being M=(49.946046)(1)+(51.940510)(1)+(52.940651)(0)+(53.938883)(1)=155.825

8. (Cr-50)(Cr-53)(Cr-53), (aCr-50)=1,(aCr-52)=0,(aCr-53)=2,(aCr-54)=0 with the probability of finding this isotopic combination in a beam of $Cr_3$ being $$p = ((3!)/((1!)(0!)(2!)(0!)))((4.345/100)^1)((83.789/100)^0)((9.501/100)^2)((2.365/100)^0) = 1.177\times 10^(-3)$$

the relative molecular mass of the isotopic combination being M=(49.946046)(1)+(51.940510)(0)+(52.940651)(2)+(53.938883)(0)=155.827

9. (Cr-50)(Cr-53)(Cr-54), (aCr-50)=1,(aCr-52)=0,(aCr-53)=1,(aCr-54)=1 with the probability of finding this isotopic combination in a beam of $Cr_3$ being $$p = ((3!)/((1!)(0!)(1!)(1!)))((4.345/100)^1)((83.789/100)^0)((9.501/100)^1)((2.365/100)^1) = 5.858\times 10^(-4)$$

the relative molecular mass of the isotopic combination being =(49.946046)(1)+(51.940510)(0)+(52.940651)(1)+(53.938883)(1)=156.826

10. (Cr-50)(Cr-54)(Cr-54), (aCr-50)=1,(aCr-52)=0,(aCr-53)=0,(aCr-54)=2 with the probability of finding this isotopic combination in a beam of $Cr_3$ being $$p = ((3!)/((1!)(0!)(0!)(2!)))((4.345/100)^1)((83.789/100)^0)((9.501/100)^0)((2.365/100)^2) = 7.291\times 10^(-5)$$

the relative molecular mass of the isotopic combination being M=(49.946046)(1)+(51.940510)(0)+(52.940651)(0)+(53.938883)(2)=157.824

11. (Cr-52)(Cr-52)(Cr-52), (aCr-50)=0,(aCr-52)=3,(aCr-53)=0,(aCr-54)=0 with the probability of finding this isotopic combination in a beam of $Cr_3$ being $$p = ((3!)/((0!)(3!)(0!)(0!)))((4.345/100)^0)((83.789/100)^3)((9.501/100)^0)((2.365/100)^0) = 0.58825$$

the relative molecular mass of the isotopic combination being M=(49.946046)(0)+(51.940510)(3)+(52.940651)(0)+(53.938883)(0)=155.822

12. (Cr-52)(Cr-52)(Cr-53), (aCr-50)=0,(aCr-52)=2,(aCr-53)=1,(aCr-54)=0 with the probability of finding this isotopic combination in a beam of $Cr_3$ being $$p = ((3!)/((0!)(2!)(1!)(0!)))((4.345/100)^0)((83.789/100)^2)((9.501/100)^1)((2.365/100)^0) = 0.2001$$

the relative molecular mass of the isotopic combination being M=(49.946046)(0)+(51.940510)(2)+(52.940651)(1)+(53.938883)(0)=156.822

13. (Cr-52)(Cr-52)(Cr-54), (aCr-50)=0,(aCr-52)=2,(aCr-53)=0,(aCr-54)=1 with the probability of finding this isotopic combination in a beam of $Cr_3$ being $$p = ((3!)/((0!)(2!)(0!)(1!)))((4.345/100)^0)((83.789/100)^2)((9.501/100)^0)((2.365/100)^1) = 4.981\times 10^(-2)$$

the relative molecular mass of the isotopic combination being M=(49.946046)(0)+(51.940510)(2)+(52.940651)(0)+(53.938883)(1)=157.820

14. (Cr-52)(Cr-53)(Cr-53), (aCr-50)=0,(aCr-52)=1,(aCr-53)=2,(aCr-54)=0 with the probability of finding this isotopic combination in a beam of $Cr_3$ being $$p = ((3!)/((0!)(1!)(2!)(0!)))((4.345/100)^0)((83.789/100)^1)((9.501/100)^2)((2.365/100)^0) = 2.269\times 10^(-2)$$

the relative molecular mass of the isotopic combination being M=(49.946046)(0)+(51.940510)(1)+(52.940651)(2)+(53.938883)(0)=157.822

15. (Cr-52)(Cr-53)(Cr-54), (aCr-50)=0,(aCr-52)=1,(aCr-53)=1,(aCr-54)=1 with the probability of finding this isotopic combination in a beam of $Cr_3$ being $$p = ((3!)/((0!)(1!)(1!)(1!)))((4.345/100)^0)((83.789/100)^1)((9.501/100)^1)((2.365/100)^1) = 1.130 \times 10^(-2)$$

the relative molecular mass of the isotopic combination being M=(49.946046)(0)+(51.940510)(1)+(52.940651)(1)+(53.938883)(1)=158.820

16. (Cr-52)(Cr-54)(Cr-54), (aCr-50)=0,(aCr-52)=1,(aCr-53)=0,(aCr-54)=2 with the probability of finding this isotopic combination in a beam of $Cr_3$ being $$p = ((3!)/((0!)(1!)(0!)(2!)))((4.345/100)^0)((83.789/100)^1)((9.501/100)^0)((2.365/100)^2) = 1.406 \times 10^(-3)$$

the relative molecular mass of the isotopic combination being M=(49.946046)(0)+(51.940510)(1)+(52.940651)(0)+(53.938883)(2)=159.818

17. (Cr-53)(Cr-53)(Cr-53), (aCr-50)=0,(aCr-52)=0,(aCr-53)=3,(aCr-54)=0 with the probability of finding this isotopic combination in a beam of $Cr_3$ being $$p = ((3!)/((0!)(0!)(3!)(0!)))((4.345/100)^0)((83.789/100)^0)((9.501/100)^3)((2.365/100)^0) = 8.576 \times 10^(-4)$$

the relative molecular mass of the isotopic combination being M=(49.946046)(0)+(51.940510)(0)+(52.940651)(3)+(53.938883)(0)=158.822

18. (Cr-53)(Cr-53)(Cr-54), (aCr-50)=0,(aCr-52)=0,(aCr-53)=2,(aCr-54)=1 with the probability of finding this isotopic combination in a beam of $Cr_3$ being $$p = ((3!)/((0!)(0!)(2!)(1!)))((4.345/100)^0)((83.789/100)^0)((9.501/100)^2)((2.365/100)^1) = 6.405 \times 10^(-4)$$

the relative molecular mass of the isotopic combination being M=(49.946046)(0)+(51.940510)(0)+(52.940651)(2)+(53.938883)(1)=159.820

19. (Cr-53)(Cr-54)(Cr-54), (aCr-50)=0,(aCr-52)=0,(aCr-53)=1,(aCr-54)=2 with the probability of finding this isotopic combination in a beam of $Cr_3$ being $$p = ((3!)/((0!)(0!)(1!)(2!)))((4.345/100)^0)((83.789/100)^0)((9.501/100)^1)((2.365/100)^2) = 1.594 \times 10^(-4)$$

the relative molecular mass of the isotopic combination being M=(49.946046)(0)+(51.940510)(0)+(52.940651)(1)+(53.938883)(2)=160.818

20. (Cr-54)(Cr-54)(Cr-54), (aCr-50)=0,(aCr-52)=0,(aCr-53)=0,(aCr-54)=3 with the probability of finding this isotopic combination in a beam of $Cr_3$ being $$p=((3!)/((0!)(0!)(0!)(3!)))((4.345/100)\hat{}0)((83.789/100)\hat{}0)((9.501/100)\hat{}0)((2.365/100)\hat{}3)$$
$$=1.323\times 10\hat{}(-5)$$

the relative molecular mass of the isotopic combination being M=(49.946046)(0)+(51.940510)(0)+(52.940651)(0)+(53.938883)(3)=161.817

Example 6

An example of using the calculation for chemical species is as follows:

VI. $Cr_3O$ species, aCr=3, aO=1 where the probability of a specific isotopic combination to be found in a beam of $Cr_3O$ is given by the formula p=((aCr!)(aO!)/((aCr-50!)(aCr-52!)(aCr-53!)(aCr-54!)(aO-16!)(aO-17!)(aO-18!)))((pCr-50/100)^(aCr-50))((pCr-52)^(aCr-52))((pCr-53)^(aCr-53))((pCr-54)^(aCr-54))((pO-16)^(aO-16))((pO-17)^(aO-17))((pO-18)^(aO-18))

and the relative molecular mass for that specific isotopic combination being M=(AMCr-50)(aCr-50)+(AMCr-52)(aCr-52)+(AMCr-53)(aCr-53)+(AMCr-54)(aCr-54)+(AMO-16)(aO-16)+(AMO-17)(aO-17)+(AMO-18)(aO-18)

Calculations for the possible isotopic combinations:

1. (Cr-50)(Cr-50)(Cr-50)(O-16), (aCr-50)=3,(aCr-52)=0,(aCr-53)=0,(aCr-54)=0,(aO-16)=1,(aO-17)=0,(aO-18)=0 with the probability of finding this isotopic combination in a beam of $Cr_3O$ being p=((3!)(1!)/((3!)(0!)(0!)(0!)(1!)(0!)(0!)))((4.345/100)^3)((83.789/100)^0)((9.501/100)^0)((2.365/100)^0)((99.757/100)^1)((0.038/100)^0)((0.205/100)^0)=8.183×10^(−5)

the relative molecular mass of the isotopic combination being M=(49.946046)(3)+(51.940510)(0)+(52.940651)(0)+(53.938883)(0)+(15.994915)(1)+(16.999131)(0) + (17.999160)(0)=165.833

2. (Cr-50)(Cr-50)(Cr-52)(O-16), (aCr-50)=2,(aCr-52)=1,(aCr-53)=0,(aCr-54)=0,(aO-16)=1,(aO-17)=0,(aO-18)=0 with the probability of finding this isotopic combination in a beam of $Cr_3O$ being p=((3!)(1!)/((2!)(1!)(0!)(0!)(1!)(0!)(0!)))((4.345/100)^2)((83.789/100)^1)((9.501/100)^0)((2.365/100)^0)((99.757/100)^1)((0.038/100)^0)((0.205/100)^0)=4.734×10 (−3)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)=167.828

3. (Cr-50)(Cr-50)(Cr-53)(O-16), (aCr-50)=2,(aCr-52)=0,(aCr-53)=1,(aCr-54)=0,(aO-16)=1,(aO-17)=0,(aO-18)=0 with the probability of finding this isotopic combination in a beam of $Cr_3O$ being p=((3!)(1!)/((2!)(0!)(1!)(0!)(1!)(0!)(0!)))((4.345/100)^2)((83.789/100)^0)((9.501/100)^1)((2.365/100)^0)((99.757/100)^1)((0.038/100)^0)((0.205/100)^0)=5.368×10^(−4)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)=168.828

4. (Cr-50)(Cr-50)(Cr-54)(O-16), (aCr-50)=2,(aCr-52)=0,(aCr-53)=0,(aCr-54)=1,(aO-16)=1,(aO-17)=0,(aO-18)=0 with the probability of finding this isotopic combination in a beam of $Cr_3O$ being p=((3!)(1!)/((2!)(0!)(0!)(1!)(1!)(0!)(0!)))((4.345/100)^2)((83.789/100)^0)((9.501/100)^0)((2.365/100)^1)((99.757/100)^1)((0.038/100)^0)((0.205/100)^0)=1.336×10^(−4)

the relative molecular mass of the isotopic combination being M=(49.946046)(2)+(51.940510)(0)+(52.940651)(0)+(53.938883)(1)+(15.994915)(1)+(16.999131)(0)+(17.999160)(0)=169.826

5. (Cr-50)(Cr-52)(Cr-52)(O-16), (aCr-50)=1,(aCr-52)=2,(aCr-53)=0,(aCr-54)=0,(aO-16)=1,(aO-17)=0,(aO-18)=0 with the probability of finding this isotopic combination in a beam of $Cr_3O$ being p=((3!)(1!)/((1!)(2!)(0!)(0!)(1!)(0!)(0!)))((4.345/100)^1)((83.789/100)^2)((9.501/100)^0)((2.365/100)^0)((99.757/100)^1)((0.038/100)^0)((0.205/100)^0)=9.129×10^(−2)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)=169.822

6. (Cr-50)(Cr-52)(Cr-53)(O-16), (aCr-50)=1,(aCr-52)=1,(aCr-53)=1,(aCr-54)=0,(aO-16)=1,(aO-17)=0,(aO-18)=0 with the probability of finding this isotopic combination in a beam of $Cr_3O$ being p=((3!)(1!)/((1!)(1!)(1!)(0!)(1!)(0!)(0!)))((4.345/100)^1)((83.789/100)^1)((9.501/100)^1)((2.365/100)^0)((99.757/100)^1)((0.038/100)^0)((0.205/100)^0)=2.070×10^(−2)

the relative molecular mass of the isotopic combination being M=(49.946046)(1)+(51.940510)(1)+(52.940651)(1)+(53.938883)(0)+(15.994915)(1)+(16.999131)(0)+(17.999160)(0)=170.822

7. (Cr-50)(Cr-52)(Cr-54)(O-16), (aCr-50)=1,(aCr-52)=1,(aCr-53)=0,(aCr-54)=1,(aO-16)=1,(aO-17)=0,(aO-18)=0 with the probability of finding this isotopic combination in a beam of $Cr_3O$ being p=((3!)(1!)/((1!)(1!)(0!)(1!)(1!)(0!)(0!)))((4.345/100)^1)((83.789/100)^1)((9.501/100)^0)((2.365/100)^1)((99.757/100)^1)((0.038/100)^0)((0.205/100)^0)=5.154×10^(−3)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)=171.820

8. (Cr-50)(Cr-53)(Cr-53)(O-16), (aCr-50)=1,(aCr-52)=0,(aCr-53)=2,(aCr-54)=0,(aO-16)=1,(aO-17)=0,(aO-18)=0 with the probability of finding this isotopic combination in a beam of $Cr_3O$ being p=((3!)(1!)/((1!)(0!)(2!)(0!)(1!)(0!)(0!)))((4.345/100)^1)((83.789/100)^0)((9.501/100)^2)((2.365/100)^0)((99.757/100)^1)((0.038/100)^0)((0.205/100)^0)=1.174×10^(−3)

the relative molecular mass of the isotopic combination being M=(49.946046)(1)+(51.940510)(0)+(52.940651)(2)+(53.938883)(0)+(15.994915)(1)+(16.999131)(0)+(17.999160)(0)=171.822

9. (Cr-50)(Cr-53)(Cr-54)(O-16), (aCr-50)=1,(aCr-52)=0,(aCr-53)=1,(aCr-54)=1,(aO-16)=1,(aO-17)=0,(aO-18)=0 with the probability of finding this isotopic combination in a beam of $Cr_3O$ being p=((3!)(1!)/((1!)(0!)(1!)(1!)(1!)(0!)(0!)))((4.345/100)^1)((83.789/100)^0)((9.501/100)^1)((2.365/100)^1)((99.757/100)^1)((0.038/100)^0)((0.205/100)^0)=5.844×10^(−4)

the relative molecular mass of the isotopic combination being M=(49.946046)(1)+(51.940510)(0)+(52.940651)(1)+(53.938883)(1)+(15.994915)(1)+(16.999131)(0)+(17.999160)(0)=172.820

10. (Cr-50)(Cr-54)(Cr-54)(O-16), (aCr-50)=1,(aCr-52)=0,(aCr-53)=0,(aCr-54)=2,(aO-16)=1,(aO-17)=0,(aO-18)=0 with the probability of finding this isotopic combination in a beam of $Cr_3O$ being p=((3!)(1!)/((1!)(0!)(0!)(2!)(1!)(0!)(0!)))((4.345/100)^1)((83.789/100)^0)((9.501/100)^0)((2.365/100)^2)((99.757/100)^1)((0.038/100)^0)((0.205/100)^0)=7.273×10^(−5)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)=173.819

11. (Cr-52)(Cr-52)(Cr-52)(O-16), (aCr-50)=0,(aCr-52)=3,(aCr-53)=0,(aCr-54)=0,(aO-16)=1,(aO-17)=0,(aO-18)=0 with the probability of finding this isotopic combination in a beam of $Cr_3O$ being p=((3!)(1!)/((0!)(3!)(0!)(0!)(1!)(0!)(0!)))((4.345/100)^0)((83.789/100)^3)((9.501/100)^0)((2.365/100)^0)((99.757/100)^1)((0.038/100)^0)((0.205/100)^0)=0.58682 the relative molecular mass of the isotopic combination being M=(49.946046)(0)+(51.940510)(3)+(52.940651)(0)+(53.938883)(0)+(15.994915)(1)+(16.999131)(0)+(17.999160)(0)=171.816

12. (Cr-52)(Cr-52)(Cr-53)(O-16), (aCr-50)=0,(aCr-52)=2,(aCr-53)=1,(aCr-54)=0,(aO-16)=1,(aO-17)=0,(aO-18)=0 with the probability of finding this isotopic combination in a beam of $Cr_3O$ being p=((3!)(1!)/((0!)(2!)(1!)(0!)(1!)(0!)(0!)))((4.345/100)^0)((83.789/100)^2)((9.501/100)^1)((2.365/100)^0)((99.757/100)^1)((0.038/100)^0)((0.205/100)^0)=0.1996 the relative molecular mass of the isotopic combination being M=(49.946046)(0)+(51.940510)(2)+(52.940651)(1)+(53.938883)(0)+(15.994915)(1)+(16.999131)(0) +(17.999160)(0)=172.817

13. (Cr-52)(Cr-52)(Cr-54)(O-16), (aCr-50)=0,(aCr-52)=2,(aCr-53)=0,(aCr-54)=1,(aO-16)=1,(aO-17)=0,(aO-18)=0 with the probability of finding this isotopic combination in a beam of $Cr_3O$ being p=((3!)(1!)/((0!)(2!)(0!)(1!)(1!)(0!)(0!)))((4.345/100)^0)((83.789/100)^2)((9.501/100)^0)((2.365/100)^1)((99.757/100)^1)((0.038/100)^0)((0.205/100)^0)=4.969×10^(−2)

the relative molecular mass of the isotopic combination being M=(49.946046)(0)+(51.940510)(2)+(52.940651)(0)+(53.938883)(1)+(15.994915)(1)+(16.999131)(0)+(17.999160)(0)=173.815

14. (Cr-52)(Cr-53)(Cr-53)(O-16), (aCr-50)=0,(aCr-52)=1,(aCr-53)=2,(aCr-54)=0,(aO-16)=1,(aO-17)=0,(aO-18)=0 with the probability of finding this isotopic combination in a beam of $Cr_3O$ being p=((3!)(1!)/((0!)(1!)(2!)(0!)(1!)(0!)(0!)))((4.345/100)^0)((83.789/100)^1)((9.501/100)^2)((2.365/100)^0)((99.757/100)^1)((0.038/100)^0)((0.205/100)^0)=2.264×10^(−2)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)=173.817

15. (Cr-52)(Cr-53)(Cr-54)(O-16), (aCr-50)=0,(aCr-52)=1,(aCr-53)=1,(aCr-54)=1,(aO-16)=1,(aO-17)=0,(aO-18)=0 with the probability of finding this isotopic combination in a beam of $Cr_3O$ being p=((3!)(1!)/((0!)(1!)(1!)(1!)(1!)(0!)(0!)))((4.345/100)^0)((83.789/100)^1)((9.501/100)^1)((2.365/100)^1)((99.757/100)^1)((0.038/100)^0)((0.205/100)^0)=1.127×10^(−2)

the relative molecular mass of the isotopic combination being M=(49.946046)(0)+(51.940510)(1)+(52.940651)(1)+(53.938883)(1)+(15.994915)(1)+(16.999131)(0)+(17.999160)(0)=174.815

16. (Cr-52)(Cr-54)(Cr-54)(O-16), (aCr-50)=0,(aCr-52)=1,(aCr-53)=0,(aCr-54)=2,(aO-16)=1,(aO-17)=0,(aO-18)=0 with the probability of finding this isotopic combination in a beam of $Cr_3O$ being p=((3!)(1!)/((0!)(1!)(0!)(2!)(1!)(0!)(0!)))((4.345/100)^0)((83.789/100)^1)((9.501/100)^0)((2.365/100)^2)((99.757/100)^1)((0.038/100)^0)((0.205/100)^0)=1.403×10^(−3)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)=175.813

17. (Cr-53)(Cr-53)(Cr-53)(O-16), (aCr-50)=0,(aCr-52)=0,(aCr-53)=3,(aCr-54)=0,(aO-16)=1,(aO-17)=0,(aO-18)=0 with the probability of finding this isotopic combination in a beam of $Cr_3O$ being p=((3!)(1!)/((0!)(0!)(3!)(0!)(1!)(0!)(0!)))((4.345/100)^0)((83.789/100)^0)((9.501/100)^3)((2.365/100)^0)((99.757/100)^1)((0.038/100)^0)((0.205/100)^0)=8.556×10^(−4)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)=174.817

18. (Cr-53)(Cr-53)(Cr-54)(O-16), (aCr-50)=0,(aCr-52)=0,(aCr-53)=2,(aCr-54)=1,(aO-16)=1,(aO-17)=0,(aO-18)=0 with the probability of finding this isotopic combination in a beam of $Cr_3O$ being p=((3!)(1!)/((0!)(0!)(2!)(1!)(1!)(0!)(0!)))((4.345/100)^0)((83.789/100)^0)((9.501/100)^2)((2.365/100)^1)((99.757/100)^1)((0.038/100)^0)((0.205/100)^0)=6.389×10^(−4)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)=175.815

19. (Cr-53)(Cr-54)(Cr-54)(O-16), (aCr-50)=0,(aCr-52)=0,(aCr-53)=,(aCr-54)=2,(aO-16)=1,(aO-17)=0,(aO-18)=0 with the probability of finding this isotopic combination in a beam of $Cr_3O$ being p=((3!)(1!)/((0!)(0!)(1!)(2!)(1!)(0!)(0!)))((4.345/100)^0)((83.789/100)^0)((9.501/100)^1)((2.365/100)^2)((99.757/100)^1)((0.038/100)^0)((0.205/100)^0)=1.590×10^(−4)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)=176.813

20. (Cr-54)(Cr-54)(Cr-54)(O-16), (aCr-50)=0,(aCr-52)=0,(aCr-53)=0,(aCr-54)=3,(aO-16)=,(aO-17)=0,(aO-18)=0 with the probability of finding this isotopic combination in a beam of $Cr_3O$ being p=((3!)(1!)/((0!)(0!)(0!)(3!)(1!)(0!)(0!)))((4.345/100)^0)((83.789/100)^0)((9.501/100)^0)((2.365/100)^3)((99.757/100)^1)((0.038/100)^0)((0.205/100)^0)=1.320×10^(−5)

the relative molecular mass of the isotopic combination being M=(49.946046)(0)+(51.940510)(0)+(52.940651)(0)+(53.938883)(3)+(15.994915)(1)+(16.999131)(0)+(17.999160)(0)=177.812

21. (Cr-50)(Cr-50)(Cr-50)(O-17), (aCr-50)=3,(aCr-52)=0,(aCr-53)=0,(aCr-54)=0,(aO-16)=0,(aO-17)=1,(aO-18)=0 with the probability of finding this isotopic combination in a beam of $Cr_3O$ being p=((3!)(1!)/((3!)(0!)(0!)(0!)(0!)(1!)(0!)))((4.345/100)^3)((83.789/100)^0)((9.501/100)^0)((2.365/100)^0)((99.757/100)^0)((0.038/100)^1)((0.205/100)^0)=3.1×10^(−8)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)=166.837

22. (Cr-50)(Cr-50)(Cr-52)(O-17), (aCr-50)=2,(aCr-52)=1,(aCr-53)=0,(aCr-54)=0,(aO-16)=0,(aO-17)=1,(aO-18)=0 with the probability of finding this isotopic combination in a beam of $Cr_3O$ being p=((3!)(1!)/((2!)(1!)(0!)(0!)(0!)(1!)(0!)))((4.345/100)^2)((83.789/100)^1)((9.501/100)^0)((2.365/100)^0)((99.757/100)^0)((0.038/100)^1)((0.205/100)^0)=1.8×10^(−6)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)=168.832

23. (Cr-50)(Cr-50)(Cr-53)(O-17), (aCr-50)=2,(aCr-52)=0,(aCr-53)=1,(aCr-54)=0,(aO-16)=0,(aO-17)=1,(aO-18)=0 with the probability of finding this isotopic combination in a beam of $Cr_3O$ being p=((3!)(1!)/((2!)(0!)(1!)(0!)(0!)(1!)(0!)))((4.345/100)^2)((83.789/100)^0)((9.501/100)^1)((2.365/100)^0)((99.757/100)^0)((0.038/100)^1)((0.205/100)^0)=2.0×10^(−7)

the relative molecular mass of the isotopic combination being M=(49.946046)(2)+(51.940510)(0)+(52.940651)(1)+(53.938883)(0)+(15.994915)(0)+(16.999131)(1) +(17.999160)(0)=169.832

24. (Cr-50)(Cr-50)(Cr-54)(O-17), (aCr-50)=2,(aCr-52)=0,(aCr-53)=0,(aCr-54)=1,(aO-16)=0,(aO-17)=1,(aO-18)=0 with the probability of finding this isotopic combination in a beam of $Cr_3O$ being p=((3!)(1!)/((2!)(0!)(0!)(1!)(0!)(1!)(0!)))((4.345/100)^2)((83.789/100)^0)((9.501/100)^0)((2.365/100)^1)((99.757/100)^0)((0.038/100)^1)((0.205/100)^0)=5.1×10^(−8)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)=170.830

25. (Cr-50)(Cr-52)(Cr-52)(O-17), (aCr-50)=1,(aCr-52)=2,(aCr-53)=0,(aCr-54)=0,(aO-16)=0,(aO-17)=1,(aO-18)=0 with the probability of finding this isotopic combination in a beam of $Cr_3O$ being p=((3!)(1!)/((1!)(2!)(0!)(0!)(0!)(1!)(0!)))((4.345/100)^1)((83.789/100)^2)((9.501/100)^0)((2.365/100)^0)((99.757/100)^0)((0.038/100)^1)((0.205/100)^0)=3.5×10^(−5)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)=170.826

26. (Cr-50)(Cr-52)(Cr-53)(O-17), (aCr-50)=1,(aCr-52)=1,(aCr-53)=,(aCr-54)=0,(aO-16)=0,(aO-17)=1,(aO-18)=0 with the probability of finding this isotopic combination in a beam of $Cr_3O$ being p=((3!)(1!)/((1!)(1!)(1!)(0!)(0!)(1!)(0!)))((4.345/100)^1)((83.789/100)^1)((9.501/100)^1)((2.365/100)^0)((99.757/100)^0)((0.038/100)^1)((0.205/100)^0)=7.9×10^(−6)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)=171.826

27. (Cr-50)(Cr-52)(Cr-54)(O-17), (aCr-50)=1,(aCr-52)=1,(aCr-53)=0,(aCr-54)=1,(aO-16)=0,(aO-17)=1,(aO-18)=0 with the probability of finding this isotopic combination in a beam of $Cr_3O$ being p=((3!)(1!)/((1!)(1!)(0!)(1!)(0!)(1!)(0!)))((4.345/100)^1)((83.789/100)^1)((9.501/100)^0)((2.365/100)^1)((99.757/100)^0)((0.038/100)^1)((0.205/100)^0)=2.0×10^(−6)

the relative molecular mass of the isotopic combination being M=(49.946046)(1)+(51.940510)(1)+(52.940651)(0)+(53.938883)(1)+(15.994915)(0)+(16.999131)(1) +(17.999160)(0)=172.825

28. (Cr-50)(Cr-53)(Cr-53)(O-17), (aCr-50)=1,(aCr-52)=0,(aCr-53)=2,(aCr-54)=0,(aO-16)=0,(aO-17)=1,(aO-18)=0 with the probability of finding this isotopic combination in a beam of $Cr_3O$ being p=((3!)(1!)/((1!)(0!)(2!)(0!)(0!)(1!)(0!)))((4.345/100)^1)((83.789/100)^0)((9.501/100)^2)((2.365/100)^0)((99.757/100)^0)((0.038/100)^1)((0.205/100)^0)=4.5×10^(−7)

the relative molecular mass of the isotopic combination being M=(49.946046)(1)+(51.940510)(0)+(52.940651)(2)+(53.938883)(0)+(15.994915)(0)+(16.999131)(1)+(17.999160)(0)=172.826

29. (Cr-50)(Cr-53)(Cr-54)(O-17), (aCr-50)=1,(aCr-52)=0,(aCr-53)=1,(aCr-54)=1,(aO-16)=0,(aO-17)=1,(aO-18)=0 with the probability of finding this isotopic combination in a beam of $Cr_3O$ being p=((3!)(1!)/((1!)(0!)(1!)(1!)(0!)(1!)(0!)))((4.345/100)^1)((83.789/100)^0)((9.501/100)^1)((2.365/100)^1)((99.757/100)^0)((0.038/100)^1)((0.205/100)^0)=2.2×10^(−7)

the relative molecular mass of the isotopic combination being M=(49.946046)(1)+(51.940510)(0)+(52.940651)(1)+(53.938883)(1)+(15.994915)(0)+(16.999131)(1)+(17.999160)(0)=173.825

30. (Cr-50)(Cr-54)(Cr-54)(O-17), (aCr-50)=1,(aCr-52)=0,(aCr-53)=0,(aCr-54)=2,(aO-16)=0,(aO-17)=1,(aO-18)=0 with the probability of finding this isotopic combination in a beam of $Cr_3O$ being p=((3!)(1!)/((1!)(0!)(0!)(2!)(0!)(1!)(0!)))((4.345/100)^1)((83.789/100)^0)((9.501/100)^0)((2.365/100)^2)((99.757/100)^0)((0.038/100)^1)((0.205/100)^0)=2.8×10^(−8)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)=174.823

31. (Cr-52)(Cr-52)(Cr-52)(O-17), (aCr-50)=0,(aCr-52)=3,(aCr-53)=0,(aCr-54)=0,(aO-16)=0,(aO-17)=1,(aO-18)=0 with the probability of finding this isotopic combination in a beam of $Cr_3O$ being p=((3!)(1!)/((0!)(3!)(0!)(0!)(0!)(1!)(0!)))((4.345/100)^0)((83.789/100)^3)((9.501/100)^0)((2.365/100)^0)((99.757/100)^0)((0.038/100)^1)((0.205/100)^0)=2.2×10^(−4)

the relative molecular mass of the isotopic combination being M=(49.946046)(0)+(51.940510)(3)+(52.940651)(0)+(53.938883)(0)+(15.994915)(0)+(16.999131)(1)+(17.999160)(0)=172.821

32. (Cr-52)(Cr-52)(Cr-53)(O-17), (aCr-50)=0,(aCr-52)=2,(aCr-53)=,(aCr-54)=0,(aO-16)=0,(aO-17)=1,(aO-18)=0 with the probability of finding this isotopic combination in a beam of $Cr_3O$ being p=((3!)(1!)/((0!)(2!)(1!)(0!)(0!)(1!)(0!)))((4.345/100)^0)((83.789/100)^2)((9.501/100)^1)((2.365/100)^0)((99.757/100)^0)((0.038/100)^1)((0.205/100)^0)=7.6×10^(−5)

the relative molecular mass of the isotopic combination being M=(49.946046)(0)+(51.940510)(2)+(52.940651)(1)+(53.938883)(0)+(15.994915)(0)+(16.999131)(1)+(17.999160)(0)=173.821

33. (Cr-52)(Cr-52)(Cr-54)(O-17), (aCr-50)=0,(aCr-52)=2,(aCr-53)=0,(aCr-54)=1,(aO-16)=0,(aO-17)=1,(aO-18)=0 with the probability of finding this isotopic combination in a beam of $Cr_3O$ being p=((3!)(1!)/((0!)(2!)(0!)(1!)(0!)(1!)(0!)))((4.345/100)^0)((83.789/100)^2)((9.501/100)^0)((2.365/100)^1)((99.757/100)^0)((0.038/100)^1)((0.205/100)^0)=1.9×10^(−5)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)=174.819

34. (Cr-52)(Cr-53)(Cr-53)(O-17), (aCr-50)=0,(aCr-52)=1,(aCr-53)=2,(aCr-54)=0,(aO-16)=0,(aO-17)=1,(aO-18)=0 with the probability of finding this isotopic combination in a beam of $Cr_3O$ being p=((3!)(1!)/((0!)(1!)(2!)(0!)(0!)(1!)(0!)))((4.345/100)^0)((83.789/100)^1)((9.501/100)^2)((2.365/100)^0)((99.757/100)^0)((0.038/100)^1)((0.205/100)^0)=8.6×10^(−6)

the relative molecular mass of the isotopic combination being M=(49.946046)(0)+(51.940510)(1)+(52.940651)(2)+(53.938883)(0)+(15.994915)(0)+(16.999131)(1)+(17.999160)(0)=174.821

35. (Cr-52)(Cr-53)(Cr-54)(O-17), (aCr-50)=0,(aCr-52)=1,(aCr-53)=,(aCr-54)=1,(aO-16)=0,(aO-17)=1,(aO-18)=0 with the probability of finding this isotopic combination in a beam of $Cr_3O$ being p=((3!)(1!)/((0!)(1!)(1!)(1!)(0!)(1!)(0!)))((4.345/100)^0)((83.789/100)^1)((9.501/100)^1)((2.365/100)^1)((99.757/100)^0)((0.038/100)^1)((0.205/100)^0)=4.3×10^(−6)

the relative molecular mass of the isotopic combination being M=(49.946046)(0)+(51.940510)(1)+(52.940651)(1)+(53.938883)(1)+(15.994915)(0)+(16.999131)(1)+(17.999160)(0)=175.819

36. (Cr-52)(Cr-54)(Cr-54)(O-17), (aCr-50)=0,(aCr-52)=1,(aCr-53)=0,(aCr-54)=2,(aO-16)=0,(aO-17)=1,(aO-18)=0 with the probability of finding this isotopic combination in a beam of $Cr_3O$ being p=((3!)(1!)/((0!)(1!)(0!)(2!)(0!)(1!)(0!)))((4.345/100)^0)((83.789/100)^1)((9.501/100)^0)((2.365/100)^2)((99.757/100)^0)((0.038/100)^1)((0.205/100)^0)=5.3×10^(−7)

the relative molecular mass of the isotopic combination being M=(49.946046)(0)+(51.940510)(1)+(52.940651)(0)+(53.938883)(2)+(15.994915)(0)+(16.999131)(1)+(17.999160)(0)=176.817

37. (Cr-53)(Cr-53)(Cr-53)(O-17), (aCr-50)=0,(aCr-52)=0,(aCr-53)=3,(aCr-54)=0,(aO-16)=0,(aO-17)=1,(aO-18)=0 with the probability of finding this isotopic combination in a beam of $Cr_3O$ being p=((3!)(1!)/((0!)(0!)(3!)(0!)(0!)(1!)(0!)))((4.345/100)^0)((83.789/100)^0)((9.501/100)^3)((2.365/100)^0)((99.757/100)^0)((0.038/100)^1)((0.205/100)^0)=3.3×10^(−7)

the relative molecular mass of the isotopic combination being M=(49.946046)(0)+(51.940510)(0)+(52.940651)(3)+(53.938883)(0)+(15.994915)(0)+(16.999131)(1)+(17.999160)(0)=175.821

38. (Cr-53)(Cr-53)(Cr-54)(O-17), (aCr-50)=0,(aCr-52)=0,(aCr-53)=2,(aCr-54)=1,(aO-16)=0,(aO-17)=1,(aO-18)=0 with the probability of finding this isotopic combination in a beam of $Cr_3O$ being p=((3!)(1!)/((0!)(0!)(2!)(1!)(0!)(1!)(0!)))((4.345/100)^0)((83.789/100)^0)((9.501/100)^2)((2.365/100)^1)((99.757/100)^0)((0.038/100)^1)((0.205/100)^0)=2.4×10^(−7)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)=176.819

39. (Cr-53)(Cr-54)(Cr-54)(O-17), (aCr-50)=0,(aCr-52)=0,(aCr-53)=1,(aCr-54)=2,(aO-16)=0,(aO-17)=1,(aO-18)=0 with the probability of finding this isotopic combination in a beam of $Cr_3O$ being p=((3!)(1!)/((0!)(0!)(1!)(2!)(0!)(1!)(0!)))((4.345/100)^0)((83.789/100)^0)((9.501/100)^1)((2.365/100)^2)((99.757/100)^0)((0.038/100)^1)((0.205/100)^0)=6.1×10^(−8)

the relative molecular mass of the isotopic combination being M=(49.946046)(0)+(51.940510)(0)+(52.940651)(1)+(53.938883)(2)+(15.994915)(0)+(16.999131)(1)+(17.999160)(0)=177.818

40. (Cr-54)(Cr-54)(Cr-54)(O-17), (aCr-50)=0,(aCr-52)=0,(aCr-53)=0,(aCr-54)=3,(aO-16)=0,(aO-17)=,(aO-18)=0 with the probability of finding this isotopic combination in a beam of $Cr_3O$ being p=((3!)(1!)/((0!)(0!)(0!)(3!)(0!)(1!)(0!)))((4.345/100)^0)((83.789/100)^0)((9.501/100)^0)((2.365/100)^3)((99.757/100)^0)((0.038/100)^1)((0.205/100)^0)=5.0×10^(−9)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)=178.816

41. (Cr-50)(Cr-50)(Cr-50)(O-18), (aCr-50)=3,(aCr-52)=0,(aCr-53)=0,(aCr-54)=0,(aO-16)=0,(aO-17)=0,(aO-18)=1 with the probability of finding this isotopic combination in a beam of $Cr_3O$ being p=((3!)(1!)/((3!)(O !)(0!)(0!)(O !)(O !) (1!)))((4.345/100)^3)((83.789/100)^0)((9.501/100)^0)((2.365/100)^0)((99.757/100)^0)((0.038/100)^0)((0.205/100)^1)=1.68×10^(−7)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)=167.837

42. (Cr-50)(Cr-50)(Cr-52)(O-18), (aCr-50)=2,(aCr-52)=1,(aCr-53)=0,(aCr-54)=0,(aO-16)=0,(aO-17)=0,(aO-18)=1 with the probability of finding this isotopic combination in a beam of $Cr_3O$ being p=((3!)(1!)/((2!)(1!)(0!)(0!)(0!)(0!)(1!)))((4.345/100)^2)((83.789/100)^1)((9.501/100)^0)((2.365/100)^0)((99.757/100)^0)((0.038/100)^0)((0.205/100)^1)=9.73×10^(−6)

the relative molecular mass of the isotopic combination being M=(49.946046)(2)+(51.940510)(1)+(52.940651)(0)+(53.938883)(0)+(15.994915)(0)+(16.999131)(0)+(17.999160)(1)=169.832

43. (Cr-50)(Cr-50)(Cr-53)(O-18), (aCr-50)=2,(aCr-52)=0,(aCr-53)=,(aCr-54)=0,(aO-16)=0,(aO-17)=0,(aO-18)=1 with the probability of finding this isotopic combination in a beam of $Cr_3O$ being p=((3!)(1!)/((2!)(0!)(1!)(0!)(O !)(0!)(1!)))((4.345/100)^2)((83.789/100)^0)((9.501/100)^1)((2.365/100)^0)((99.757/100)^0)((0.038/100)^0)((0.205/100)^1)=1.10×10^(−6)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)=170.832

44. (Cr-50)(Cr-50)(Cr-54)(O-18), (aCr-50)=2,(aCr-52)=0,(aCr-53)=0,(aCr-54)=1,(aO-16)=0,(aO-17)=0,(aO-18)=1 with the probability of finding this isotopic combination in a beam of $Cr_3O$ being p=((3!)(1!)/((2!)(0!)(0!)(1!)(0!)(0!)(1!)))((4.345/100)^2)((83.789/100)^0)((9.501/100)^0)((2.365/100)^1)((99.757/100)^0)((0.038/100)^0)((0.205/100)^1)=2.75×10^(−7)

the relative molecular mass of the isotopic combination being M=(49.946046)(2)+(51.940510)(0)+(52.940651)(0)+(53.938883)(1)+(15.994915)(0)+(16.999131)(0)+(17.999160)(1)=171.830

45. (Cr-50)(Cr-52)(Cr-52)(O-18), (aCr-50)=1,(aCr-52)=2,(aCr-53)=0,(aCr-54)=0,(aO-16)=0,(aO-17)=0,(aO-18)=1 with the probability of finding this isotopic combination in a beam of $Cr_3O$ being p=((3!)(1!)/((1!)(2!)(0!)(0!)(0!)(0!)(1!)))((4.345/100)^1)((83.789/100)^2)((9.501/100)^0)((2.365/100)^0)((99.757/100)^0)((0.038/100)^0)((0.205/100)^1)=1.88×10^(−4)

the relative molecular mass of the isotopic combination being M=(49.946046)(1)+(51.940510)(2)+(52.940651)(0)+(53.938883)(0)+(15.994915)(0)+(16.999131)(0)+(17.999160)(1)=171.826

46. (Cr-50)(Cr-52)(Cr-53)(O-18), (aCr-50)=1,(aCr-52)=1,(aCr-53)=1,(aCr-54)=0,(aO-16)=0,(aO-17)=0,(aO-18)=1 with the probability of finding this isotopic combination in a beam of $Cr_3O$ being p=((3!)(1!)/((1!)(1!)(1!)(0!)(0!)(0!)(1!)))((4.345/100)^1)((83.789/100)^1)((9.501/100)^1)((2.365/100)^0)((99.757/100)^0)((0.038/100)^0)((0.205/100)^1)=4.25×10^(−5)

the relative molecular mass of the isotopic combination being M=(49.946046)(1)+(51.940510)(1)+(52.940651)(1)+(53.938883)(0)+(15.994915)(0)+(16.999131)(0) +(17.999160)(1)=172.826

47. (Cr-50)(Cr-52)(Cr-54)(O-18), (aCr-50)=1,(aCr-52)=1,(aCr-53)=0,(aCr-54)=1,(aO-16)=0,(aO-17)=0,(aO-18)=1 with the probability of finding this isotopic combination in a beam of $Cr_3O$ being p=((3!)(1!)/((1!)(1!)(0!)(1!)(0!)(0!)(1!)))((4.345/100)^1)((83.789/100)^1)((9.501/100)^0)((2.365/100)^1)((99.757/100)^0)((0.038/100)^0)((0.205/100)^1)=1.06×10^(−5)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)=173.825

48. (Cr-50)(Cr-53)(Cr-53)(O-18), (aCr-50)=1,(aCr-52)=0,(aCr-53)=2,(aCr-54)=0,(aO-16)=0,(aO-17)=0,(aO-18)=1 with the probability of finding this isotopic combination in a beam of $Cr_3O$ being p=((3!)(1!)/((1!)(0!)(2!)(0!)(0!)(0!)(1!)))((4.345/100)^1)((83.789/100)^0)((9.501/100)^2)((2.365/100)^0)((99.757/100)^0)((0.038/100)^0)((0.205/100)^1)=2.41×10^(−6)

the relative molecular mass of the isotopic combination being M=(49.946046)(1)+(51.940510)(0)+(52.940651)(2)+(53.938883)(0)+(15.994915)(0)+(16.999131)(0)+(17.999160)(1)=173.827

49. (Cr-50)(Cr-53)(Cr-54)(O-18), (aCr-50)=1,(aCr-52)=0,(aCr-53)=,(aCr-54)=1,(aO-16)=0,(aO-17)=0,(aO-18)=1 with the probability of finding this isotopic combination in a beam of $Cr_3O$ being p=((3!)(1!)/((1!)(0!)(1!)(1!)(0!)(0!)(1!)))((4.345/100)^1)((83.789/100)^0)((9.501/100)^1)((2.365/100)^1)((99.757/100)^0)((0.038/100)^0)((0.205/100)^1)=1.20×10^(−6)

the relative molecular mass of the isotopic combination being M=(49.946046)(1)+(51.940510)(0)+(52.940651)(1)+(53.938883)(1)+(15.994915)(0)+(16.999131)(0)+(17.999160)(1)=174.825

50. (Cr-50)(Cr-54)(Cr-54)(O-18), (aCr-50)=1,(aCr-52)=0,(aCr-53)=0,(aCr-54)=2,(aO-16)=0,(aO-17)=0,(aO-118)=1 with the probability of finding this isotopic combination in a beam of $Cr_3O$ being p=((3!)(1!)/((1!)(0!)(0!)(2!)(0!)(0!)(1!)))((4.345/100)^1)((83.789/100)^0)((9.501/100)^0)((2.365/100)^2)((99.757/100)^0)((0.038/100)^0)((0.205/100)^1)=1.49×10^(−7)

the relative molecular mass of the isotopic combination being M=(49.946046)(1)+(51.940510)(0)+(52.940651)(0)+(53.938883)(2)+(15.994915)(0)+(16.999131)(0)+(17.999160)(1)=175.823

51. (Cr-52)(Cr-52)(Cr-52)(O-18), (aCr-50)=0,(aCr-52)=3,(aCr-53)=0,(aCr-54)=0,(aO-16)=0,(aO-17)=0,(aO-18)=1 with the probability of finding this isotopic combination in a beam of $Cr_3O$ being p=((3!)(1!)/((0!)(3!)(0!)(0!)(0!)(0!)(1!)))((4.345/100)^0)((83.789/100)^3)((9.501/100)^0)((2.365/100)^0)((99.757/100)^0)((0.038/100)^0)((0.205/100)^1)=1 0.21×10^(−3)

the relative molecular mass of the isotopic combination being M=(49.946046)(0)+(51.940510)(3)+(52.940651)(0)+(53.938883)(0)+(15.994915)(0)+(16.999131)(0)+(17.999160)(1)=173.821

52. (Cr-52)(Cr-52)(Cr-53)(O-18), (aCr-50)=0,(aCr-52)=2,(aCr-53)=1,(aCr-54)=0,(aO-16)=0,(aO-17)=0,(aO-18)=1 with the probability of finding this isotopic combination in a beam of $Cr_3O$ being p=((3!)(1!)/((0!)(2!)(1!)(0!)(0!)(0!)(1!)))((4.345/100)^0)((83.789/100)^2)((9.501/100)^1)((2.365/100)^0)((99.757/100)^0)((0.038/100)^0)((0.205/100)^1)=4.10×10^(−4)

the relative molecular mass of the isotopic combination being M=(49.946046)(0)+(51.940510)(2)+(52.940651)(1)+(53.938883)(0)+(15.994915)(0)+(16.999131)(0) +(17.999160)(1)=174.821

53. (Cr-52)(Cr-52)(Cr-54)(O-18), (aCr-50)=0,(aCr-52)=2,(aCr-53)=0,(aCr-54)=1,(aO-16)=0,(aO-17)=0,(aO-18)=1 with the probability of finding this isotopic combination in a beam of $Cr_3O$ being p=((3!)(1!)/((0!)(2!)(0!)(1!)(0!)(0!)(1!)))((4.345/100)^0)((83.789/100)^2)((9.501/100)^0)((2.365/100)^1)((99.757/100)^0)((0.038/100)^0)((0.205/100)^1)=1.02×10^(−4)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)=175.819

54. (Cr-52)(Cr-53)(Cr-53)(O-18), (aCr-50)=0,(aCr-52)=1,(aCr-53)=2,(aCr-54)=0,(aO-16)=0,(aO-17)=0,(aO-18)=1 with the probability of finding this isotopic combination in a beam of $Cr_3O$ being p=((3!)(1!)/((0!)(1!)(2!)(0!)(0!)(0!)(1!)))((4.345/100)^0)((83.789/100)^1)((9.501/100)^2)((2.365/100)^0)((99.757/100)^0)((0.038/100)^0)((0.205/100)^1)=4.65×10^(−5)

the relative molecular mass of the isotopic combination being M=(49.946046)(0)+(51.940510)(1)+(52.940651)(2)+(53.938883)(0)+(15.994915)(0)+(16.999131)(0)+(17.999160)(1)=175.821

55. (Cr-52)(Cr-53)(Cr-54)(O-18), (aCr-50)=0,(aCr-52)=1,(aCr-53)=1,(aCr-54)=1,(aO-16)=0,(aO-17)=0,(aO-18)=1 with the probability of finding this isotopic combination in a beam of $Cr_3O$ being p=((3!)(1!)/((0!)(1!)(1!)(1!)(0!)(0!)(1!)))((4.345/100)^0)((83.789/100)^1)((9.501/100)^1)((2.365/100)^1)((99.757/100)^0)((0.038/100)^0)((0.205/100)^1)=2.32×10^(−5)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)=176.819

56. (Cr-52)(Cr-54)(Cr-54)(O-18), (aCr-50)=0,(aCr-52)=1,(aCr-53)=0,(aCr-54)=2,(aO-16)=0,(aO-17)=0,(aO-18)=1 with the probability of finding this isotopic combination in a beam of $Cr_3O$ being p=((3!)(1!)/((0!)(1!)(0!)(2!)(0!)(0!)(1!)))((4.345/100)^0)((83.789/100)^1)((9.501/100)^0)((2.365/100)^2)((99.757/100)^0)((0.038/100)^0)((0.205/100)^1)=2.88×10^(−6)

the relative molecular mass of the isotopic combination being M=(49.946046)(0)+(51.940510)(1)+(52.940651)(0)+(53.938883)(2)+(15.994915)(0)+(16.999131)(0)+(17.999160)(1)=177.817

57. (Cr-53)(Cr-53)(Cr-53)(O-18), (aCr-50)=0,(aCr-52)=0,(aCr-53)=3,(aCr-54)=0,(aO-16)=0,(aO-17)=0,(aO-18)=1 with the probability of finding this isotopic combination in a beam of $Cr_3O$ being p=((3!)(1!)/((0!)(0!)(3!)(0!)(0!)(0!)(1!)))((4.345/100)^0)((83.789/100)^0)((9.501/100)^3)((2.365/100)^0)((99.757/100)^0)((0.038/100)^0)((0.205/100)^1)=1.76×10^(−6)

the relative molecular mass of the isotopic combination being M=(49.946046)(0)+(51.940510)(0)+(52.940651)(3)+(53.938883)(0)+(15.994915)(0)+(16.999131)(0)+(17.999160)(1)=176.821

58. (Cr-53)(Cr-53)(Cr-54)(O-18), (aCr-50)=0,(aCr-52)=0,(aCr-53)=2,(aCr-54)=1,(aO-16)=0,(aO-17)=0,(aO-18)=1 with the probability of finding this isotopic combination in a beam of $Cr_3O$ being p=((3!)(1!)/((0!)(0!)(2!)(1!)(0!)(0!)(1!)))((4.345/100)^0)((83.789/100)^0)((9.501/100)^2)((2.365/100)^1)((99.757/100)^0)((0.038/100)^0)((0.205/100)^1)=1.31×10^(−6)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)=177.819

59. (Cr-53)(Cr-54)(Cr-54)(O-18), (aCr-50)=0,(aCr-52)=0,(aCr-53)=1,(aCr-54)=2,(aO-16)=0,(aO-17)=0,(aO-18)=1 with the probability of finding this isotopic combination in a beam of $Cr_3O$ being p=((3!)(1!)/((0!)(0!)(1!)(2!)(0!)(0!)(1!)))((4.345/100)^0)((83.789/100)^0)((9.501/100)^1)((2.365/100)^2)((99.757/100)^0)((0.038/100)^0)((0.205/100)^1)=3.27×10^(−7)

the relative molecular mass of the isotopic combination being M=(49.946046)(0)+(51.940510)(0)+(52.940651)(1)+(53.938883)(2)+(15.994915)(0)+(16.999131)(0)+(17.999160)(1)=178.818

60. (Cr-54)(Cr-54)(Cr-54)(O-18), (aCr-50)=0,(aCr-52)=0,(aCr-53)=0,(aCr-54)=3,(aO-16)=0,(aO-17)=0,(aO-18)=1 with the probability of finding this isotopic combination in a beam of $Cr_3O$ being p=((3!)(1!)/((0!)(0!)(0!)(3!)(0!)(0!)(1!)))((4.345/100)^0)((83.789/100)^0)((9.501/100)^0)((2.365/100)$_3$)((99.757/100)^0)((0.038/100)^0)((0.205/100)^1)=2.71×10^(−8)

the relative molecular mass of the isotopic combination being M=(49.946046)(0)+(51.940510)(0)+(52.940651)(0)+(53.938883)(3)+(15.994915)(0)+(16.999131)(0)+(17.999160)(1)=179.816

Example 7

An example of using the calculation for chemical species is as follows:

VII. $Cr_3OCl$ species, aCr=3, aO=1,aCl=1 where the probability of a specific isotopic combination to be found in a beam of $Cr_3OCl$ is given by the formula p=((aCr!)(aO!)(aCl!)/((aCr-50!)(aCr-52!)(aCr-53!)(aCr-54!)(aO-16!)(aO-17!)(aO-18!)(aCl-35!)(aCl-37!)))((pCr-50/100)^(aCr-50))((pCr-52)^(aCr-52))((pCr-53)^(aCr-53))((pCr-54)^(aCr-54))((pO-16)^(aO-16))((pO-17)1(aO-17))((pO-18)^(aO-18))((pCl-35)^(aCl-35))((pCl-37)^(aCl-37))

and the relative molecular mass for that specific isotopic combination being M=(AMCr-50)(aCr-50)+(AMCr-52)(aCr-52)+(AMCr-53)(aCr-53)+(AMCr-54)(aCr-54)+(AMO-16)(aO-16)+(AMO-17)(aO-17)+(AMO-18)(aO-18)+(AMCl-35)(aCl-35)+(AMCl-37)(aCl-37)

Calculations for the possible isotopic combinations:

1. (Cr-50)(Cr-50)(Cr-50)(O-16)(Cl-35), (aCr-50)=3,(aCr-52)=0,(aCr-53)=0,(aCr-54)=0,(aO-16)=,(aO-17)=0,(aO-18)= 0,(aCl-35)=1,(aCl-37)=0 with the probability of finding this isotopic combination in a beam of $Cr_3OCl$ being p=((3!)(1!)(1!)/((3!)(0!)(0!)(0!)(1!)(0!)(0!)(1!)(0!)))((4.345/100)^3)((83.789/100)^0)((9.501/100)^0)((2.365/100)^0)((99.757/100)^1)((0.038/100)^0)((0.205/100)^0)((75.78/100)^1)((24.22/100)^0)=6.201×10^(−5)

the relative molecular mass of the isotopic combination being M=(49.946046)(3)+(51.940510)(0)+(52.940651)(0)+(53.938883)(0)+(15.994915)(1)+(16.999131)(0)+(17.999160)(0)+(34.968853)(1)+(36.965903)(0)=200.802

2. (Cr-50)(Cr-50)(Cr-52)(O-16)(Cl-35), (aCr-50)=2,(aCr-52)=1,(aCr-53)=0,(aCr-54)=0,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((2!)(1!)(0!)(0!)(1!)(0!)(0!)(1!)(0!)))((4.345/100)^2)((83.789/100)^1)((9.501/100)^0)((2.365/100)^0)((99.757/100)^1)((0.038/100)^0)((0.205/100)^0)((75.78/100)^1)((24.22/100)^0)=3.587×10^(−3)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)+(34.968853)(1)+(36.965903)(0)=202.796

3. (Cr-50)(Cr-50)(Cr-53)(O-16)(Cl-35), (aCr-50)=2,(aCr-52)=0,(aCr-53)=,(aCr-54)=0,(aO-16)=1,(aO-17)=0,(aO-18)= 0,(aCl-35)=1,(aCl-37)=0 with the probability of finding this isotopic combination in a beam of $Cr_3OCl$ being p=((3!)(1!)(1!)/((2!)(0!)(1!)(0!)(1!)(0!)(0!)(1!)(0!)))((4.345/100)^2)((83.789/100)^0) ((9.501/100)^1)((2.365/100)^0)((99.757/100)^1)((0.038/100)^0)((0.205/100)^0)((75.78/100)^1)((24.22/100)^0)=4.068×10^(−4)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)+(34.968853)(1)+(36.965903)(0)=203.797

4. (Cr-50)(Cr-50)(Cr-54)(O-16)(Cl-35), (aCr-50)=2,(aCr-52)=0,(aCr-53)=0,(aCr-54)=1,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((2!)(0!)(0!)(1!)(1!)(0!)(0!)(1!)(0!)))((4.345/100)^2)((83.789/100)^0) ((9.501/100)^0)((2.365/100)^1)((99.757/100)^1)((0.038/100)^0)((0.205/100)^0) ((75.78/100)^1)((24.22/100)^0)=1.013×10^(−4)

the relative molecular mass of the isotopic combination being M=(49.946046)(2)+(51.940510)(0)+(52.940651)(0)+(53.938883)(1)+(15.994915)(1)+(16.999131)(0)+(17.999160)(0)+(34.968853)(1)+(36.965903)(0)=204.795

5. (Cr-50)(Cr-52)(Cr-52)(O-16)(Cl-35), (aCr-50)=1,(aCr-52)=2,(aCr-53)=0,(aCr-54)=0,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((1!)(2!)(0!)(0!)(1!)(0!)(0!)(1!)(0!)))((4.345/100)^1)((83.789/100)^2) ((9.501/100)^0)((2.365/100)^0)((99.757/100)^1)((0.038/100)^0)((0.205/100)^0) ((75.78/100)^1)((24.22/100)^0)=6.918×10^(−2)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)+(34.968853)(1)+(36.965903)(0)=204.791

6. (Cr-50)(Cr-52)(Cr-53)(O-16)(Cl-35), (aCr-50)=1,(aCr-52)=1,(aCr-53)=,(aCr-54)=0,(aO-16)=1,(aO-17)=0,(aO-18)= 0,(aCl-35)=1,(aCl-37)=0 with the probability of finding this isotopic combination in a beam of $Cr_3OCl$ being p=((3!)(1!)(1!)/((1!)(1!)(1!)(0!)(1!)(0!)(0!)(1!)(0!)))((4.345/100)^1)((83.789/100)^1) ((9.501/100)^1)((2.365/100)^0)((99.757/100)^1)((0.038/100)^0)((0.205/100)^0) ((75.78/100)^1)((24.22/100)^0)=1.569×10^(−2)

the relative molecular mass of the isotopic combination being M=(49.946046)(1)+(51.940510)(1)+(52.940651)(1)+(53.938883)(0)+(15.994915)(1)+(16.999131)(0)+(17.999160)(0)+(34.968853)(1)+(36.965903)(0)=205.791

7. (Cr-50)(Cr-52)(Cr-54)(O-16)(Cl-35), (aCr-50)=1,(aCr-52)=1,(aCr-53)=0,(aCr-54)=1,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((1!)(1!)(0!)(1!)(1!)(0!)(0!)(1!)(0!)))((4.345/100)^1)((83.789/100)^1) ((9.501/100)^0)((2.365/100)^1)((99.757/100)^1)((0.038/100)^0)((0.205/100)^0) ((75.78/100)^1)((24.22/100)^0)=3.905×10^(−3)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)+(34.968853)(1)+(36.965903)(0)=206.789

8. (Cr-50)(Cr-53)(Cr-53)(O-16)(Cl-35), (aCr-50)=1,(aCr-52)=0,(aCr-53)=2,(aCr-54)=0,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((1!)(0!)(2!)(0!)(1!)(0!)(0!)(1!)(0!)))((4.345/100)^1)((83.789/100)^0) ((9.501/100)^2)((2.365/100)^0)((99.757/100)^1)((0.038/100)^0)((0.205/100)^0) ((75.78/100)^1)((24.22/100)^0)=8.895×10^(−4)

the relative molecular mass of the isotopic combination being M=(49.946046)(1)+(51.940510)(0)+(52.940651)(2)+(53.938883)(0)+(15.994915)(1)+(16.999131)(0)+(17.999160)(0)+(34.968853)(1)+(36.965903)(0)=206.791

9. (Cr-50)(Cr-53)(Cr-54)(O-16)(Cl-35), (aCr-50)=1,(aCr-52)=0,(aCr-53)=1,(aCr-54)=1,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((1!)(0!)(1!)(1!)(1!)(0!)(0!)(1!)(0!)))((4.345/100)^1)((83.789/100)^0) ((9.501/100)^1)((2.365/100)^1)((99.757/100)^1)((0.038/100)^0)((0.205/100)^0) ((75.78/100)^1)((24.22/100)^0)=4.428×10^(−4)

the relative molecular mass of the isotopic combination being M=(49.946046)(1)+(51.940510)(0)+(52.940651) (1)+(53.938883)(1)+(15.994915)(1)+(16.999131)(0)+(17.999160)(0)+(34.968853)(1)+(36.965903)(0)=207.789

10. (Cr-50)(Cr-54)(Cr-54)(O-16)(Cl-35), (aCr-50)=1,(aCr-52)=0,(aCr-53)=0,(aCr-54)=2,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((1!)(0!)(0!)(2!)(1!)(0!)(0!)(1!)(0!)))((4.345/100)^1)((83.789/100)^0) ((9.501/100)^0)((2.365/100)^2)((99.757/100)^1)((0.038/100)^0)((0.205/100)^0) ((75.78/100)^1)((24.22/100)^0)=5.512×10^(−5)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)+(34.968853)(1)+(36.965903)(0)=208.788

11. (Cr-52)(Cr-52)(Cr-52)(O-16)(Cl-35), (aCr-50)=0,(aCr-52)=3,(aCr-53)=0,(aCr-54)=0,(aO-16)=1,(aO-17)=0,(aO-18)=0,(aCl-35)=1,(aCl-37)=0 with the probability of finding this isotopic combination in a beam of $Cr_3OCl$ being p=((3!)(1!)(1!)/((0!)(3!)(0!)(0!)(1!)(0!)(0!)(1!)(0!)))((4.345/100)^0)((83.789/100)^3) ((9.501/100)^0)((2.365/100)^0)((99.757/100)^1)((0.038/100)^0)((0.205/100)^0) ((75.78/100)^1)((24.22/100)^0)=0.4447 the relative molecular mass of the isotopic combination being M=(49.946046)(0)+(51.940510)(3)+(52.940651)(0)+

(53.938883)(0)+(15.994915)(1)+(16.999131)(0)+(17.999160)(0)+(34.968853)(1)+(36.965903)(0)=206.785

12. (Cr-52)(Cr-52)(Cr-53)(O-16)(Cl-35), (aCr-50)=0, (aCr-52)=2,(aCr-53)=1,(aCr-54)=0,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(2!)(1!)(0!)(1!)(0!)(0!)(1!)(0!)))((4.345/100)^0)((83.789/100)^2) ((9.501/100)^1)((2.365/100)^0)((99.757/100)^1)((0.038/100)^0)((0.205/100)^0) ((75.78/100)^1)((24.22/100)^0)=0.1513 the relative molecular mass of the isotopic combination being M=(49.946046)(0)+(51.940510)(2)+(52.940651)(1)+(53.938883)(0)+(15.994915)(1)+(16.999131)(0)+(17.999160)(0)+(34.968853)(1)+(36.965903)(0)=207.785

13. (Cr-52)(Cr-52)(Cr-54)(O-16)(Cl-35), (aCr-50)=0, (aCr-52)=2,(aCr-53)=0,(aCr-54)=1,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(2!)(0!)(1!)(1!)(0!)(0!)(1!)(0!)))((4.345/100)^0)((83.789/100)^2) ((9.501/100)^0)((2.365/100)^1)((99.757/100)^1)((0.038/100)^0)((0.205/100)^0) ((75.78/100)^1)((24.22/100)^0)=3.766×10^(−2)

the relative molecular mass of the isotopic combination being M=(49.946046)(0)+(51.940510)(2)+(52.940651)(0)+(53.938883)(1)+(15.994915)(1)+(16.999131)(0)+(17.999160)(0)+(34.968853)(1)+(36.965903)(0)=208.784

14. (Cr-52)(Cr-53)(Cr-53)(O-16)(Cl-35), (aCr-50)=0, (aCr-52)=1,(aCr-53)=2,(aCr-54)=0,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(1!)(2!)(0!)(1!)(0!)(0!)(1!)(0!)))((4.345/100)^0)((83.789/100)^1)((9.501/100)^2)((2.365/100)^0)((99.757/100)^1)((0.038/100)^0)((0.205/100)^0)((75.78/100)^1)((24.22/100)^0)=1.715×10^(−2)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)+(34.968853)(1)+(36.965903)(0)=208.786

15. (Cr-52)(Cr-53)(Cr-54)(O-16)(Cl-35), (aCr-50)=0, (aCr-52)=1,(aCr-53)=1,(aCr-54)=1,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(1!)(1!)(1!)(1!)(0!)(0!)(1!)(0!)))((4.345/100)^0)((83.789/100)^1) ((9.501/100)^1)((2.365/100)^1)((99.757/100)^1)((0.038/100)^0)((0.205/100)^0) ((75.78/100)^1)((24.22/100)^0)=8.540×10^(−3)

the relative molecular mass of the isotopic combination being M=(49.946046)(0)+(51.940510)(1)+(52.940651)(1)+(53.938883)(1)+(15.994915)(1)+(16.999131)(0)+(17.999160)(0)+(34.968853)(1)+(36.965903)(0)=209.784

16. (Cr-52)(Cr-54)(Cr-54)(O-16)(Cl-35), (aCr-50)=0, (aCr-52)=1,(aCr-53)=0,(aCr-54)=2,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(1!)(0!)(2!)(1!)(0!)(0!)(1!)(0!)))((4.345/100)^0)((83.789/100)^1) ((9.501/100)^0)((2.365/100)^2)((99.757/100)^1)((0.038/100)^0)((0.205/100)^0) ((75.78/100)^1)((24.22/100)^0)=1.063×10^(−3)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)+(34.968853)(1)+(36.965903)(0)=210.782

17. (Cr-53)(Cr-53)(Cr-53)(O-16)(Cl-35), (aCr-50)=0, (aCr-52)=0,(aCr-53)=3,(aCr-54)=0,(aO-16)=1,(aO-17)=0, (aO-18)=0,(aCl-35)=,(aCl-37)=0 with the probability of finding this isotopic combination in a beam of $Cr_3OCl$ being p=((3!)(1!)(1!)/((0!)(0!)(3!)(0!)(1!)(0!)(0!)(1!)(0!)))((4.345/100)^0)((83.789/100)^0) ((9.501/100)^3)((2.365/100)^0)((99.757/100)^1)((0.038/100)^0)((0.205/100)^0) ((75.78/100)^1)((24.22/100)^0)=6.483×10^(−4)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)+(34.968853)(1)+(36.965903)(0)=209.786

18. (Cr-53)(Cr-53)(Cr-54)(O-16)(Cl-35), (aCr-50)=0, (aCr-52)=0,(aCr-53)=2,(aCr-54)=1,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(0!)(2!)(1!)(1!)(0!)(0!)(1!)(0!)))((4.345/100)^0)((83.789/100)^0) ((9.501/100)^2)((2.365/100)^1)((99.757/100)^1)((0.038/100)^0)((0.205/100)^0) ((75.78/100)^1)((24.22/100)^0)=4.842×10^(−4)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)+(34.968853)(1)+(36.965903)(0)=210.784

19. (Cr-53)(Cr-54)(Cr-54)(O-16)(Cl-35), (aCr-50)=0, (aCr-52)=0,(aCr-53)=1,(aCr-54)=2,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(0!)(1!)(2!)(1!)(0!)(0!)(1!)(0!)))((4.345/100)^0)((83.789/100)^0) ((9.501/100)^1)((2.365/100)^2)((99.757/100)^1)((0.038/100)^0)((0.205/100)^0) ((75.78/100)^1)((24.22/100)^0)=1.205×10^(−4)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)+(34.968853)(1)+(36.965903)(0)=211.782

20. (Cr-54)(Cr-54)(Cr-54)(O-16)(Cl-35),(aCr-50)=0, (aCr-52)=0,(aCr-53)=0,(aCr-54)=3,(aO-16)=1,(aO-17)=0, (aO-18)=0,(aCl-35)=1,(aCl-37)=0 with the probability of finding this isotopic combination in a beam of $Cr_3OCl$ being p=((3!)(1!)(1!)/((0!)(0!)(0!)(3!)(1!)(0!)(0!)(1!)(0!)))((4.345/100)^0)((83.789/100)^0) ((9.501/100)^0)((2.365/100)^3)((99.757/100)^1)((0.038/100)^0)((0.205/100)^0) ((75.78/100)^1)((24.22/100)^0)=1.000×10^(−5)

the relative molecular mass of the isotopic combination being M=(49.946046)(0)+(51.940510)(0)+(52.940651)(0)+(53.938883)(3)+(15.994915)(1)+(16.999131)(0)+(17.999160)(0)+(34.968853)(1)+(36.965903)(0)=212.780

21. (Cr-50)(Cr-50)(Cr-50)(O-17)(Cl-35), (aCr-50)=3, (aCr-52)=0,(aCr-53)=0,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((3!)(0!)(0!)(0!)(0!)(1!)(0!)(1!)(0!)))((4.345/100)^3)((83.789/100)^0) ((9.501/

100)^0)((2.365/100)^0)((99.757/100)^0)((0.038/100)^1) ((0.205/100)^0) ((75.78/100)^1)((24.22/100)^0)=2.4×10^(−8)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)+(34.968853)(1)+(36.965903)(0)=201.806

22. (Cr-50)(Cr-50)(Cr-52)(O-17)(Cl-35), (aCr-50)=2, (aCr-52)=1,(aCr-53)=0,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((2!)(1!)(0!)(0!)(0!)(1!)(0!)(1!)(0!)))((4.345/100)^2)((83.789/100)^1) ((9.501/100)^0)((2.365/100)^0)((99.757/100)^0)((0.038/100)^1) ((0.205/100)^0) ((75.78/100)^1)((24.22/100)^0)=1.4×10^(−6)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)+(34.968853)(1)+(36.965903)(0)=203.801

23. (Cr-50)(Cr-50)(Cr-53)(O-17)(Cl-35), (aCr-50)=2, (aCr-52)=0,(aCr-53)=,(aCr-54)=0,(aO-16)=0,(aO-17)=i, (aO-18)=0,(aCl-35)=1,(aCl-37)=0 with the probability of finding this isotopic combination in a beam of $Cr_3OCl$ being p=((3!)(1!)(1!)/((2!)(0!)(1!)(0!)(0!)(1!)(0!)(1!)(0!)))((4.345/100)^2)((83.789/100)^0) ((9.501/100)^1)((2.365/100)^0)((99.757/100)^0)((0.038/100)^1) ((0.205/100)^0) ((75.78/100)^1)((24.22/100)^0)=1 0.5×10^(−7)

the relative molecular mass of the isotopic combination being M=(49.946046)(2)+(51.940510)(0)+(52.940651) (1)+(53.938883)(0)+(15.994915)(0)+(16.999131)(1)+(17.999160)(0)+(34.968853)(1)+(36.965903)(0)=204.801

24. (Cr-50)(Cr-50)(Cr-54)(O-17)(Cl-35), (aCr-50)=2, (aCr-52)=0,(aCr-53)=0,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((2!)(0!)(0!)(1!)(0!)(1!)(0!)(1!)(0!)))((4.345/100)^2)((83.789/100)^0) ((9.501/100)^0)((2.365/100)^1)((99.757/100)^0)((0.038/100)^1) ((0.205/100)^0) ((75.78/100)^1)((24.22/100)^0)=3.9×10^(−8)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)+(34.968853)(1)+(36.965903)(0)=205.799

25. (Cr-50)(Cr-52)(Cr-52)(O-17)(Cl-35), (aCr-50)=1, (aCr-52)=2,(aCr-53)=0,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(2!)(0!)(0!)(0!)(1!)(0!)(1!)(0!)))((4.345/100)^1)((83.789/100)^2) ((9.501/100)^0)((2.365/100)^0)((99.757/100)^0)((0.038/100)^1) ((0.205/100)^0) ((75.78/100)^1)((24.22/100)^0)=2.6×10^(−5)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)+(34.968853)(1)+(36.965903)(0)=205.795

26. (Cr-50)(Cr-52)(Cr-53)(O-17)(Cl-35), (aCr-50)=1, (aCr-52)=1,(aCr-53)=1,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(1!)(1!)(0!)(0!)(1!)(0!)(1!)(0!)))((4.345/100)^1)((83.789/100)^1) ((9.501/100)^1)((2.365/100)^0)((99.757/100)^0)((0.038/100)^1) ((0.205/100)^0) ((75.78/100)^1)((24.22/100)^0)=6.0×10^(−6)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)+(34.968853)(1)+(36.965903)(0)=206.795

27. (Cr-50)(Cr-52)(Cr-54)(O-17)(Cl-35), (aCr-50)=1, (aCr-52)=1,(aCr-53)=0,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(1!)(0!)(1!)(0!)(1!)(0!)(1!)(0!)))((4.345/100)^1)((83.789/100)^1) ((9.501/100)^0)((2.365/100)^1)((99.757/100)^0)((0.038/100)^1) ((0.205/100)^0)((75.78/100)^1)((24.22/100)^0)=1.5×10^(−6)

the relative molecular mass of the isotopic combination being M=(49.946046)(1)+(51.940510)(1)+(52.940651)(0)+(53.938883)(1)+(15.994915)(0)+(16.999131)(1)+(17.999160)(0)+(34.968853)(1)+(36.965903)(0)=207.793

28. (Cr-50)(Cr-53)(Cr-53)(O-17)(Cl-35), (aCr-50)=1, (aCr-52)=0,(aCr-53)=2,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(0!)(2!)(0!)(0!)(1!)(0!)(1!)(0!)))((4.345/100)^1)((83.789/100)^0) ((9.501/100)^2)((2.365/100)^0)((99.757/100)^0)((0.038/100)^1) ((0.205/100)^0) ((75.78/100)^1)((24.22/100)^0)=3.4×10^(−7)

the relative molecular mass of the isotopic combination being M=(49.946046)(1)+(51.940510)(0)+(52.940651) (2)+(53.938883)(0)+(15.994915)(0)+(16.999131)(1)+(17.999160)(0)+(34.968853)(1)+(36.965903)(0)=207.795

29. (Cr-50)(Cr-53)(Cr-54)(O-17)(Cl-35), (aCr-50)=1, (aCr-52)=0,(aCr-53)=1,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(0!)(1!)(1!)(0!)(1!)(0!)(1!)(0!)))((4.345/100)^1)((83.789/100)^0) ((9.501/100)^1)((2.365/100)^1)((99.757/100)^0)((0.038/100)^1) ((0.205/100)^0)((75.78/100)^1)((24.22/100)^0)=1.7×10^(−7)

the relative molecular mass of the isotopic combination being M=(49.946046)(1)+(51.940510)(0)+(52.940651)(1)+(53.938883)(1)+(15.994915)(0)+(16.999131)(1)+(17.999160)(0)+(34.968853)(1)+(36.965903)(0)=208.794

30. (Cr-50)(Cr-54)(Cr-54)(O-17)(Cl-35), (aCr-50)=1, (aCr-52)=0,(aCr-53)=0,(aCr-54)=2,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((1!)(0!)(0!)(2!)(0!)(1!)(0!)(1!)(0!)))((4.345/100)^1)((83.789/100)^0) ((9.501/100)^0)((2.365/100)^2)((99.757/100)^0)((0.038/100)^1) ((0.205/100)^0) ((75.78/100)^1)((24.22/100)^0)=2.1×10^(−8)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)+(34.968853)(1)+(36.965903)(0)=209.792

31. (Cr-52)(Cr-52)(Cr-52)(O-17)(Cl-35), (aCr-50)=0, (aCr-52)=3,(aCr-53)=0,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(3!)(0!)(0!)(0!)(1!)(0!)(1!)(0!)))((4.345/100)^0)((83.789/100)^3) ((9.501/100)^0)((2.365/100)^0)((99.757/100)^0)((0.038/100)^1) ((0.205/100)^0) ((75.78/100)^1)((24.22/100)^0)=1.7×10^(−4)

the relative molecular mass of the isotopic combination being M=(49.946046)(0)+(51.940510)(3)+(52.940651)(0)+(53.938883)(0)+(15.994915)(0)+(16.999131)(1)+(17.999160)(0)+(34.968853)(1)+(36.965903)(0)=207.790

32. (Cr-52)(Cr-52)(Cr-53)(O-17)(Cl-35), (aCr-50)=0, (aCr-52)=2,(aCr-53)=1,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(2!)(1!)(0!)(0!)(1!)(0!)(1!)(0!)))((4.345/100)^0)((83.789/100)^2) ((9.501/100)^1)((2.365/100)^0)((99.757/100)^0)((0.038/100)^1) ((0.205/100)^0) ((75.78/100)^1)((24.22/100)^0)=5.8×10^(−5)

the relative molecular mass of the isotopic combination being M=(49.946046)(0)+(51.940510)(2)+(52.940651)(1)+(53.938883)(0)+(15.994915)(0)+(16.999131)(1)+(17.999160)(0)+(34.968853)(1)+(36.965903)(0)=208.790

33. (Cr-52)(Cr-52)(Cr-54)(O-17)(Cl-35), (aCr-50)=0, (aCr-52)=2,(aCr-53)=0,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(2!)(0!)(1!)(0!)(1!)(0!)(1!)(0!)))((4.345/100)^0)((83.789/100)^2) ((9.501/100)^0)((2.365/100)^1)((99.757/100)^0)((0.038/100)^1) ((0.205/100)^0) ((75.78/100)^1)((24.22/100)^0)=1.4×10^(−5)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)+(34.968853)(1)+(36.965903)(0)=209.788

34. (Cr-52)(Cr-53)(Cr-53)(O-17)(Cl-35), (aCr-50)=0, (aCr-52)=1,(aCr-53)=2,(aCr-54)=0,(aO-16)=0,(aO-17)=, (aO-18)=0,(aCl-35)=,(aCl-37)=0 with the probability of finding this isotopic combination in a beam of $Cr_3OCl$ being p=((3!)(1!)(1!)/((0!)(1!)(2!)(0!)(0!)(1!)(0!)(1!)(0!)))((4.345/100)^0)((83.789/100)^1) ((9.501/100)^2)((2.365/100)^0)((99.757/100)^0)((0.038/100)^1) ((0.205/100)^0) ((75.78/100)^1)((24.22/100)^0)=6.5×10^(−6)

the relative molecular mass of the isotopic combination being M=(49.946046)(0)+(51.940510)(1)+(52.940651)(2)+(53.938883)(0)+(15.994915)(0)+(16.999131)(1)+(17.999160)(0)+(34.968853)(1)+(36.965903)(0)=209.790

35. (Cr-52)(Cr-53)(Cr-54)(O-17)(Cl-35), (aCr-50)=0, (aCr-52)=1,(aCr-53)=1,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(1!)(1!)(1!)(0!)(1!)(0!)(1!)(0!)))((4.345/100)^0)((83.789/100)^1) ((9.501/100)^1)((2.365/100)^1)((99.757/100)^0)((0.038/100)^1) ((0.205/100)^0) ((75.78/100)^1)((24.22/100)^0)=3.3×10^(−6)

the relative molecular mass of the isotopic combination being M=(49.946046)(0)+(51.940510)(1)+(52.940651)(1)+(53.938883)(1)+(15.994915)(0)+(16.999131)(1)+(17.999160)(0)+(34.968853)(1)+(36.965903)(0)=210.788

36. (Cr-52)(Cr-54)(Cr-54)(O-17)(Cl-35), (aCr-50)=0, (aCr-52)=1,(aCr-53)=0,(aCr-54)=2,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(1!)(0!)(2!)(0!)(1!)(0!)(1!)(0!)))((4.345/100)^0)((83.789/100)^1) ((9.501/100)^0)((2.365/100)^2)((99.757/100)^0)((0.038/100)^1) ((0.205/100)^0) ((75.78/100)^1)((24.22/100)^0)=4.0×10^(−7)

the relative molecular mass of the isotopic combination being M=(49.946046)(0)+(51.940510)(1)+(52.940651)(0)+(53.938883)(2)+(15.994915)(0)+(16.999131)(1)+(17.999160)(0)+(34.968853)(1)+(36.965903)(0)=211.786

37. (Cr-53)(Cr-53)(Cr-53)(O-17)(Cl-35), (aCr-50)=0, (aCr-52)=0,(aCr-53)=3,(aCr-54)=0,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(0!)(3!)(0!)(0!)(1!)(0!)(1!)(0!)))((4.345/100)^0)((83.789/100)^0) ((9.501/100)^3)((2.365/100)^0)((99.757/100)^0)((0.038/100)^1) ((0.205/100)^0) ((75.78/100)^1)((24.22/100)^0)=2.5×10^(−7)

the relative molecular mass of the isotopic combination being M=(49.946046)(0)+(51.940510)(0)+(52.940651)(3)+(53.938883)(0)+(15.994915)(0)+(16.999131)(1)+(17.999160)(0)+(34.968853)(1)+(36.965903)(0)=210.790

38. (Cr-53)(Cr-53)(Cr-54)(O-17)(Cl-35), (aCr-50)=0, (aCr-52)=0,(aCr-53)=2,(aCr-54)=1,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(0!)(2!)(1!)(0!)(1!)(0!)(1!)(0!)))((4.345/100)^0)((83.789/100)^0) ((9.501/100)^2)((2.365/100)^1)((99.757/100)^0)((0.038/100)^1) ((0.205/100)^0) ((75.78/100)^1)((24.22/100)^0)=1.8×10^(−7)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)+(34.968853)(1)+(36.965903)(0)=211.788

39. (Cr-53)(Cr-54)(Cr-54)(O-17)(Cl-35), (aC r-50)=0, (aCr-52)=0,(aCr-53)=1,(aCr-54)=2,(aO-16)=0,(aO-17)=1, (aO-18)=0,(aCl-35)=1,(aCl-37)=0 with the probability of finding this isotopic combination in a beam of $Cr_3OCl$ being p=((3!)(1!)(1!)/((0!)(0!)(1!)(2!)(0!)(1!)(0!)(1!)(0!)))((4.345/100)^0)((83.789/100)^0) ((9.501/100)^1)((2.365/100)^2)((99.757/100)^0)((0.038/100)^1) ((0.205/100)^0) ((75.78/100)^1)((24.22/100)^0)=4.6×10^(−8)

the relative molecular mass of the isotopic combination being M=(49.946046)(0)+(51.940510)(0)+(52.940651)(1)+(53.938883)(2)+(15.994915)(0)+(16.999131)(1)+(17.999160)(0)+(34.968853)(1)+(36.965903)(0)=212.786

40. (Cr-54)(Cr-54)(Cr-54)(O-17)(Cl-35), (aCr-50)=0, (aCr-52)=0,(aCr-53)=0,(aCr-54)=3,(aO-16)=0,(aO-17)=, (aO-18)=0,(aCl-35)=1,(aCl-37)=0 with the probability of finding this isotopic combination in a beam of $Cr_3OCl$ being p=((3!)(1!)(1!)/((0!)(0!)(0!)(3!)(0!)(1!)(0!)(1!)(0!)))((4.345/100)^0)((83.789/100)^0) ((9.501/100)^0)((2.365/100)^3)((99.757/100)^0)((0.038/100)^1) ((0.205/100)^0) ((75.78/100)^1)((24.22/100)^0)=3.8×10^(−9)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)+(34.968853)(1)+(36.965903)(0)=213.785

41. (Cr-50)(Cr-50)(Cr-50)(O-18)(Cl-35), (aCr-50)=3, (aCr-52)=0,(aCr-53)=0,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((3!)(0!)(0!)(0!)(0!)(0!)(1!)(1!)(0!)))((4.345/100)^3)((83.789/100)^0) ((9.501/100)^0)((2.365/100)^0)((99.757/100)^0)((0.038/100)^0)((0.205/100)^1) ((75.78/100)^1)((24.22/100)^0)=1.27×10^(−7)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)+(34.968853)(1)+(36.965903)(0)=202.806

42. (Cr-50)(Cr-50)(Cr-52)(O-18)(Cl-35), (aCr-50)=2, (aCr-52)=1,(aCr-53)=0,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((2!)(1!)(0!)(0!)(0!)(0!)(1!)(1!)(0!)))((4.345/100)^2)((83.789/100)^1) ((9.501/100)^0)((2.365/100)^0)((99.757/100)^0)((0.038/100)^0)((0.205/100)^1) ((75.78/100)^1)((24.22/100)^0)=7.37×10^(−6)

the relative molecular mass of the isotopic combination being M=(49.946046)(2)+(51.940510)(1)+(52.940651)(0)+(53.938883)(0)+(15.994915)(0)+(16.999131)(0)+(17.999160)(1)+(34.968853)(1)+(36.965903)(0)=204.801

43. (Cr-50)(Cr-50)(Cr-53)(O-18)(Cl-35), (aCr-50)=2, (aCr-52)=0,(aCr-53)=,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((2!)(0!)(1!)(0!)(0!)(0!)(1!)(1!)(0!)))((4.345/100)^2)((83.789/100)^0) ((9.501/100)^1)((2.365/100)^0)((99.757/100)^0)((0.038/100)^0)((0.205/100)^1) ((75.78/100)^1)((24.22/100)^0)=8.36×10^(−7)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)+(34.968853)(1)+(36.965903)(0)=205.801

44. (Cr-50)(Cr-50)(Cr-54)(O-18)(Cl-35), (aCr-50)=2, (aCr-52)=0,(aCr-53)=0,(aCr-54)=1,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((2!)(0!)(0!)(1!)(0!)(0!)(1!)(1!)(0!)))((4.345/100)^2)((83.789/100)^0) ((9.501/100)^0)((2.365/100)^1)((99.757/100)^0)((0.038/100)^0)((0.205/100)^1) ((75.78/100)^1)((24.22/100)^0)=2.08×10^(−7)

the relative molecular mass of the isotopic combination being M=(49.946046)(2)+(51.940510)(0)+(52.940651)(0)+(53.938883)(1)+(15.994915)(0)+(16.999131)(0)+(17.999160)(1)+(34.968853)(1)+(36.965903)(0)=206.799

45. (Cr-50)(Cr-52)(Cr-52)(O-18)(Cl-35), (aCr-50)=1, (aCr-52)=2,(aCr-53)=0,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((1!)(2!)(0!)(0!)(0!)(0!)(1!)(1!)(0!)))((4.345/100)^1)((83.789/100)^2) ((9.501/100)^0)((2.365/100)^0)((99.757/100)^0)((0.038/100)^0)((0.205/100)^1) ((75.78/100)^1)((24.22/100)^0)=1.42×10^(−4)

the relative molecular mass of the isotopic combination being M=(49.946046)(1)+(51.940510)(2)+(52.940651)(0)+(53.938883)(0)+(15.994915)(0)+(16.999131)(0)+(17.999160)(1)+(34.968853)(1)+(36.965903)(0)=206.795

46. (Cr-50)(Cr-52)(Cr-53)(O-18)(Cl-35), (aCr-50)=1, (aCr-52)=1,(aCr-53)=,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((1!)(1!)(1!)(0!)(0!)(0!)(1!)(1!)(0!)))((4.345/100)^1)((83.789/100)^1) ((9.501/100)^1)((2.365/100)^0)((99.757/100)^0)((0.038/100)^0)((0.205/100)^1) ((75.78/100)^1)((24.22/100)^0)=3.22×10^(−5)

the relative molecular mass of the isotopic combination being M=(49.946046)(1)+(51.940510)(1)+(52.940651)(1)+(53.938883)(0)+(15.994915)(0)+(16.999131)(0)+(17.999160)(1)+(34.968853)(1)+(36.965903)(0)=207.795

47. (Cr-50)(Cr-52)(Cr-54)(O-18)(Cl-35), (aCr-50)=1, (aCr-52)=1,(aCr-53)=0,(aCr-54)=1,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((1!)(1!)(0!)(1!)(0!)(0!)(1!)(1!)(0!)))((4.345/100)^1)((83.789/100)^1) ((9.501/100)^0)((2.365/100)^1)((99.757/100)^0)((0.038/100)^0)((0.205/100)^1) ((75.78/100)^1)((24.22/100)^0)=8.03×10^(−6)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)+(34.968853)(1)+(36.965903)(0)=208.793

48. (Cr-50)(Cr-53)(Cr-53)(O-18)(Cl-35), (aCr-50)=1, (aCr-52)=0,(aCr-53)=2,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((1!)(0!)(2!)(0!)(0!)(0!)(1!)(1!)(0!)))((4.345/100)^1)((83.789/100)^0) ((9.501/100)^2)((2.365/100)^0)((99.757/100)^0)((0.038/100)^0)((0.205/100)^1) ((75.78/100)^1)((24.22/100)^0)=1.83×10^(−6)

the relative molecular mass of the isotopic combination being M=(49.946046)(1)+(51.940510)(0)+(52.940651)(2)+(53.938883)(0)+(15.994915)(0)+(16.999131)(0)+(17.999160)(1)+(34.968853)(1)+(36.965903)(0)=208.795

49. (Cr-50)(Cr-53)(Cr-54)(O-18)(Cl-35), (aCr-50)=1, (aCr-52)=0,(aCr-53)=1,(aCr-54)=1,(aO-16)=0,(aO-17)=0, (aO-18)=1,(aCl-35)=,(aCl-37)=0 with the probability of finding this isotopic combination in a beam of $Cr_3OCl$ being p=((3!)(1!)(1!)/((1!)(0!)(1!)(1!)(0!)(0!)(1!)(1!)(0!)))((4.345/100)^1)((83.789/100)^0) ((9.501/100)^1)((2.365/100)^1)((99.757/100)^0)((0.038/100)^0)((0.205/100)^1) ((75.78/100)^1)((24.22/100)^0)=9.10×10^(−7)

the relative molecular mass of the isotopic combination being M=(49.946046)(1)+(51.940510)(0)+(52.940651)(1)+(53.938883)(1)+(15.994915)(0)+(16.999131)(0)+(17.999160)(1)+(34.968853)(1)+(36.965903)(0)=209.794

50. (Cr-50)(Cr-54)(Cr-54)(O-18)(Cl-35), (aCr-50)=1, (aCr-52)=0,(aCr-53)=0,(aCr-54)=2,(aO-16)=0,(aO-17)=0, (aO-18)=,(aCl-35)=1,(aCl-37)=0 with the probability of finding this isotopic combination in a beam of $Cr_3OCl$ being p=((3!)(1!)(1!)/((1!)(0!)(0!)(2!)(0!)(0!)(1!)(1!)(0!)))((4.345/100)^1)((83.789/100)^0) ((9.501/100)^0)((2.365/100)^2)((99.757/100)^0)((0.038/100)^0)((0.205/100)^1) ((75.78/100)^1)((24.22/100)^0)=1.13×10^(−7)

the relative molecular mass of the isotopic combination being M=(49.946046)(1)+(51.940510)(0)+(52.940651)(0)+(53.938883)(2)+(15.994915)(0)+(16.999131)(0)+(17.999160)(1)+(34.968853)(1)+(36.965903)(0)=210.792

51. (Cr-52)(Cr-52)(Cr-52)(O-18)(Cl-35), (aCr-50)=0, (aCr-52)=3,(aCr-53)=0,(aCr-54)=0,(aO-16)=0,(aO-17)=0, (aO-18)=,(aCl-35)=,(aCl-37)=0 with the probability of finding this isotopic combination in a beam of $Cr_3OCl$ being p=((3!)(1!)(1!)/((0!)(3!)(0!)(0!)(0!)(0!)(1!)(1!)(0!)))((4.345/100)^0)((83.789/100)^3) ((9.501/100)^0)((2.365/100)^0)((99.757/100)^0)((0.038/100)^0)((0.205/100)^1) ((75.78/100)^1)((24.22/100)^0)=9.14×10^(−4)

the relative molecular mass of the isotopic combination being M=(49.946046)(0)+(51.940510)(3)+(52.940651)(0)+(53.938883)(0)+(15.994915)(0)+(16.999131)(0) +(17.999160)(1)+(34.968853)(1)+(36.965903)(0)=208.790

52. (Cr-52)(Cr-52)(Cr-53)(O-18)(Cl-35), (aCr-50)=0, (aCr-52)=2,(aCr-53)=1,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(2!)(1!)(0!)(0!)(0!)(1!)(1!)(0!)))((4.345/100)^0)((83.789/100)^2) ((9.501/100)^1)((2.365/100)^0)((99.757/100)^0)((0.038/100)^0)((0.205/100)^1) ((75.78/100)^1)((24.22/100)^0)=3.11×10^(−4)

the relative molecular mass of the isotopic combination being M=(49.946046)(0)+(51.940510)(2)+(52.940651)(1)+(53.938883)(0)+(15.994915)(0)+(16.999131)(0)+(17.999160)(1)+(34.968853)(1)+(36.965903)(0)=209.790

53. (Cr-52)(Cr-52)(Cr-54)(O-18)(Cl-35), (aCr-50)=0, (aCr-52)=2,(aCr-53)=0,(aCr-54)=1,(aO-16)=0,(aO-17)=0, (aO-18)=,(aCl-35)=1,(aCl-37)=0 with the probability of finding this isotopic combination in a beam of $Cr_3OCl$ being p=((3!)(1!)(1!)/((0!)(2!)(0!)(1!)(0!)(0!)(1!)(1!)(0!)))((4.345/100)^0)((83.789/100)^2) ((9.501/100)^0)((2.365/100)^1)((99.757/100)^0)((0.038/100)^0)((0.205/100)^1) ((75.78/100)^1)((24.22/100)^0)=7.74×10^(−5)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)+(34.968853)(1)+(36.965903)(0)=210.788

54. (Cr-52)(Cr-53)(Cr-53)(O-18)(Cl-35), (aCr-50)=0, (aCr-52)=1,(aCr-53)=2,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(1!)(2!)(0!)(0!)(0!)(1!)(1!)(0!)))((4.345/100)^0)((83.789/100)^1) ((9.501/100)^2)((2.365/100)^0)((99.757/100)^0)((0.038/100)^0)((0.205/100)^1) ((75.78/100)^1)((24.22/100)^0)=3.52×10^(−5)

the relative molecular mass of the isotopic combination being M=(49.946046)(0)+(51.940510)(1)+(52.940651)(2)+(53.938883)(0)+(15.994915)(0)+(16.999131)(0) +(17.999160)(1)+(34.968853)(1)+(36.965903)(0)=210.790

55. (Cr-52)(Cr-53)(Cr-54)(O-18)(Cl-35), (aCr-50)=0, (aCr-52)=1,(aCr-53)=1,(aCr-54)=1,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(1!)(1!)(1!)(0!)(0!)(1!)(1!)(0!)))((4.345/100)^0)((83.789/100)^1) ((9.501/100)^1)((2.365/100)^1)((99.757/100)^0)((0.038/100)^0)((0.205/100)^1) ((75.78/100)^1)((24.22/100)^0)=1.75×10^(−5)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)+(34.968853)(1)+(36.965903)(0)=211.788

56. (Cr-52)(Cr-54)(Cr-54)(O-18)(Cl-35), (aCr-50)=0, (aCr-52)=1,(aCr-53)=0,(aCr-54)=2,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(1!)(0!)(2!)(0!)(0!)(1!)(1!)(0!)))((4.345/100)^0)((83.789/100)^1) ((9.501/100)^0)((2.365/100)^2)((99.757/100)^0)((0.038/100)^0)((0.205/100)^1) ((75.78/100)^1)((24.22/100)^0)=2.18×10^(−6)

the relative molecular mass of the isotopic combination being M=(49.946046)(0)+(51.940510)(1)+(52.940651)(0)+(53.938883)(2)+(15.994915)(0)+(16.999131)(0)+(17.999160)(1)+(34.968853)(1)+(36.965903)(0)=212.786

57. (Cr-53)(Cr-53)(Cr-53)(O-18)(Cl-35), (aCr-50)=0, (aCr-52)=0,(aCr-53)=3,(aCr-54)=0,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(0!)(3!)(0!)(0!)(0!)(1!)(1!)(0!)))((4.345/100)^0)((83.789/100)^0) ((9.501/100)^3)((2.365/100)^0)((99.757/100)^0)((0.038/100)^0)((0.205/100)^1) ((75.78/100)^1)((24.22/100)^0)=1.33×10^(−6)

the relative molecular mass of the isotopic combination being M=(49.946046)(0)+(51.940510)(0)+(52.940651)(3)+(53.938883)(0)+(15.994915)(0)+(16.999131)(0)+(17.999160)(1)+(34.968853)(1)+(36.965903)(0)=211.790

58. (Cr-53)(Cr-53)(Cr-54)(O-18)(Cl-35), (aCr-50)=0, (aCr-52)=0,(aCr-53)=2,(aCr-54)=1,(aO-16)=0,(aO-17)=0, (aO-18)=1,(aCl-35)=1,(aCl-37)=0 with the probability of finding this isotopic combination in a beam of $Cr_3OCl$ being p=((3!)(1!)(1!)/((0!)(0!)(2!)(1!)(0!)(0!)(1!)(1!)(0!)))((4.345/100)^0)((83.789/100)^0) ((9.501/100)^2)((2.365/100)^1)((99.757/100)^0)((0.038/100)^0)((0.205/100)^1) ((75.78/100)^1)((24.22/100)^0)=9.95×10^(−7)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)+(34.968853)(1)+(36.965903)(0)=212.788

59. (Cr-53)(Cr-54)(Cr-54)(O-18)(Cl-35), (aCr-50)=0, (aCr-52)=0,(aCr-53)=1,(aCr-54)=2,(aO-16)=0,(aO-17)=0, (aO-118)=,(aCl-35)=1,(aCl-37)=0 with the probability of finding this isotopic combination in a beam of $Cr_3OCl$ being p=((3!)(1!)(1!)/((0!)(0!)(1!)(2!)(0!)(0!)(1!)(1!)(0!)))((4.345/100)^0)((83.789/100)^0) ((9.501/100)^1)((2.365/100)^2)((99.757/100)^0)((0.038/100)^0)((0.205/100)^1) ((75.78/100)^1)((24.22/100)^0)=2.48×10^(−7)

the relative molecular mass of the isotopic combination being M=(49.946046)(0)+(51.940510)(0)+(52.940651)(1)+(53.938883)(2)+(15.994915)(0)+(16.999131)(0)+(17.999160)(1)+(34.968853)(1)+(36.965903)(0)=213.786

60. (Cr-54)(Cr-54)(Cr-54)(O-18)(Cl-35), (aCr-50)=0, (aCr-52)=0,(aCr-53)=0,(aCr-54)=3,(aO-16)=0,(aO-17)=0, (aO-18)=,(aCl-35)=1,(aCl-37)=0 with the probability of finding this isotopic combination in a beam of $Cr_3OCl$ being p=((3!)(1!)(1!)/((0!)(0!)(0!)(3!)(0!)(0!)(1!)(1!)(0!)))((4.345/100)^0)((83.789/100)^0) ((9.501/100)^0)((2.365/100)^3)((99.757/100)^0)((0.038/100)^0)((0.205/100)^1) ((75.78/100)^1)((24.22/100)^0)=2.05×10^(−8)

the relative molecular mass of the isotopic combination being M=(49.946046)(0)+(51.940510)(0)+(52.940651)(0)+(53.938883)(3)+(15.994915)(0)+(16.999131)(0)+(17.999160)(1)+(34.968853)(1)+(36.965903)(0)=214.785

61. (Cr-50)(Cr-50)(Cr-50)(O-16)(Cl-37), (aCr-50)=3, (aCr-52)=0,(aCr-53)=0,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((3!)(0!)(0!)(0!)(1!)(0!)(0!)(0!)(1!)))((4.345/100)^3)((83.789/100)^0) ((9.501/100)^0)((2.365/100)^0)((99.757/100)^1)((0.038/100)^0)((0.205/100)^0) ((75.78/100)^0)((24.22/100)^1)=1.982×10^(−5)

the relative molecular mass of the isotopic combination being M=(49.946046)(3)+(51.940510)(0)+(52.940651)(0)+(53.938883)(0)+(15.994915)(1)+(16.999131)(0)+(17.999160)(0)+(34.968853)(0)+(36.965903)(1)=202.799

62. (Cr-50)(Cr-50)(Cr-52)(O-16)(Cl-37), (aCr-50)=2, (aCr-52)=1,(aCr-53)=0,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((2!)(1!)(0!)(0!)(1!)(0!)(0!)(0!)(1!)))((4.345/100)^2)((83.789/100)^1) ((9.501/100)^0)((2.365/100)^0)((99.757/100)^1)((0.038/100)^0)((0.205/100)^0) ((75.78/100)^0)((24.22/100)^1)=1.147×10^(−3)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)+(34.968853)(0)+(36.965903)(1)=204.793

63. (Cr-50)(Cr-50)(Cr-53)(O-16)(Cl-37), (aCr-50)=2, (aCr-52)=0,(aCr-53)=1,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((2!)(0!)(1!)(0!)(1!)(0!)(0!)(0!)(1!)))((4.345/100)^2)((83.789/100)^0) ((9.501/100)^1)((2.365/100)^0)((99.757/100)^1)((0.038/100)^0)((0.205/100)^0) ((75.78/100)^0)((24.22/100)^1)=1.300×10^(−4)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)+(34.968853)(0)+(36.965903)(1)=205.794

64. (Cr-50)(Cr-50)(Cr-54)(O-16)(Cl-37), (aCr-50)=2, (aCr-52)=0,(aCr-53)=0,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((2!)(0!)(0!)(1!)(1!)(0!)(0!)(0!)(1!)))((4.345/100)^2)((83.789/100)^0) ((9.501/100)^0)((2.365/100)^1)((99.757/100)^1)((0.038/100)^0)((0.205/100)^0) ((75.78/100)^0)((24.22/100)^1)=3.236×10^(−5)

the relative molecular mass of the isotopic combination being M=(49.946046)(2)+(51.940510)(0)+(52.940651)(0)+(53.938883)(1)+(15.994915)(1)+(16.999131)(0) +(17.999160)(0)+(34.968853)(0)+(36.965903)(1)=206.792

65. (Cr-50)(Cr-52)(Cr-52)(O-16)(Cl-37), (aCr-50)=1, (aCr-52)=2,(aCr-53)=0,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(2!)(0!)(0!)(1!)(0!)(0!)(0!)(1!)))((4.345/100)^1)((83.789/100)^2) ((9.501/100)^0)((2.365/100)^0)((99.757/100)^1)((0.038/100)^0)((0.205/100)^0) ((75.78/100)^0)((24.22/100)^1)=2.211×10^(−2)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)+(34.968853)(0)+(36.965903)(1)=206.788

66. (Cr-50)(Cr-52)(Cr-53)(O-16)(Cl-37), (aCr-50)=1, (aCr-52)=1,(aCr-53)=,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(1!)(1!)(0!)(1!)(0!)(0!)(0!)(1!)))((4.345/100)^1)((83.789/100)^1) ((9.501/100)^1)((2.365/100)^0)((99.757/100)^1)((0.038/100)^0)((0.205/100)^0) ((75.78/100)^0)((24.22/100)^1)=5.014×10^(−3)

the relative molecular mass of the isotopic combination being M=(49.946046)(1)+(51.940510)(1)+(52.940651)(1)+(53.938883)(0)+(15.994915)(1)+(16.999131)(0) +(17.999160)(0)+(34.968853)(0)+(36.965903)(1)=207.788

67. (Cr-50)(Cr-52)(Cr-54)(O-16)(Cl-37), (aCr-50)=1, (aCr-52)=1,(aCr-53)=0,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(1!)(0!)(1!)(1!)(0!)(0!)(0!)(1!)))((4.345/100)^1)((83.789/100)^1) ((9.501/100)^0)((2.365/100)^1)((99.757/100)^1)((0.038/100)^0)((0.205/100)^0) ((75.78/100)^0)((24.22/100)^1)=1.248×10^(−3)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)+(34.968853)(0)+(36.965903)(1)=208.786

68. (Cr-50)(Cr-53)(Cr-53)(O-16)(Cl-37), (aCr-50)=1, (aCr-52)=0,(aCr-53)=2,(aCr-54)=0,(aO-16)=,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(0!)(2!)(0!)(1!)(0!)(0!)(0!)(1!)))((4.345/100)^1)((83.789/100)^0) ((9.501/100)^2)((2.365/100)^0)((99.757/100)^1)((0.038/100)^0)((0.205/100)^0) ((75.78/100)^0)((24.22/100)^1)=2.843×10^(−4)

the relative molecular mass of the isotopic combination being M=(49.946046)(1)+(51.940510)(0)+(52.940651)(2)+(53.938883)(0)+(15.994915)(1)+(16.999131)(0)+(17.999160)(0)+(34.968853)(0)+(36.965903)(1)=208.788

69. (Cr-50)(Cr-53)(Cr-54)(O-16)(Cl-37), (aCr-50)=1, (aCr-52)=0,(aCr-53)=1,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(0!)(1!)(1!)(1!)(0!)(0!)(0!)(1!)))((4.345/100)^1)((83.789/100)^0) ((9.501/100)^1)((2.365/100)^1)((99.757/100)^1)((0.038/100)^0) ((0.205/100)^0) ((75.78/100)^0)((24.22/100)^1)=1.415×10^(−4)

the relative molecular mass of the isotopic combination being M=(49.946046)(1)+(51.940510)(0)+(52.940651)(1)+(53.938883)(1)+(15.994915)(1)+(16.999131)(0)+(17.999160)(0)+(34.968853)(0)+(36.965903)(1)=209.786

70. (Cr-50)(Cr-54)(Cr-54)(O-16)(Cl-37), (aCr-50)=1, (aCr-52)=0,(aCr-53)=0,(aCr-54)=2,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((1!)(0!)(0!)(2!)(1!)(0!)(0!)(0!)(1!)))((4.345/100)^1)((83.789/100)^0) ((9.501/100)^0)((2.365/100)^2)((99.757/100)^1)((0.038/100)^0) ((0.205/100)^0) ((75.78/100)^0)((24.22/100)^1)=1.762×10^(−5)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)+(34.968853)(0)+(36.965903)(1)=210.785

71. (Cr-52)(Cr-52)(Cr-52)(O-16)(Cl-37), (aCr-50)=0, (aCr-52)=3,(aCr-53)=0,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(3!)(0!)(0!)(1!)(0!)(0!)(0!)(1!)))((4.345/100)^0)((83.789/100)^3) ((9.501/100)^0)((2.365/100)^0)((99.757/100)^1)((0.038/100)^0) ((0.205/100)^0) ((75.78/100)^0)((24.22/100)^1)=0.1421 the relative molecular mass of the isotopic combination being M=(49.946046)(0)+(51.940510)(3)+(52.940651)(0)+(53.938883)(0)+(15.994915)(1)+(16.999131)(0) +(17.999160)(0)+(34.968853)(0)+(36.965903)(1)=208.782

72. (Cr-52)(Cr-52)(Cr-53)(O-16)(Cl-37), (aCr-50)=0, (aCr-52)=2,(aCr-53)=1,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(2!)(1!)(0!)(1!)(0!)(0!)(0!)(1!)))((4.345/100)^0)((83.789/100)^2) ((9.501/100)^1)((2.365/100)^0)((99.757/100)^1)((0.038/100)^0) ((0.205/100)^0) ((75.78/100)^0)((24.22/100)^1)=4.835×10^(−2)

the relative molecular mass of the isotopic combination being M=(49.946046)(0)+(51.940510)(2)+(52.940651)(1)+(53.938883)(0)+(15.994915)(1)+(16.999131)(0) +(17.999160)(0)+(34.968853)(0)+(36.965903)(1)=209.782

73. (Cr-52)(Cr-52)(Cr-54)(O-16)(Cl-37), (aCr-50)=0, (aCr-52)=2,(aCr-53)=0,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(2!)(0!)(1!)(1!)(0!)(0!)(0!)(1!)))((4.345/100)^0)((83.789/100)^2) ((9.501/100)^0)((2.365/100)^1)((99.757/100)^1)((0.038/100)^0) ((0.205/100)^0) ((75.78/100)^0)((24.22/100)^1)=1.203×10^(−2)

the relative molecular mass of the isotopic combination being M=(49.946046)(0)+(51.940510)(2)+(52.940651)(0)+(53.938883)(1)+(15.994915)(1)+(16.999131)(0) +(17.999160)(0)+(34.968853)(0)+(36.965903)(1)=210.781

74. (Cr-52)(Cr-53)(Cr-53)(O-16)(Cl-37), (aCr-50)=0, (aCr-52)=1,(aCr-53)=2,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(1!)(2!)(0!)(1!)(0!)(0!)(0!)(1!)))((4.345/100)^0)((83.789/100)^1) ((9.501/100)^2)((2.365/100)^0)((99.757/100)^1)((0.038/100)^0) ((0.205/100)^0) ((75.78/100)^0)((24.22/100)^1)=5.482×10^(−3)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)+(34.968853)(0)+(36.965903)(1)=210.783

75. (Cr-52)(Cr-53)(Cr-54)(O-16)(Cl-37), (aCr-50)=0, (aCr-52)=1,(aCr-53)=1,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(1!)(1!)(1!)(1!)(0!)(0!)(0!)(1!)))((4.345/100)^0)((83.789/100)^1) ((9.501/100)^1)((2.365/100)^1)((99.757/100)^1)((0.038/100)^0) ((0.205/100)^0) ((75.78/100)^0)((24.22/100)^1)=2.729×10^(−3)

the relative molecular mass of the isotopic combination being M=(49.946046)(0)+(51.940510)(1)+(52.940651)(1)+(53.938883)(1)+(15.994915)(1)+(16.999131)(0)+(17.999160)(0)+(34.968853)(0)+(36.965903)(1)=211.781

76. (Cr-52)(Cr-54)(Cr-54)(O-16)(Cl-37), (aCr-50)=0, (aCr-52)=1,(aCr-53)=0,(aCr-54)=2,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(1!)(0!)(2!)(1!)(0!)(0!)(0!)(1!)))((4.345/100)^0)((83.789/100)^1) ((9.501/100)^0)((2.365/100)^2)((99.757/100)^1)((0.038/100)^0) ((0.205/100)^0) ((75.78/100)^0)((24.22/100)^1)=3.397×10^(−4)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)+(34.968853)(0)+(36.965903)(1)=212.779

77. (Cr-53)(Cr-53)(Cr-53)(O-16)(Cl-37), (aCr-50)=0, (aCr-52)=0,(aCr-53)=3,(aCr-54)=0,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(0!)(3!)(0!)(1!)(0!)(0!)(0!)(1!)))((4.345/100)^0)((83.789/100)^0) ((9.501/100)^3)((2.365/100)^0)((99.757/100)^1)((0.038/100)^0) ((0.205/100)^0) ((75.78/100)^0)((24.22/100)^1)=2.072×10^(−4)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)+(34.968853)(0)+(36.965903)(1)=211.783

78. (Cr-53)(Cr-53)(Cr-54)(O-16)(Cl-37), (aCr-50)=0, (aCr-52)=0,(aCr-53)=2,(aCr-54)=1,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(0!)(2!)(1!)(1!)(0!)(0!)(0!)(1!)))((4.345/100)^0)((83.789/100)^0) ((9.501/100)^2)((2.365/100)^1)((99.757/100)^1)((0.038/100)^0) ((0.205/100)^0) ((75.78/100)^0)((24.22/100)^1)=1.547×10^(−4)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)+(34.968853)(0)+(36.965903)(1)=212.781

79. (Cr-53)(Cr-54)(Cr-54)(O-16)(Cl-37), (aCr-50)=0, (aCr-52)=0,(aCr-53)=1,(aCr-54)=2,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(0!)(1!)(2!)(1!)(0!)(0!)(0!)(1!)))((4.345/100)^0)((83.789/100)^0) ((9.501/100)^1)((2.365/100)^2)((99.757/100)^1)((0.038/100)^0)((0.205/100)^0) ((75.78/100)^0)((24.22/100)^1)=3.852×10^(−5)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)+(34.968853)(0)+(36.965903)(1)=213.779

80. (Cr-54)(Cr-54)(Cr-54)(O-16)(Cl-37), (aCr-50)=0, (aCr-52)=0,(aCr-53)=0,(aCr-54)=3,(aO-16)=1,(aO-17)=0, (aO-18)=0,(aCl-35)=0,(aCl-37)=1 with the probability of finding this isotopic combination in a beam of $Cr_3OCl$ being p=((3!)(1!)(1!)/((0!)(0!)(0!)(3!)(1!)(0!)(0!)(0!)(1!)))((4.345/100)^0)((83.789/100)^0) ((9.501/100)^0)((2.365/100)^3)((99.757/100)^1)((0.038/100)^0)((0.205/100)^0) ((75.78/100)^0)((24.22/100)^1)=3.196×10^(−6)

the relative molecular mass of the isotopic combination being M=(49.946046)(0)+(51.940510)(0)+(52.940651)(0)+(53.938883)(3)+(15.994915)(1)+(16.999131)(0) +(17.999160)(0)+(34.968853)(0)+(36.965903)(1)=214.777

81. (Cr-50)(Cr-50)(Cr-50)(O-17)(Cl-37), (aCr-50)=3, (aCr-52)=0,(aCr-53)=0,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((3!)(0!)(0!)(0!)(0!)(1!)(0!)(0!)(1!)))((4.345/100)^3)((83.789/100)^0) ((9.501/100)^0)((2.365/100)^0)((99.757/100)^0)((0.038/100)^1)((0.205/100)^0) ((75.78/100)^0)((24.22/100)^1)=7.5×10^(−9)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)+(34.968853)(0)+(36.965903)(1)=203.803

82. (Cr-50)(Cr-50)(Cr-52)(O-17)(Cl-37), (aCr-50)=2, (aCr-52)=1,(aCr-53)=0,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((2!)(1!)(0!)(0!)(0!)(1!)(0!)(0!)(1!)))((4.345/100)^2)((83.789/100)^1) ((9.501/100)^0)((2.365/100)^0)((99.757/100)^0)((0.038/100)^1)((0.205/100)^0) ((75.78/100)^0)((24.22/100)^1)=4.4×10^(−7)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)+(34.968853)(0)+(36.965903)(1)=205.798

83. (Cr-50)(Cr-50)(Cr-53)(O-17)(Cl-37), (aCr-50)=2, (aCr-52)=0,(aCr-53)=1,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((2!)(0!)(1!)(0!)(0!)(1!)(0!)(0!)(1!)))((4.345/100)^2)((83.789/100)^0) ((9.501/100)^1)((2.365/100)^0)((99.757/100)^0)((0.038/100)^1)((0.205/100)^0) ((75.78/100)^0)((24.22/100)^1)=5.0×10^(−8)

the relative molecular mass of the isotopic combination being M=(49.946046)(2)+(51.940510)(0)+(52.940651)(1)+(53.938883)(0)+(15.994915)(0)+(16.999131)(1)+(17.999160)(0)+(34.968853)(0)+(36.965903)(1)=206.798

84. (Cr-50)(Cr-50)(Cr-54)(O-17)(Cl-37), (aCr-50)=2, (aCr-52)=0,(aCr-53)=0,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((2!)(0!)(0!)(1!)(0!)(1!)(0!)(0!)(1!)))((4.345/100)^2)((83.789/100)^0) ((9.501/100)^0)((2.365/100)^1)((99.757/100)^0)((0.038/100)^1)((0.205/100)^0) ((75.78/100)^0)((24.22/100)^1)=1.2×10^(−8)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)+(34.968853)(0)+(36.965903)(1)=207.796

85. (Cr-50)(Cr-52)(Cr-52)(O-17)(Cl-37), (aCr-50)=1, (aCr-52)=2,(aCr-53)=0,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((1!)(2!)(0!)(0!)(0!)(1!)(0!)(0!)(1!)))((4.345/100)^1)((83.789/100)^2) ((9.501/100)^0)((2.365/100)^0)((99.757/100)^0)((0.038/100)^1)((0.205/100)^0) ((75.78/100)^0)((24.22/100)^1)=8.4×10^(−6)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)+(34.968853)(0)+(36.965903)(1)=207.792

86. (Cr-50)(Cr-52)(Cr-53)(O-17)(Cl-37), (aCr-50)=1, (aCr-52)=1,(aCr-53)=1,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((1!)(1!)(1!)(0!)(0!)(1!)(0!)(0!)(1!)))((4.345/100)^1)((83.789/100)^1) ((9.501/100)^1)((2.365/100)^0)((99.757/100)^0)((0.038/100)^1)((0.205/100)^0) ((75.78/100)^0)((24.22/100)^1)=1.9×10^(−6)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)+(34.968853)(0)+(36.965903)(1)=208.792

87. (Cr-50)(Cr-52)(Cr-54)(O-17)(Cl-37), (aCr-50)=1, (aCr-52)=1,(aCr-53)=0,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((1!)(1!)(0!)(1!)(0!)(1!)(0!)(0!)(1!)))((4.345/100)^1)((83.789/100)^1) ((9.501/100)^0)((2.365/100)^1)((99.757/100)^0)((0.038/100)^1)((0.205/100)^0) ((75.78/100)^0)((24.22/100)^1)=4.8×10^(−7)

the relative molecular mass of the isotopic combination being M=(49.946046)(1)+(51.940510)(1)+(52.940651)(0)+(53.938883)(1)+(15.994915)(0)+(16.999131)(1)+(17.999160)(0)+(34.968853)(0)+(36.965903)(1)=209.790

88. (Cr-50)(Cr-53)(Cr-53)(O-17)(Cl-37), (aCr-50)=1, (aCr-52)=0,(aCr-53)=2,(aCr-54)=0,(aO-16)=0,(aO-17)=, (aO-18)=0,(aCl-35)=0,(aCl-37)=1 with the probability of finding this isotopic combination in a beam of $Cr_3OCl$ being p=((3!)(1!)(1!)/((1!)(0!)(2!)(0!)(0!)(1!)(0!)(0!)(1!)))((4.345/100)^1)((83.789/100)^0) ((9.501/100)^2)((2.365/100)^0)((99.757/100)^0)((0.038/100)^1) ((0.205/100)^0) ((75.78/100)^0)((24.22/100)^1)=1.1×10^(−7)

the relative molecular mass of the isotopic combination being M=(49.946046)(1)+(51.940510)(0)+(52.940651)(2)+(53.938883)(0)+(15.994915)(0)+(16.999131)(1)+(17.999160)(0)+(34.968853)(0)+(36.965903)(1)=209.792

89. (Cr-50)(Cr-53)(Cr-54)(O-17)(Cl-37), (aCr-50)=1, (aCr-52)=0,(aCr-53)=1,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((1!)(0!)(1!)(1!)(0!)(1!)(0!)(0!)(1!)))((4.345/100)^1)((83.789/100)^0) ((9.501/100)^1)((2.365/100)^1)((99.757/100)^0)((0.038/100)^1) ((0.205/100)^0) ((75.78/100)^0)((24.22/100)^1)=5.4×10^(−8)

the relative molecular mass of the isotopic combination being M=(49.946046)(1)+(51.940510)(0)+(52.940651)(1)+(53.938883)(1)+(15.994915)(0)+(16.999131)(1)+(17.999160)(0)+(34.968853)(0)+(36.965903)(1)=210.791

90. (Cr-50)(Cr-54)(Cr-54)(O-17)(Cl-37), (aCr-50)=1, (aCr-52)=0,(aCr-53)=0,(aCr-54)=2,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((1!)(0!)(0!)(2!)(0!)(1!)(0!)(0!)(1!)))((4.345/100)^1)((83.789/100)^0) ((9.501/100)^0)((2.365/100)^2)((99.757/100)^0)((0.038/100)^1) ((0.205/100)^0) ((75.78/100)^0)((24.22/100)^1)=6.7×10^(−9)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)+(34.968853)(0)+(36.965903)(1)=211.789

91. (Cr-52)(Cr-52)(Cr-52)(O-17)(Cl-37), (aCr-50)=0, (aCr-52)=3,(aCr-53)=0,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(3!)(0!)(0!)(0!)(1!)(0!)(0!)(1!)))((4.345/100)^0)((83.789/100)^3) ((9.501/100)^0)((2.365/100)^0)((99.757/100)^0)((0.038/100)^1) ((0.205/100)^0) ((75.78/100)^0)((24.22/100)^1)=5.4×10^(−5)

the relative molecular mass of the isotopic combination being M=(49.946046)(0)+(51.940510)(3)+(52.940651)(0)+(53.938883)(0)+(15.994915)(0)+(16.999131)(1)+(17.999160)(0)+(34.968853)(0)+(36.965903)(1)=209.787

92. (Cr-52)(Cr-52)(Cr-53)(O-17)(Cl-37), (aCr-50)=0, (aCr-52)=2,(aCr-53)=1,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(2!)(1!)(0!)(0!)(1!)(0!)(0!)(1!)))((4.345/100)^0)((83.789/100)^2) ((9.501/100)^1)((2.365/100)^0)((99.757/100)^0)((0.038/100)^1) ((0.205/100)^0) ((75.78/100)^0)((24.22/100)^1)=1.8×10^(−5)

the relative molecular mass of the isotopic combination being M=(49.946046)(0)+(51.940510)(2)+(52.940651)(1)+(53.938883)(0)+(15.994915)(0)+(16.999131)(1)+(17.999160)(0)+(34.968853)(0)+(36.965903)(1)=210.787

93. (Cr-52)(Cr-52)(Cr-54)(O-17)(Cl-37), (aCr-50)=0, (aCr-52)=2,(aCr-53)=0,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(2!)(0!)(1!)(0!)(1!)(0!)(0!)(1!)))((4.345/100)^0)((83.789/100)^2) ((9.501/100)^0)((2.365/100)^1)((99.757/100)^0)((0.038/100)^1) ((0.205/100)^0) ((75.78/100)^0)((24.22/100)^1)=4.6×10^(−6)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)+(34.968853)(0)+(36.965903)(1)=211.785

94. (Cr-52)(Cr-53)(Cr-53)(O-17)(Cl-37), (aCr-50)=0, (aCr-52)=1,(aCr-53)=2,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(1!)(2!)(0!)(0!)(1!)(0!)(0!)(1!)))((4.345/100)^0)((83.789/100)^1) ((9.501/100)^2)((2.365/100)^0)((99.757/100)^0)((0.038/100)^1) ((0.205/100)^0) ((75.78/100)^0)((24.22/100)^1)=2.1×10^(−6)

the relative molecular mass of the isotopic combination being M=(49.946046)(0)+(51.940510)(1)+(52.940651)(2)+(53.938883)(0)+(15.994915)(0)+(16.999131)(1) +(17.999160)(0)+(34.968853)(0)+(36.965903)(1)=211.787

95. (Cr-52)(Cr-53)(Cr-54)(O-17)(Cl-37), (aCr-50)=0, (aCr-52)=1,(aCr-53)=,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(1!)(1!)(1!)(0!)(1!)(0!)(0!)(1!)))((4.345/100)^0)((83.789/100)^1) ((9.501/100)^1)((2.365/100)^1)((99.757/100)^0)((0.038/100)^1) ((0.205/100)^0) ((75.78/100)^0)((24.22/100)^1)=1.0×10^(−6)

the relative molecular mass of the isotopic combination being M=(49.946046)(0)+(51.940510)(1)+(52.940651)(1)+(53.938883)(1)+(15.994915)(0)+(16.999131)(1)+(17.999160)(0)+(34.968853)(0)+(36.965903)(1)=212.785

96. (Cr-52)(Cr-54)(Cr-54)(O-17)(Cl-37), (aCr-50)=0, (aCr-52)=1,(aCr-53)=0,(aCr-54)=2,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(1!)(0!)(2!)(0!)(1!)(0!)(0!)(1!)))((4.345/100)^0)((83.789/100)^1) ((9.501/100)^0)((2.365/100)^2)((99.757/100)^0)((0.038/100)^1) ((0.205/100)^0) ((75.78/100)^0)((24.22/100)^1)=1.3×10^(−7)

the relative molecular mass of the isotopic combination being M=(49.946046)(0)+(51.940510)(1)+(52.940651)(0)+(53.938883)(2)+(15.994915)(0)+(16.999131)(1)+(17.999160)(0)+(34.968853)(0)+(36.965903)(1)=213.783

97. (Cr-53)(Cr-53)(Cr-53)(O-17)(Cl-37), (aCr-50)=0, (aCr-52)=0,(aCr-53)=3,(aCr-54)=0,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(0!)(3!)(0!)(0!)(1!)(0!)(0!)(1!)))((4.345/100)^0)((83.789/100)^0) ((9.501/100)^3)((2.365/100)^0)((99.757/100)^0)((0.038/100)^1) ((0.205/100)^0) ((75.78/100)^0)((24.22/100)^1)=7.9×10^(−8)

the relative molecular mass of the isotopic combination being M=(49.946046)(0)+(51.940510)(0)+(52.940651)(3)+(53.938883)(0)+(15.994915)(0)+(16.999131)(1) + (17.999160)(0)+(34.968853)(0)+(36.965903)(1)=212.787

98. (Cr-53)(Cr-53)(Cr-54)(O-17)(Cl-37), (aCr-50)=0, (aCr-52)=0,(aCr-53)=2,(aCr-54)=1,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(0!)(2!)(1!)(0!)(1!)(0!)(0!)(1!)))((4.345/100)^0)((83.789/100)^0) ((9.501/100)^2)((2.365/100)^1)((99.757/100)^0)((0.038/100)^1)((0.205/100)^0) ((75.78/100)^0)((24.22/100)^1)=5.9×10^(−8)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)+(34.968853)(0)+(36.965903)(1)=213.785

99. (Cr-53)(Cr-54)(Cr-54)(O-17)(Cl-37), (aCr-50)=0, (aCr-52)=0,(aCr-53)=1,(aCr-54)=2,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(0!)(1!)(2!)(0!)(1!)(0!)(0!)(1!)))((4.345/100)^0)((83.789/100)^0) ((9.501/100)^1)((2.365/100)^2)((99.757/100)^0)((0.038/100)^1)((0.205/100)^0) ((75.78/100)^0)((24.22/100)^1)=1.5×10^(−8)

the relative molecular mass of the isotopic combination being M=(49.946046)(0)+(51.940510)(0)+(52.940651)(1)+(53.938883)(2)+(15.994915)(0)+(16.999131)(1) + (17.999160)(0)+(34.968853)(0)+(36.965903)(1)=214.783

100. (Cr-54)(Cr-54)(Cr-54)(O-17)(Cl-37), (aCr-50)=0, (aCr-52)=0,(aCr-53)=0,(aCr-54)=3,(aO-16)=0,(aO-17)=1, (aO-18)=0,(aCl-35)=0,(aCl-37)=1 with the probability of finding this isotopic combination in a beam of $Cr_3OCl$ being p=((3!)(1!)(1!)/((0!)(0!)(0!)(3!)(0!)(1!)(0!)(0!)(1!)))((4.345/100)^0)((83.789/100)^0)((9.501/100)^0)((2.365/100)^3)((99.757/100)^0)((0.038/100)^1)((0.205/100)^0) ((75.78/100)^0)((24.22/100)^1)=1.2×10^(−9)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)+(34.968853)(0)+(36.965903)(1)=215.782

101. (Cr-50)(Cr-50)(Cr-50)(O-18)(Cl-37), (aCr-50)=3, (aCr-52)=0,(aCr-53)=0,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((3!)(0!)(0!)(0!)(0!)(0!)(1!)(0!)(1!)))((4.345/100)^3)((83.789/100)^0)((9.501/100)^0)((2.365/100)^0)((99.757/100)^0)((0.038/100)^0)((0.205/100)^1)((75.78/100)^0)((24.22/100)^1)=4.07×10^(−8)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)+(34.968853)(0)+(36.965903)(1)=204.803

102. (Cr-50)(Cr-50)(Cr-52)(O-18)(Cl-37), (aCr-50)=2, (aCr-52)=1,(aCr-53)=0,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((2!)(1!)(0!)(0!)(0!)(0!)(1!)(0!)(1!)))((4.345/100)^2)((83.789/100)^1)((9.501/100)^0)((2.365/100)^0)((99.757/100)^0)((0.038/100)^0)((0.205/100)^1) ((75.78/100)^0)((24.22/100)^1)=2.36×10^(−6)

the relative molecular mass of the isotopic combination being M=(49.946046)(2)+(51.940510)(1)+(52.940651)(0)+(53.938883)(0)+(15.994915)(0)+(16.999131)(0)+(17.999160)(1)+(34.968853)(0)+(36.965903)(1)=206.798

103. (Cr-50)(Cr-50)(Cr-53)(O-18)(Cl-37), (aCr-50)=2, (aCr-52)=0,(aCr-53)=1,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((2!)(0!)(1!)(0!)(0!)(0!)(1!)(0!)(1!)))((4.345/100)^2)((83.789/100)^0)((9.501/100)^1)((2.365/100)^0)((99.757/100)^0)((0.038/100)^0)((0.205/100)^1) ((75.78/100)^0)((24.22/100)^1)=2.67×10^(−7)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)+(34.968853)(0)+(36.965903)(1)=207.798

104. (Cr-50)(Cr-50)(Cr-54)(O-18)(Cl-37), (aCr-50)=2, (aCr-52)=0,(aCr-53)=0,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((2!)(0!)(0!)(1!)(0!)(0!)(1!)(0!)(1!)))((4.345/100)^2)((83.789/100)^0)((9.501/100)^0)((2.365/100)^1)((99.757/100)^0)((0.038/100)^0)((0.205/100)^1)((75.78/100)^0)((24.22/100)^1)=6.65×10^(−8)

the relative molecular mass of the isotopic combination being M=(49.946046)(2)+(51.940510)(0)+(52.940651)(0)+(53.938883)(1)+(15.994915)(0)+(16.999131)(0)+(17.999160)(1)+(34.968853)(0)+(36.965903)(1)=208.796

105. (Cr-50)(Cr-52)(Cr-52)(O-18)(Cl-37), (aCr-50)=1, (aCr-52)=2,(aCr-53)=0,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(2!)(0!)(0!)(0!)(0!)(1!)(0!)(1!)))((4.345/100)^1)((83.789/100)^2)((9.501/100)^0)((2.365/100)^0)((99.757/100)^0)((0.038/100)^0)((0.205/100)^1)((75.78/100)^0)((24.22/100)^1)=4.54×10^(−5)

the relative molecular mass of the isotopic combination being M=(49.946046)(1)+(51.940510)(2)+(52.940651)(0)+(53.938883)(0)+(15.994915)(0)+(16.999131)(0)+(17.999160)(i)+(34.968853)(0)+(36.965903)(1)=208.792

106. (Cr-50)(Cr-52)(Cr-53)(O-18)(Cl-37), (aCr-50)=1, (aCr-52)=1,(aCr-53)=1,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(1!)(1!)(0!)(0!)(0!)(1!)(0!)(1!)))((4.345/100)^1)((83.789/100)^1)((9.501/100)^1)((2.365/100)^0)((99.757/100)^0)((0.038/100)^0)((0.205/100) 1) ((75.78/100)^0)((24.22/100)^1)=1.03×10^(−5)

the relative molecular mass of the isotopic combination being M=(49.946046)(1)+(51.940510)(1)+(52.940651)(1)+(53.938883)(0)+(15.994915)(0)+(16.999131)(0)+(17.999160)(1)+(34.968853)(0)+(36.965903)(1)=209.792

107. (Cr-50)(Cr-52)(Cr-54)(O-18)(Cl-37), (aC r-50)=1, (aCr-52)=1,(aCr-53)=0,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(1!)(0!)(1!)(0!)(0!)(1!)(0!)(1!)))((4.345/100)^1)((83.789/100)^1)((9.501/100)^0)((2.365/100)^1)((99.757/100)^0)((0.038/100)^0)((0.205/100)^1)((75.78/100)^0)((24.22/100)^1)=2.56×10^(−6)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)+(34.968853)(0)+(36.965903)(1)=210.791

108. (Cr-50)(Cr-53)(Cr-53)(O-18)(Cl-37), (aCr-50)=1, (aCr-52)=0,(aCr-53)=2,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(0!)(2!)(0!)(0!)(0!)(1!)(0!)(1!)))((4.345/100)^1)((83.789/100)^0)((9.501/100)^2)((2.365/100)^0)((99.757/100)^0)((0.038/100)^0)((0.205/100)^1)((75.78/100)^0)((24.22/100)^1)=5.84×10^(−7)

the relative molecular mass of the isotopic combination being M=(49.946046)(1)+(51.940510)(0)+(52.940651)(2)+(53.938883)(0)+(15.994915)(0)+(16.999131)(0) +(17.999160)(1)+(34.968853)(0)+(36.965903)(1)=210.792

109. (Cr-50)(Cr-53)(Cr-54)(O-18)(Cl-37), (aCr-50)=1, (aCr-52)=0,(aCr-53)=1,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(0!)(1!)(1!)(0!)(0!)(1!)(0!)(1!)))((4.345/100)^1)((83.789/100)^0)((9.501/100)^1)((2.365/100)^1)((99.757/100)^0)((0.038/100)^0)((0.205/100)^1) ((75.78/100)^0)((24.22/100)^1)=2.91×10^(−7)

the relative molecular mass of the isotopic combination being M=(49.946046)(1)+(51.940510)(0)+(52.940651)(1)+(53.938883)(1)+(15.994915)(0)+(16.999131)(0)+(17.999160)(1)+(34.968853)(0)+(36.965903)(1)=211.791

110. (Cr-50)(Cr-54)(Cr-54)(O-18)(Cl-37), (aCr-50)=1, (aCr-52)=0,(aCr-53)=0,(aCr-54)=2,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((1!)(0!)(0!)(2!)(0!)(0!)(1!)(0!)(1!)))((4.345/100)^1)((83.789/100)^0) ((9.501/100)^0)((2.365/100)^2)((99.757/100)^0)((0.038/100)^0)((0.205/100)^1)((75.78/100)^0)((24.22/100)^1)=3.62×10^(−8)

the relative molecular mass of the isotopic combination being M=(49.946046)(1)+(51.940510)(0)+(52.940651)(0)+(53.938883)(2)+(15.994915)(0)+(16.999131)(0)+(17.999160)(1)+(34.968853)(0)+(36.965903)(1)=212.789

111. (Cr-52)(Cr-52)(Cr-52)(O-18)(Cl-37), (aCr-50)=0, (aCr-52)=3,(aCr-53)=0,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(3!)(0!)(0!)(0!)(0!)(1!)(0!)(1!)))((4.345/100)^0)((83.789/100)^3)((9.501/100)^0)((2.365/100)^0)((99.757/100)^0)((0.038/100)^0)((0.205/100)^1) ((75.78/100)^0)((24.22/100)^1)=2.92×10^(−4)

the relative molecular mass of the isotopic combination being M=(49.946046)(0)+(51.940510)(3)+(52.940651)(0)+(53.938883)(0)+(15.994915)(0)+(16.999131)(0) +(17.999160)(1)+(34.968853)(0)+(36.965903)(1)=210.787

112. (Cr-52)(Cr-52)(Cr-53)(O-18)(Cl-37), (aCr-50)=0, (aCr-52)=2,(aCr-53)=1,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(2!)(1!)(0!)(0!)(0!)(1!)(0!)(1!)))((4.345/100)^0)((83.789/100)^2) ((9.501/100)^1)((2.365/100)^0)((99.757/100)^0)((0.038/100)^0)((0.205/100)^1) ((75.78/100)^0)((24.22/100)^1)=9.94×10^(−5)

the relative molecular mass of the isotopic combination being M=(49.946046)(0)+(51.940510)(2)+(52.940651)(1)+(53.938883)(0)+(15.994915)(0)+(16.999131)(0)+(17.999160)(1)+(34.968853)(0)+(36.965903)(1)=211.787

113. (Cr-52)(Cr-52)(Cr-54)(O-18)(Cl-37), (aCr-50)=0, (aCr-52)=2,(aCr-53)=0,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(2!)(0!)(1!)(0!)(0!)(1!)(0!)(1!)))((4.345/100)^0)((83.789/100)^2) ((9.501/100)^0)((2.365/100)^1)((99.757/100)^0)((0.038/100)^0)((0.205/100)^1) ((75.78/100)^0)((24.22/100)^1)=2.47×10^(−5)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)+(34.968853)(0)+(36.965903)(1)=212.785

114. (Cr-52)(Cr-53)(Cr-53)(O-18)(Cl-37), (aCr-50)=0, (aCr-52)=1,(aCr-53)=2,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(1!)(2!)(0!)(0!)(0!)(1!)(0!)(1!)))((4.345/100)^0)((83.789/100)^1)((9.501/100)^2)((2.365/100)^0)((99.757/100)^0)((0.038/100)^0)((0.205/100)^1)((75.78/100)^0)((24.22/100)^1)=1.13×10^(−5)

the relative molecular mass of the isotopic combination being M=(49.946046)(0)+(51.940510)(1)+(52.940651)(2)+(53.938883)(0)+(15.994915)(0)+(16.999131)(0)+(17.999160)(1)+(34.968853)(0)+(36.965903)(1)=212.787

115. (Cr-52)(Cr-53)(Cr-54)(O-18)(Cl-37), (aCr-50)=0, (aCr-52)=1,(aCr-53)=1,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(1!)(1!)(1!)(0!)(0!)(1!)(0!)(1!)))((4.345/100)^0)((83.789/100)^1)((9.501/100)^1)((2.365/100)^1)((99.757/100)^0)((0.038/100)^0)((0.205/100)^1)((75.78/100)^0)((24.22/100)^1)=5.61×10^(−6)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)+(34.968853)(0)+(36.965903)(1)=213.785

116. (Cr-52)(Cr-54)(Cr-54)(O-18)(Cl-37), (aCr-50)=0, (aCr-52)=1,(aCr-53)=0,(aCr-54)=2,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(1!)(0!)(2!)(0!)(0!)(1!)(0!)(1!)))((4.345/100)^0)((83.789/100)^1)((9.501/100)^0)((2.365/100)^2)((99.757/100)^0)((0.038/100)^0)((0.205/100)^1)((75.78/100)^0)((24.22/100)^1)=6.98×10^(−7)

the relative molecular mass of the isotopic combination being M=(49.946046)(0)+(51.940510)(1)+(52.940651)(0)+(53.938883)(2)+(15.994915)(0)+(16.999131)(0) +(17.999160)(1)+(34.968853)(0)+(36.965903)(1)=214.783

117. (Cr-53)(Cr-53)(Cr-53)(O-18)(Cl-37), (aCr-50)=0, (aCr-52)=0,(aCr-53)=3,(aCr-54)=0,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(0!)(3!)(0!)(0!)(0!)(1!)(0!)(1!)))((4.345/100)^0)((83.789/100)^0)((9.501/100)^3)((2.365/100)^0)((99.757/100)^0)((0.038/100)^0)((0.205/100)^1)((75.78/100)^0)((24.22/100)^1)=4.26×10^(−7)

the relative molecular mass of the isotopic combination being M=(49.946046)(0)+(51.940510)(0)+(52.940651)(3)+(53.938883)(0)+(15.994915)(0)+(16.999131)(0)+(17.999160)(1)+(34.968853)(0)+(36.965903)(1)=213.787

118. (Cr-53)(Cr-53)(Cr-54)(O-18)(Cl-37), (aCr-50)=0, (aCr-52)=0,(aCr-53)=2,(aCr-54)=1,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(0!)(2!)(1!)(0!)(0!)(1!)(0!)(1!)))((4.345/100)^0)((83.789/100)^0)((9.501/100)^2)((2.365/100)^1)((99.757/100)^0)((0.038/100)^0)((0.205/100)^1)((75.78/100)^0)((24.22/100)^1)=3.18×10^(−7)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)+(34.968853)(0)+(36.965903)(1)=214.785

119. (Cr-53)(Cr-54)(Cr-54)(O-18)(Cl-37), (aCr-50)=0, (aCr-52)=0,(aCr-53)=1,(aCr-54)=2,(aO-16)=0,(aO-17)=0, (aO-18)=,(aCl-35)=0,(aCl-37)=1 with the probability of finding this isotopic combination in a beam of $Cr_3OCl$ being p=((3!)(1!)(1!)/((0!)(0!)(1!)(2!)(0!)(0!)(1!)(0!)(1!)))((4.345/100)^0)((83.789/100)^0) ((9.501/100)^1)((2.365/100)^2)((99.757/100)^0)((0.038/100)^0)((0.205/100)^1)((75.78/100)^0)((24.22/100)^1)=7.92×10^(−8)

the relative molecular mass of the isotopic combination being M=(49.946046)(0)+(51.940510)(0)+(52.940651)(1)+(53.938883)(2)+(15.994915)(0)+(16.999131)(0)+(17.999160)(1)+(34.968853)(0)+(36.965903)(1)=215.783

120. (Cr-54)(Cr-54)(Cr-54)(O-18)(Cl-37), (aCr-50)=0, (aCr-52)=0,(aCr-53)=0,(aCr-54)=3,(aO-16)=0,(aO-17)=0, (aO-18)=1,(aCl-35)=0,(aCl-37)=1 with the probability of finding this isotopic combination in a beam of $Cr_3OCl$ being p=((3!)(1!)(1!)/((0!)(0!)(0!)(3!)(0!)(0!)(1!)(0!)(1!)))((4.345/100)^0)((83.789/100)^0)((9.501/100)^0)((2.365/100)^3)((99.757/100)^0)((0.038/100)^0)((0.205/100)^1) ((75.78/100)^0)((24.22/100)^1)=6.57×10^(−9)

the relative molecular mass of the isotopic combination being M=(49.946046)(0)+(51.940510)(0)+(52.940651)(0)+(53.938883)(3)+(15.994915)(0)+(16.999131)(0)+(17.999160)(1)+(34.968853)(0)+(36.965903)(1)=216.782

Example 8

An example of using the calculation for chemical species is as follows:

VIII. $Cr_3OCl_2$ species, aCr=3, aO=1,aCl=2 where the probability of a specific isotopic combination to be found in a beam of $Cr_3OCl_2$ is given by the formula p=((aCr!)(aO!)(aCl!)/((aCr-50!)(aCr-52!)(aCr-53!)(aCr-54!)(aO-16!)(aO-17!)(aO-18!)(aCl-35!)(aCl-37!)))((pCr-50/100)^(aCr-50))((pCr-52)^(aCr-52))((pCr-53)^(aCr-53))((pCr-54)^(aCr-54))((pO-16)^(aO-16))((pO-17)^(aO-17))((pO-18)^(aO-18))((pCl-35)^(aCl-35))((pCl-37)^(aCl-37))

and the relative molecular mass for that specific isotopic combination being M=(AMCr-50)(aCr-50)+(AMCr-52)(aCr-52)+(AMCr-53)(aCr-53)+(AMCr-54)(aCr-54)+(AMO-16)(aO-16)+(AMO-17)(aO-17)+(AMO-18)(aO-18)+(AMCl-35)(aCl-35)+(AMCl-37)(aCl-37)

Calculations for the possible isotopic combinations:

1. (Cr-50)(Cr-50)(Cr-50)(O-16)(Cl-35)(Cl-35), (aCr-50)=3,(aCr-52)=0,(aCr-53)=0,(aCr-54)=0,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((3!)(O !)(0!)(O !)(1!)(0!)(0!)(2!)(0!)))((4.345/100)^3)((83.789/100)^0)((9.501/100)^0)((2.365/100)^0)((99.757/100)^1)((0.038/100)^0)((0.205/100)^0) ((75.78/100)^2)((24.22/100)^0)=4.699×10^(−5)

the relative molecular mass of the isotopic combination being M=(49.946046)(3)+(51.940510)(0)+(52.940651)(0)+(53.938883)(0)+(15.994915)(1)+(16.999131)(0)+(17.999160)(0)+(34.968853)(2)+(36.965903)(0)=235.771

2. (Cr-50)(Cr-50)(Cr-52)(O-16)(Cl-35)(Cl-35), (aCr-50)=2,(aCr-52)=,(aCr-53)=0,(aCr-54)=0,(aO-16)=,(aO-17)=0, (aO-18)=0,(aCl-35)=2,(aCl-37)=0 with the probability of finding this isotopic combination in a beam of $Cr_3OCl_2$ being p=((3!)(1!)(2!)/((2!)(1!)(0!)(0!)(1!)(0!)(0!)(2!)(0!)))((4.345/100)^2)((83.789/100)^1)((9.501/100)^0)((2.365/100)^0)((99.757/100)^1)((0.038/100)^0)((0.205/100)^0) ((75.78/100)^2)((24.22/100)^0)=2.719×10^(−3)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)+(34.968853)(2)+(36.965903)(0)=237.765

3. (Cr-50)(Cr-50)(Cr-53)(O-16)(Cl-35)(Cl-35), (aCr-50)=2,(aCr-52)=0,(aCr-53)=1,(aCr-54)=0,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((2!)(0!)(1!)(0!)(1!)(0!)(O !)(2!)(0!)))((4.345/100)^2)((83.789/100)^0)((9.501/100)^1)((2.365/100)^0)((99.757/100)^1)((0.038/100)^0)((0.205/100)^0)((75.78/100)^2)((24.22/100)^0)=3.083×10^(−4)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)+(34.968853)(2)+(36.965903)(0)=238.765

4. (Cr-50)(Cr-50)(Cr-54)(O-16)(Cl-35)(Cl-35), (aCr-50)=2,(aCr-52)=0,(aCr-53)=0,(aCr-54)=1,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((2!)(0!)(0!)(1!)

(1!)(0!)(0!)(2!)(0!)))((4.345/100)^2)((83.789/100)^0)((9.501/100)^0)((2.365/100)^1)((99.757/100)^1)((0.038/100)^0)((0.205/100)^0)((75.78/100)^2)((24.22/100)^0)=7.673×10^(−5)

the relative molecular mass of the isotopic combination being M=(49.946046)(2)+(51.940510)(0)+(52.940651)(0)+(53.938883)(1)+(15.994915)(1)+(16.999131)(0)+(17.999160)(0)+(34.968853)(2)+(36.965903)(0)=239.764

5. (Cr-50)(Cr-52)(Cr-52)(O-16)(Cl-35)(Cl-35), (aCr-50)=1,(aCr-52)=2,(aCr-53)=0,(aCr-54)=0,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((1!)(2!)(0!)(0!)(1!)(0!)(0!)(2!)(0!)))((4.345/100)^1)((83.789/100)^2)((9.501/100)^0)((2.365/100)^0)((99.757/100)^1)((0.038/100)^0)((0.205/100)^0)((75.78/100)^2)((24.22/100)^0)=5.242×10^(−2)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)+(34.968853)(2)+(36.965903)(0)=239.760

6. (Cr-50)(Cr-52)(Cr-53)(O-16)(Cl-35)(Cl-35), (aCr-50)=1,(aCr-52)=1,(aCr-53)=1,(aCr-54)=0,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((1!)(1!)(1!)(0!)(1!)(0!)(0!)(2!)(0!)))((4.345/100)^1)((83.789/100)^1)((9.501/100)^1)((2.365/100)^0)((99.757/100)^1)((0.038/100)^0)((0.205/100)^0)((75.78/100)^2)((24.22/100)^0)=1.189×10^(−2)

the relative molecular mass of the isotopic combination being M=(49.946046)(1)+(51.940510)(1)+(52.940651)(1)+(53.938883)(0)+(15.994915)(1)+(16.999131)(0)+(17.999160)(0)+(34.968853)(2)+(36.965903)(0)=240.760

7. (Cr-50)(Cr-52)(Cr-54)(O-16)(Cl-35)(Cl-35), (aCr-50)=1,(aCr-52)=1,(aCr-53)=0,(aCr-54)=1,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((1!)(1!)(0!)(1!)(1!)(0!)(0!)(2!)(0!)))((4.345/100)^1)((83.789/100)^1)((9.501/100)^0)((2.365/100)^1)((99.757/100)^1)((0.038/100)^0)((0.205/100)^0)((75.78/100)^2)((24.22/100)^0)=2.959×10^(−3)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)+(34.968853)(2)+(36.965903)(0)=241.758

8. (Cr-50)(Cr-53)(Cr-53)(O-16)(Cl-35)(Cl-35), (aCr-50)=1,(aCr-52)=0,(aCr-53)=2,(aCr-54)=0,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((1!)(0!)(2!)(0!)(1!)(0!)(0!)(2!)(0!)))((4.345/100)^1)((83.789/100)^0)((9.501/100)^2)((2.365/100)^0)((99.757/100)^1)((0.038/100)^0)((0.205/100)^0)((75.78/100)^2)((24.22/100)^0)=6.741×10^(−4)

the relative molecular mass of the isotopic combination being M=(49.946046)(1)+(51.940510)(0)+(52.940651)(2)+(53.938883)(0)+(15.994915)(1)+(16.999131)(0)+(17.999160)(0)+(34.968853)(2)+(36.965903)(0)=241.760

9. (Cr-50)(Cr-53)(Cr-54)(O-16)(Cl-35)(Cl-35), (aCr-50)=1,(aCr-52)=0,(aCr-53)=1,(aCr-54)=1,(aO-16)=1,(aO-17)=0,(aO-18)=0,(aCl-35)=2,(aCl-37)=0 with the probability of finding this isotopic combination in a beam of $Cr_3OCl_2$ being p=((3!)(1!)(2!)/((1!)(0!)(1!)(1!)(1!)(0!)(0!)(2!)(0!)))((4.345/100)^1)((83.789/100)^0)((9.501/100)^1)((2.365/100)^1)((99.757/100)^1)((0.038/100)^0)((0.205/100)^0) ((75.78/100)^2)((24.22/100)^0)=3.356×10^(−4)

the relative molecular mass of the isotopic combination being M=(49.946046)(1)+(51.940510)(0)+(52.940651)(1)+(53.938883)(1)+(15.994915)(1)+(16.999131)(0)+(17.999160)(0)+(34.968853)(2)+(36.965903)(0)=242.758

10. (Cr-50)(Cr-54)(Cr-54)(O-16)(Cl-35)(Cl-35), (aCr-50)= 1,(aCr-52)=0,(aCr-53)=0,(aCr-54)=2,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((1!)(0!)(0!)(2!)(1!)(0!)(0!)(2!)(0!)))((4.345/100)^1)((83.789/100)^0)((9.501/100)^0)((2.365/100)^2)((99.757/100)^1)((0.038/100)^0)((0.205/100)^0) ((75.78/100)^2)((24.22/100)^0)=4.177×10^(−5)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)+(34.968853)(2)+(36.965903)(0)=243.756

11. (Cr-52)(Cr-52)(Cr-52)(O-16)(Cl-35)(Cl-35), (aCr-50)= 0,(aCr-52)=3,(aCr-53)=0,(aCr-54)=0,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(3!)(0!)(0!)(1!)(0!)(0!)(2!)(0!)))((4.345/100)^0)((83.789/100)^3)((9.501/100)^0)((2.365/100)^0)((99.757/100)^1)((0.038/100)^0)((0.205/100)^0) ((75.78/100)^2)((24.22/100)^0)=0.3370 the relative molecular mass of the isotopic combination being M=(49.946046)(0)+(51.940510)(3)+(52.940651)(0)+(53.938883)(0)+(15.994915)(1)+(16.999131)(0)+(17.999160)(0)+(34.968853)(2)+(36.965903)(0)=241.754

12. (Cr-52)(Cr-52)(Cr-53)(O-16)(Cl-35)(Cl-35), (aCr-50)= 0,(aCr-52)=2,(aCr-53)=1,(aCr-54)=0,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(2!)(1!)(0!)(1!)(0!)(0!)(2!)(0!)))((4.345/100)^0)((83.789/100)^2)((9.501/100)^1)((2.365/100)^0)((99.757/100)^1)((0.038/100)^0)((0.205/100)^0) ((75.78/100)^2)((24.22/100)^0)=0.1146 the relative molecular mass of the isotopic combination being M=(49.946046)(0)+(51.940510)(2)+(52.940651)(1)+(53.938883)(0)+(15.994915)(1)+(16.999131)(0)+(17.999160)(0)+(34.968853)(2)+(36.965903)(0)=242.754

13. (Cr-52)(Cr-52)(Cr-54)(O-16)(Cl-35)(Cl-35), (aCr-50)= 0,(aCr-52)=2,(aCr-53)=0,(aCr-54)=1,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(2!)(0!)(1!)(1!)(0!)(0!)(2!)(0!)))((4.345/100)^0)((83.789/100)^2)((9.501/100)^0)((2.365/100)^1)((99.757/100)^1)((0.038/100)^0)((0.205/100)^0) ((75.78/100)^2)((24.22/100)^0)=2.854×10^(−2)

the relative molecular mass of the isotopic combination being M=(49.946046)(0)+(51.940510)(2)+(52.940651)(0)+(53.938883)(1)+(15.994915)(1)+(16.999131)(0)+(17.999160)(0)+(34.968853)(2)+(36.965903)(0)=243.753

14. (Cr-52)(Cr-53)(Cr-53)(O-16)(Cl-35)(Cl-35), (aCr-50)= 0,(aCr-52)=1,(aCr-53)=2,(aCr-54)=0,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(1!)(2!)(0!)(1!)(0!)(0!)(2!)(0!)))((4.345/100)^0)((83.789/100)^1)((9.501/100)^2)((2.365/100)^0)((99.757/100)^1)((0.038/100)^0)((0.205/100)^0) ((75.78/100)^2)((24.22/100)^0)=1.300×10^(−2)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)+(34.968853)(2)+(36.965903)(0)=243.754

15. (Cr-52)(Cr-53)(Cr-54)(O-16)(Cl-35)(Cl-35), (aCr-50)= 0,(aCr-52)=1,(aCr-53)=1,(aCr-54)=1,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(1!)(1!)(1!)(1!)(0!)(0!)(2!)(0!)))((4.345/100)^0)((83.789/100)^1)((9.501/100)^1)((2.365/100)^1)((99.757/100)^1)((0.038/100)^0)((0.205/100)^0) ((75.78/100)^2)((24.22/100)^0)=6.471×10^(−3)

the relative molecular mass of the isotopic combination being M=(49.946046)(0)+(51.940510)(1)+(52.940651)(1)+(53.938883)(1)+(15.994915)(1)+(16.999131)(0) +(17.999160)(0)+(34.968853)(2)+(36.965903)(0)=244.753

16. (Cr-52)(Cr-54)(Cr-54)(O-16)(Cl-35)(Cl-35), (aCr-50)= 0,(aCr-52)=1,(aCr-53)=0,(aCr-54)=2,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(1!)(0!)(2!)(1!)(0!)(0!)(2!)(o!)))((4.345/100)^0)((83.789/100)^1)((9.501/100)^0)((2.365/100)^2)((99.757/100)^1)((0.038/100)^0)((0.205/100)^0) ((75.78/100)^2)((24.22/100)^0)=8.054×10^(−4)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)+(34.968853)(2)+(36.965903)(0)=245.751

17. (Cr-53)(Cr-53)(Cr-53)(O-16)(Cl-35)(Cl-35), (aCr-50)= 0,(aCr-52)=0,(aCr-53)=3,(aCr-54)=0,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(0!)(3!)(0!)(1!)(0!)(0!)(2!)(0!)))((4.345/100)^0)((83.789/100)^0)((9.501/100)^3)((2.365/100)^0)((99.757/100)^1)((0.038/100)^0)((0.205/100)^0) ((75.78/100)^2)((24.22/100)^0)=4.913×10^(−4)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)+(34.968853)(2)+(36.965903)(0)=244.755

18. (Cr-53)(Cr-53)(Cr-54)(O-16)(Cl-35)(Cl-35), (aCr-50)= 0,(aCr-52)=0,(aCr-53)=2,(aCr-54)=1,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(0!)(2!)(1!)(1!)(0!)(0!)(2!)(0!)))((4.345/100)^0)((83.789/100)^0)((9.501/100)^2)((2.365/100)^1)((99.757/100)^1)((0.038/100)^0)((0.205/100)^0) ((75.78/100)^2)((24.22/100)^0)=3.669×10^(−4)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)+(34.968853)(2)+(36.965903)(0)=245.753

19. (Cr-53)(Cr-54)(Cr-54)(O-16)(Cl-35)(Cl-35), (aCr-50)= 0,(aCr-52)=0,(aCr-53)=1,(aCr-54)=2,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(0!)(1!)(2!)(1!)(0!)(0!)(2!)(0!)))((4.345/100)^0)((83.789/100)^0)((9.501/100)^1)((2.365/100)^2)((99.757/100)^1)((0.038/100)^0)((0.205/100)^0) ((75.78/100)^2)((24.22/100)^0)=9.133×10^(−5)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)+(34.968853)(2)+(36.965903)(0)=246.751

20. (Cr-54)(Cr-54)(Cr-54)(O-16)(Cl-35)(Cl-35), (aCr-50)= 0,(aCr-52)=0,(aCr-53)=0,(aCr-54)=3,(aO-16)=1,(aO-17)= 0,(aO-18)=0,(aCl-35)=2,(aCl-37)=0 with the probability of finding this isotopic combination in a beam of $Cr_3OCl_2$ being p=((3!)(1!)(2!)/((0!)(0!)(0!)(3!)(1!)(0!)(0!)(2!)(0!)))((4.345/100)^0)((83.789/100)^0)((9.501/100)^0)((2.365/100)^3)((99.757/100)^1)((0.038/100)^0)((0.205/100)^0) ((75.78/100)^2)((24.22/100)^0)=7.578×10^(−6)

the relative molecular mass of the isotopic combination being M=(49.946046)(0)+(51.940510)(0)+(52.940651)(0)+(53.938883)(3)+(15.994915)(1)+(16.999131)(0)+(17.999160)(0)+(34.968853)(2)+(36.965903)(0)=247.749

21. (Cr-50)(Cr-50)(Cr-50)(O-17)(Cl-35)(Cl-35), (aCr-50)= 3,(aCr-52)=0,(aCr-53)=0,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((3!)(0!)(0!)(0!)(0!)(1!)(0!)(2!)(0!)))((4.345/100)^3)((83.789/100)^0)((9.501/100)^0)((2.365/100)^0)((99.757/100)^0)((0.038/100)^1)((0.205/100)^0) ((75.78/100)^2)((24.22/100)^0)=1.8×10^(−8)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)+(34.968853)(2)+(36.965903)(0)=236.775

22. (Cr-50)(Cr-50)(Cr-52)(O-17)(Cl-35)(Cl-35), (aCr-50)= 2,(aCr-52)=,(aCr-53)=0,(aCr-54)=0,(aO-16)=0,(aO-17)=1,(aO-18)=0,(aCl-35)=2,(aCl-37)=0 with the probability of finding this isotopic combination in a beam of $Cr_3OCl_2$ being p=((3!)(1!)(2!)/((2!)(1!)(0!)(0!)(0!)(1!)(0!)(2!)(0!)))((4.345/100)^2)((83.789/100)^1)((9.501/100)^0)((2.365/100)^0)((99.757/100)^0)((0.038/100)^1)((0.205/100)^0) ((75.78/100)^2)((24.22/100)^0)=1.0×10^(−6)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)+(34.968853)(2)+(36.965903)(0)=238.769

23. (Cr-50)(Cr-50)(Cr-53)(O-17)(Cl-35)(Cl-35), (aCr-50)= 2,(aCr-52)=0,(aCr-53)=1,(aCr-54)=0,(aO-16)=0,(aO-17)=,(aO-18)=0,(aCl-35)=2,(aCl-37)=0 with the probability of finding this isotopic combination in a beam of $Cr_3OCl_2$ being p=((3!)(1!)(2!)/((2!)(0!)(1!)(0!)(0!)(1!)(0!)(2!)(0!)))((4.345/100)^2)((83.789/100)^0)

((9.501/100)^1)((2.365/100)^0)((99.757/100)^0)((0.038/100)^1)((0.205/100)^0) ((75.78/100)^2)((24.22/100)^0)= 1.2×10^(−7)

the relative molecular mass of the isotopic combination being M=(49.946046)(2)+(51.940510)(0)+(52.940651)(1)+(53.938883)(0)+(15.994915)(0)+(16.999131)(1)+(17.999160)(0)+(34.968853)(2)+(36.965903)(0)=239.770

24. (Cr-50)(Cr-50)(Cr-54)(O-17)(Cl-35)(Cl-35), (aCr-50)= 2,(aCr-52)=0,(aCr-53)=0,(aCr-54)=1,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((2!)(0!)(0!)(1!)(0!)(1!)(0!)(2!)(0!)))((4.345/100)^2)((83.789/100)^0)((9.501/100)^0)((2.365/100)^1)((99.757/100)^0)((0.038/100)^1) ((0.205/100)^0) ((75.78/100)^2)((24.22/100)^0)= 2.9×10^(−8)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)+(34.968853)(2)+(36.965903)(0)=240.768

25. (Cr-50)(Cr-52)(Cr-52)(O-17)(Cl-35)(Cl-35), (aCr-50)= 1,(aCr-52)=2,(aCr-53)=0,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((1!)(2!)(0!)(0!)(0!)(1!)(0!)(2!)(0!)))((4.345/100)^1)((83.789/100)^2)((9.501/100)^0)((2.365/100)^0)((99.757/100)^0)((0.038/100)^1)((0.205/100)^0) ((75.78/100)^2)((24.22/100)^0)= 2.0×10^(−5)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)+(34.968853)(2)+(36.965903)(0)=240.764

26. (Cr-50)(Cr-52)(Cr-53)(O-17)(Cl-35)(Cl-35), (aCr-50)= 1,(aCr-52)=1,(aCr-53)=1,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((1!)(1!)(1!)(0!)(0!)(1!)(0!)(2!)(0!)))((4.345/100)^1)((83.789/100)^1)((9.501/100)^1)((2.365/100)^0)((99.757/100)^0)((0.038/100)^1)((0.205/100)^0) ((75.78/100)^2)((24.22/100)^0)= 45×10^(−6)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)+(34.968853)(2)+(36.965903)(0)=241.764

27. (Cr-50)(Cr-52)(Cr-54)(O-17)(Cl-35)(Cl-35), (aCr-50)= 1,(aCr-52)=,(aCr-53)=0,(aCr-54)=1,(aO-16)=0,(aO-17)=1,(aO-18)=0,(aCl-35)=2,(aCl-37)=0 with the probability of finding this isotopic combination in a beam of $Cr_3OCl_2$ being p=((3!)(1!)(2!)/((1!)(1!)(0!)(1!)(0!)(1!)(0!)(2!)(0!)))((4.345/100)^1)((83.789/100)^1)((9.501/100)^0)((2.365/100)^1)((99.757/100)^0)((0.038/100)^1)((0.205/100)^0) ((75.78/100)^2)((24.22/100)^0)= 1.1×10^(−6)

the relative molecular mass of the isotopic combination being M=(49.946046)(1)+(51.940510)(1)+(52.940651)(0)+(53.938883)(1)+(15.994915)(0)+(16.999131)(1)+(17.999160)(0)+(34.968853)(2)+(36.965903)(0)=242.762

28. (Cr-50)(Cr-53)(Cr-53)(O-17)(Cl-35)(Cl-35), (aCr-50)= 1,(aCr-52)=0,(aCr-53)=2,(aCr-54)=0,(aO-16)=0,(aO-17)=,(aO-18)=0,(aCl-35)=2,(aCl-37)=0 with the probability of finding this isotopic combination in a beam of $Cr_3OCl_2$ being p=((3!)(1!)(2!)/((1!)(0!)(2!)(0!)(0!)(1!)(0!)(2!)(0!)))((4.345/100)^1)((83.789/100)^0)((9.501/100)^2)((2.365/100)^0)((99.757/100)^0)((0.038/100)^1)((0.205/100)^0) ((75.78/100)^2)((24.22/100)^0)= 2.6×10^(−7)

the relative molecular mass of the isotopic combination being M=(49.946046)(1)+(51.940510)(0)+(52.940651)(2)+(53.938883)(0)+(15.994915)(0)+(16.999131)(1)+(17.999160)(0)+(34.968853)(2)+(36.965903)(0)=242.764

29. (Cr-50)(Cr-53)(Cr-54)(O-17)(Cl-35)(Cl-35), (aCr-50)= 1,(aCr-52)=0,(aCr-53)=1,(aCr-54)=1,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((1!)(0!)(1!)(1!)(0!)(1!)(0!)(2!)(0!)))((4.345/100)^1)((83.789/100)^0)((9.501/100)^1)((2.365/100)^1)((99.757/100)^0)((0.038/100)^1)((0.205/100)^0) ((75.78/100)^2)((24.22/100)^0)= 1.3×10^(−7)

the relative molecular mass of the isotopic combination being M=(49.946046)(1)+(51.940510)(0)+(52.940651)(1)+(53.938883)(1)+(15.994915)(0)+(16.999131)(1)+(17.999160)(0)+(34.968853)(2)+(36.965903)(0)=243.762

30. (Cr-50)(Cr-54)(Cr-54)(O-17)(Cl-35)(Cl-35), (aCr-50)= 1,(aCr-52)=0,(aCr-53)=0,(aCr-54)=2,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((1!)(0!)(0!)(2!)(0!)(1!)(0!)(2!)(0!)))((4.345/100)^1)((83.789/100)^0)((9.501/100)^0)((2.365/100)^2)((99.757/100)^0)((0.038/100)^1)((0.205/100)^0) ((75.78/100)^2)((24.22/100)^0)= 1.6×10^(−8)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)+(34.968853)(2)+(36.965903)(0)=244.761

31. (Cr-52)(Cr-52)(Cr-52)(O-17)(Cl-35)(Cl-35), (aCr-50)= 0,(aCr-52)=3,(aCr-53)=0,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(3!)(0!)(0!)(0!)(1!)(0!)(2!)(0!)))((4.345/100)^0)((83.789/100)^3)((9.501/100)^0)((2.365/100)^0)((99.757/100)^0)((0.038/100)^1)((0.205/100)^0) ((75.78/100)^2)((24.22/100)^0)= 1.3×10^(−4)

the relative molecular mass of the isotopic combination being M=(49.946046)(0)+(51.940510)(3)+(52.940651)(0)+(53.938883)(0)+(15.994915)(0)+(16.999131)(1) +(17.999160)(0)+(34.968853)(2)+(36.965903)(0)=242.758

32. (Cr-52)(Cr-52)(Cr-53)(O-17)(Cl-35)(Cl-35), (aCr-50)= 0,(aCr-52)=2,(aCr-53)=1,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(2!)(1!)(0!)(0!)(1!)(0!)(2!)(0!)))((4.345/100)^0)((83.789/100)^2)((9.501/100)^1)((2.365/100)^0)((99.757/100)^0)((0.038/100)^1)((0.205/100)^0) ((75.78/100)^2)((24.22/100)^0)= 4.4×10^(−5)

the relative molecular mass of the isotopic combination being M=(49.946046)(0)+(51.940510)(2)+(52.940651)(1)+(53.938883)(0)+(15.994915)(0)+(16.999131)(1)+(17.999160)(0)+(34.968853)(2)+(36.965903)(0)=243.759

33. (Cr-52)(Cr-52)(Cr-54)(O-17)(Cl-35)(Cl-35), (aCr-50)= 0,(aCr-52)=2,(aCr-53)=0,(aCr-54)=1,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(2!)(0!)(1!)(0!)(1!)(0!)(2!)(0!)))((4.345/100)^0)((83.789/100)^2)((9.501/100)^0)((2.365/100)^1)((99.757/100)^0)((0.038/100)^1)((0.205/100)^0) ((75.78/100)^2)((24.22/100)^0)=1.1×10^(−5)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)+(34.968853)(2)+(36.965903)(0)=244.757

34. (Cr-52)(Cr-53)(Cr-53)(O-17)(Cl-35)(Cl-35), (aCr-50)= 0,(aCr-52)=,(aCr-53)=2,(aCr-54)=0,(aO-16)=0,(aO-17)=1,(aO-18)=0,(aCl-35)=2,(aCl-37)=0 with the probability of finding this isotopic combination in a beam of $Cr_3OCl_2$ being p=((3!)(1!)(2!)/((0!)(1!)(2!)(0!)(0!)(1!)(0!)(2!)(0!)))((4.345/100)^0)((83.789/100)^1)((9.501/100)^2)((2.365/100)^0)((99.757/100)^0)((0.038/100)^1)((0.205/100)^0) ((75.78/100)^2)((24.22/100)^0)=5.0×10^(−6)

the relative molecular mass of the isotopic combination being M=(49.946046)(0)+(51.940510)(1)+(52.940651)(2)+(53.938883)(0)+(15.994915)(0)+(16.999131)(1)+(17.999160)(0)+(34.968853)(2)+(36.965903)(0)=244.759

35. (Cr-52)(Cr-53)(Cr-54)(O-17)(Cl-35)(Cl-35), (aCr-50)= 0,(aCr-52)=1,(aCr-53)=1,(aCr-54)=1,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(1!)(1!)(1!)(0!)(1!)(0!)(2!)(0!)))((4.345/100)^0)((83.789/100)^1)((9.501/100)^1)((2.365/100)^1)((99.757/100)^0)((0.038/100)^1)((0.205/100)^0) ((75.78/100)^2)((24.22/100)^0)=2.5×10^(−6)

the relative molecular mass of the isotopic combination being M=(49.946046)(0)+(51.940510)(1)+(52.940651)(1)+(53.938883)(1)+(15.994915)(0)+(16.999131)(1)+(17.999160)(0)+(34.968853)(2)+(36.965903)(0)=245.757

36. (Cr-52)(Cr-54)(Cr-54)(O-17)(Cl-35)(Cl-35), (aCr-50)= 0,(aCr-52)=1,(aCr-53)=0,(aCr-54)=2,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(1!)(0!)(2!)(0!)(1!)(0!)(2!)(0!)))((4.345/100)^0)((83.789/100)^1)((9.501/100)^0)((2.365/100)^2)((99.757/100)^0)((0.038/100)^1)((0.205/100)^0) ((75.78/100)^2)((24.22/100)^0)=3.1×10^(−7)

the relative molecular mass of the isotopic combination being M=(49.946046)(0)+(51.940510)(1)+(52.940651)(0)+(53.938883)(2)+(15.994915)(0)+(16.999131)(1)+(17.999160)(0)+(34.968853)(2)+(36.965903)(0)=246.755

37. (Cr-53)(Cr-53)(Cr-53)(O-17)(Cl-35)(Cl-35), (aCr-50)= 0,(aCr-52)=0,(aCr-53)=3,(aCr-54)=0,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(0!)(3!)(0!)(0!)(1!)(0!)(2!)(0!)))((4.345/100)^0)((83.789/100)^0)((9.501/100)^3)((2.365/100)^0)((99.757/100)^0)((0.038/100)^1)((0.205/100)^0) ((75.78/100)^2)((24.22/100)^0)=1.9×10^(−7)

the relative molecular mass of the isotopic combination being M=(49.946046)(0)+(51.940510)(0)+(52.940651)(3)+(53.938883)(0)+(15.994915)(0)+(16.999131)(1)+(17.999160)(0)+(34.968853)(2)+(36.965903)(0)=245.759

38. (Cr-53)(Cr-53)(Cr-54)(O-17)(Cl-35)(Cl-35), (aCr-50)= 0,(aCr-52)=0,(aCr-53)=2,(aCr-54)=1,(aO-16)=0,(aO-17)=,(aO-18)=0,(aCl-35)=2,(aCl-37)=0 with the probability of finding this isotopic combination in a beam of $Cr_3OCl_2$ being p=((3!)(1!)(2!)/((0!)(0!)(2!)(1!)(0!)(1!)(0!)(2!)(0!)))((4.345/100)^0)((83.789/100)^0)((9.501/100)^2)((2.365/100)^1)((99.757/100)^0)((0.038/100)^1)((0.205/100)^0) ((75.78/100)^2)((24.22/100)^0)=1.4×10^(−7)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)+(34.968853)(2)+(36.965903)(0)=246.757

39. (Cr-53)(Cr-54)(Cr-54)(O-17)(Cl-35)(Cl-35), (aCr-50)= 0,(aCr-52)=0,(aCr-53)=1,(aCr-54)=2,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(0!)(1!)(2!)(0!)(1!)(0!)(2!)(0!)))((4.345/100)^0)((83.789/100)^0)((9.501/100)^1)((2.365/100)^2)((99.757/100)^0)((0.038/100)^1)((0.205/100)^0) ((75.78/100)^2)((24.22/100)^0)=3.5×10^(−8)

the relative molecular mass of the isotopic combination being M=(49.946046)(0)+(51.940510)(0)+(52.940651)(1)+(53.938883)(2)+(15.994915)(0)+(16.999131)(1)+(17.999160)(0)+(34.968853)(2)+(36.965903)(0)=247.755

40. (Cr-54)(Cr-54)(Cr-54)(O-17)(Cl-35)(Cl-35), (aCr-50)= 0,(aCr-52)=0,(aCr-53)=0,(aCr-54)=3,(aO-16)=0,(aO-17)= 1,(aO-18)=0,(aCl-35)=2,(aCl-37)=0 with the probability of finding this isotopic combination in a beam of $Cr_3OCl_2$ being p=((3!)(1!)(2!)/((0!)(0!)(0!)(3!)(0!)(1!)(0!)(2!)(0!)))((4.345/100)^0)((83.789/100)^0)((9.501/100)^0)((2.365/100)^3)((99.757/100)^0)((0.038/100)^1)((0.205/100)^0) ((75.78/100)^2)((24.22/100)^0)=2.9×10^(−9)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)+(34.968853)(2)+(36.965903)(0)=248.753

41. (Cr-50)(Cr-50)(Cr-50)(O-18)(Cl-35)(Cl-35), (aCr-50)= 3,(aCr-52)=0,(aCr-53)=0,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((3!)(0!)(0!)(0!)(0!)(0!)(1!)(2!)(0!)))((4.345/100)^3)((83.789/100)^0)((9.501/100)^0)((2.365/100)^0)((99.757/100)^0)((0.038/100)^0)((0.205/100)^1) ((75.78/100)^2)((24.22/100)^0)=9.66×10^(−8)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)+(34.968853)(2)+(36.965903)(0)=237.775

42. (Cr-50)(Cr-50)(Cr-52)(O-18)(Cl-35)(Cl-35), (aCr-50)= 2,(aCr-52)=1,(aCr-53)=0,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((2!)(1!)(0!)(0!)(0!)(0!)(1!)(2!)(0!)))((4.345/100)^2)((83.789/100)^1)

((9.501/100)^0)((2.365/100)^0)((99.757/100)^0)((0.038/100)^0)((0.205/100)^1) ((75.78/100)^2)((24.22/100)^0)=5.59×10^(−6)

the relative molecular mass of the isotopic combination being M=(49.946046)(2)+(51.940510)(1)+(52.940651)(0)+(53.938883)(0)+(15.994915)(0)+(16.999131)(0)+(17.999160)(1)+(34.968853)(2)+(36.965903)(0)=239.769

43. (Cr-50)(Cr-50)(Cr-53)(O-18)(Cl-35)(Cl-35), (aCr-50)= 2,(aCr-52)=0,(aCr-53)=,(aCr-54)=0,(aO-16)=0,(aO-17)=0,(aO-18)=,(aCl-35)=2,(aCl-37)=0 with the probability of finding this isotopic combination in a beam of $Cr_3OCl_2$ being p=((3!)(1!)(2!)/((2!)(0!)(1!)(0!)(0!)(0!)(1!)(2!)(0!)))((4.345/100)^2)((83.789/100)^0)((9.501/100)^1)((2.365/100)^0)((99.757/100)^0)((0.038/100)^0)((0.205/100)^1) ((75.78/100)^2)((24.22/100)^0)=6.33×10^(−7)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)+(34.968853)(2)+(36.965903)(0)=240.770

44. (Cr-50)(Cr-50)(Cr-54)(O-18)(Cl-35)(Cl-35), (aCr-50)= 2,(aCr-52)=0,(aCr-53)=0,(aCr-54)=1,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((2!)(0!)(0!)(1!)(0!)(0!)(1!)(2!)(0!)))((4.345/100)^2)((83.789/100)^0)((9.501/100)^0)((2.365/100)^1)((99.757/100)^0)((0.038/100)^0)((0.205/100)^1) ((75.78/100)^2)((24.22/100)^0)=1.58×10^(−7)

the relative molecular mass of the isotopic combination being M=(49.946046)(2)+(51.940510)(0)+(52.940651)(0)+(53.938883)(1)+(15.994915)(0)+(16.999131)(0) +(17.999160)(1)+(34.968853)(2)+(36.965903)(0)=241.768

45. (Cr-50)(Cr-52)(Cr-52)(O-18)(Cl-35)(Cl-35), (aCr-50)= 1,(aCr-52)=2,(aCr-53)=0,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((1!)(2!)(0!)(0!)(0!)(0!)(1!)(2!)(o!)))((4.345/100)^1)((83.789/100)^2)((9.501/100)^0)((2.365/100)^0)((99.757/100)^0)((0.038/100)^0)((0.205/100)^1) ((75.78/100)^2)((24.22/100)^0)=1.08×10^(−4)

the relative molecular mass of the isotopic combination being M=(49.946046)(1)+(51.940510)(2)+(52.940651)(0)+(53.938883)(0)+(15.994915)(0)+(16.999131)(0)+(17.999160)(1)+(34.968853)(2)+(36.965903)(0)=241.764

46. (Cr-50)(Cr-52)(Cr-53)(O-18)(Cl-35)(Cl-35), (aCr-50)= 1,(aCr-52)=1,(aCr-53)=1,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((1!)(1!)(1!)(0!)(0!)(0!)(1!)(2!)(0!)))((4.345/100)^1)((83.789/100)^1)((9.501/100)^1)((2.365/100)^0)((99.757/100)^0)((0.038/100)^0)((0.205/100)^1) ((75.78/100)^2)((24.22/100)^0)=2.44×10^(−5)

the relative molecular mass of the isotopic combination being M=(49.946046)(1)+(51.940510)(1)+(52.940651)(1)+(53.938883)(0)+(15.994915)(0)+(16.999131)(0)+(17.999160)(1)+(34.968853)(2)+(36.965903)(0)=242.764

47. (Cr-50)(Cr-52)(Cr-54)(O-18)(Cl-35)(Cl-35), (aCr-50)= 1,(aCr-52)=,(aCr-53)=0,(aCr-54)=1,(aO-16)=0,(aO-17)=0,(aO-18)=1,(aCl-35)=2,(aCl-37)=0 with the probability of finding this isotopic combination in a beam of $Cr_3OCl_2$ being p=((3!)(1!)(2!)/((1!)(1!)(0!)(1!)(0!)(0!)(1!)(2!)(0!)))((4.345/100)^1)((83.789/100)^1)((9.501/100)^0)((2.365/100)^1)((99.757/100)^0)((0.038/100)^0)((0.205/100)^1) ((75.78/100)^2)((24.22/100)^0)=6.08×10^(−6)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)+(34.968853)(2)+(36.965903)(0)=243.762

48. (Cr-50)(Cr-53)(Cr-53)(O-18)(Cl-35)(Cl-35), (aCr-50)= 1,(aCr-52)=0,(aCr-53)=2,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((1!)(0!)(2!)(0!)(0!)(0!)(1!)(2!)(0!)))((4.345/100)^1)((83.789/100)^0)((9.501/100)^2)((2.365/100)^0)((99.757/100)^0)((0.038/100)^0)((0.205/100)^1) ((75.78/100)^2)((24.22/100)^0)=1.39×10^(−6)

the relative molecular mass of the isotopic combination being M=(49.946046)(1)+(51.940510)(0)+(52.940651)(2)+(53.938883)(0)+(15.994915)(0)+(16.999131)(0)+(17.999160)(1)+(34.968853)(2)+(36.965903)(0)=243.764

49. (Cr-50)(Cr-53)(Cr-54)(O-18)(Cl-35)(Cl-35), (aCr-50)= 1,(aCr-52)=0,(aCr-53)=1,(aCr-54)=1,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((1!)(0!)(1!)(1!)(0!)(0!)(1!)(2!)(0!)))((4.345/100)^1)((83.789/100)^0)((9.501/100)^1)((2.365/100)^1)((99.757/100)^0)((0.038/100)^0)((0.205/100)^1) ((75.78/100)^2)((24.22/100)^0)=6.90×10^(−7)

the relative molecular mass of the isotopic combination being M=(49.946046)(1)+(51.940510)(0)+(52.940651)(1)+(53.938883)(1)+(15.994915)(0)+(16.999131)(0) +(17.999160)(1)+(34.968853)(2)+(36.965903)(0)=244.762

50. (Cr-50)(Cr-54)(Cr-54)(O-18)(Cl-35)(Cl-35), (aCr-50)= 1,(aCr-52)=0,(aCr-53)=0,(aCr-54)=2,(aO-16)=0,(aO-17)= 0,(aO-18)=,(aCl-35)=2,(aCl-37)=0 with the probability of finding this isotopic combination in a beam of $Cr_3OCl_2$ being p=((3!)(1!)(2!)/((1!)(0!)(0!)(2!)(0!)(0!)(1!)(2!)(0!)))((4.345/100)^1)((83.789/100)^0)((9.501/100)^0)((2.365/100)^2)((99.757/100)^0)((0.038/100)^0)((0.205/100)^1) ((75.78/100)^2)((24.22/100)^0)=8.58×10^(−8)

the relative molecular mass of the isotopic combination being M=(49.946046)(1)+(51.940510)(0)+(52.940651)(0)+(53.938883)(2)+(15.994915)(0)+(16.999131)(0)+(17.999160)(1)+(34.968853)(2)+(36.965903)(0)=245.761

51. (Cr-52)(Cr-52)(Cr-52)(O-18)(Cl-35)(Cl-35), (aCr-50)= 0,(aCr-52)=3,(aCr-53)=0,(aCr-54)=0,(aO-16)=0,(aO-17)= 0,(aO-18)=,(aCl-35)=2,(aCl-37)=0 with the probability of finding this isotopic combination in a beam of $Cr_3OCl_2$ being p=((3!)(1!)(2!)/((0!)(3!)(0!)(0!)(0!)(0!)(1!)(2!)(0!)))((4.345/100)^0)((83.789/100)^3)((9.501/100)^0)((2.365/100)^0)((99.757/100)^0)((0.038/100)^0)((0.205/100)^1) ((75.78/100)^2)((24.22/100)^0)=6.93×10^(−4)

the relative molecular mass of the isotopic combination being M=(49.946046)(0)+(51.940510)(3)+(52.940651)(0)+(53.938883)(0)+(15.994915)(0)+(16.999131)(0)+(17.999160)(1)+(34.968853)(2)+(36.965903)(0)=243.758

52. (Cr-52)(Cr-52)(Cr-53)(O-18)(Cl-35)(Cl-35), (aCr-50)= 0,(aCr-52)=2,(aCr-53)=1,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(2!)(1!)(0!)(0!)(0!)(1!)(2!)(0!)))((4.345/100)^0)((83.789/100)^2)((9.501/100)^1)((2.365/100)^0)((99.757/100)^0)((0.038/100)^0)((0.205/100)^1) ((75.78/100)^2)((24.22/100)^0)= 2.36×10^(−4)

the relative molecular mass of the isotopic combination being M=(49.946046)(0)+(51.940510)(2)+(52.940651)(1)+(53.938883)(0)+(15.994915)(0)+(16.999131)(0)+(17.999160)(1)+(34.968853)(2)+(36.965903)(0)=244.759

53. (Cr-52)(Cr-52)(Cr-54)(O-18)(Cl-35)(Cl-35), (aCr-50)= 0,(aCr-52)=2,(aCr-53)=0,(aCr-54)=1,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(2!)(0!)(1!)(0!)(0!)(1!)(2!)(0!)))((4.345/100)^0)((83.789/100)^2)((9.501/100)^0)((2.365/100)^1)((99.757/100)^0)((0.038/100)^0)((0.205/100)^1) ((75.78/100)^2)((24.22/100)^0)= 5.86×10^(−5)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)+(34.968853)(2)+(36.965903)(0)=245.757

54. (Cr-52)(Cr-53)(Cr-53)(O-18)(Cl-35)(Cl-35), (aCr-50)= 0,(aCr-52)=1,(aCr-53)=2,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(1!)(2!)(0!)(0!)(0!)(1!)(2!)(0!)))((4.345/100)^0)((83.789/100)^1)((9.501/100)^2)((2.365/100)^0)((99.757/100)^0)((0.038/100)^0)((0.205/100)^1) ((75.78/100)^2)((24.22/100)^0)= 2.67×10^(−5)

the relative molecular mass of the isotopic combination being M=(49.946046)(0)+(51.940510)(1)+(52.940651)(2)+(53.938883)(0)+(15.994915)(0)+(16.999131)(0)+(17.999160)(1)+(34.968853)(2)+(36.965903)(0)=245.759

55. (Cr-52)(Cr-53)(Cr-54)(O-18)(Cl-35)(Cl-35), (aCr-50)= 0,(aCr-52)=1,(aCr-53)=1,(aCr-54)=1,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(1!)(1!)(1!)(0!)(0!)(1!)(2!)(0!)))((4.345/100)^0)((83.789/100)^1)((9.501/100)^1)((2.365/100)^1)((99.757/100)^0)((0.038/100)^0)((0.205/100)^1) ((75.78/100)^2)((24.22/100)^0)= 1.33×10^(−5)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)+(34.968853)(2)+(36.965903)(0)=246.757

56. (Cr-52)(Cr-54)(Cr-54)(O-18)(Cl-35)(Cl-35), (aCr-50)= 0,(aCr-52)=1,(aCr-53)=0,(aCr-54)=2,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(1!)(0!)(2!)(0!)(0!)(1!)(2!)(0!)))((4.345/100)^0)((83.789/100)^1)((9.501/100)^0)((2.365/100)^2)((99.757/100)^0)((0.038/100)^0)((0.205/100)^1) ((75.78/100)^2)((24.22/100)^0)= 1.66×10^(−6)

the relative molecular mass of the isotopic combination being M=(49.946046)(0)+(51.940510)(1)+(52.940651)(0)+(53.938883)(2)+(15.994915)(0)+(16.999131)(0)+(17.999160)(1)+(34.968853)(2)+(36.965903)(0)=247.755

57. (Cr-53)(Cr-53)(Cr-53)(O-18)(Cl-35)(Cl-35), (aCr-50)= 0,(aCr-52)=0,(aCr-53)=3,(aCr-54)=0,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(0!)(3!)(0!)(0!)(0!)(1!)(2!)(0!)))((4.345/100)^0)((83.789/100)^0)((9.501/100)^3)((2.365/100)^0)((99.757/100)^0)((0.038/100)^0)((0.205/100)^1) ((75.78/100)^2)((24.22/100)^0)= 1.01×10^(−6)

the relative molecular mass of the isotopic combination being M=(49.946046)(0)+(51.940510)(0)+(52.940651)(3)+(53.938883)(0)+(15.994915)(0)+(16.999131)(0)+(17.999160)(1)+(34.968853)(2)+(36.965903)(0)=246.759

58. (Cr-53)(Cr-53)(Cr-54)(O-18)(Cl-35)(Cl-35), (aCr-50)= 0,(aCr-52)=0,(aCr-53)=2,(aCr-54)=1,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(0!)(2!)(1!)(0!)(0!)(1!)(2!)(0!)))((4.345/100)^0)((83.789/100)^0)((9.501/100)^2)((2.365/100)^1)((99.757/100)^0)((0.038/100)^0)((0.205/100)^1) ((75.78/100)^2)((24.22/100)^0)= 7.54×10^(−7)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)+(34.968853)(2)+(36.965903)(0)=247.757

59. (Cr-53)(Cr-54)(Cr-54)(O-18)(Cl-35)(Cl-35), (aCr-50)= 0,(aCr-52)=0,(aCr-53)=1,(aCr-54)=2,(aO-16)=0,(aO-17)= 0,(aO-18)=1,(aCl-35)=2,(aCl-37)=0 with the probability of finding this isotopic combination in a beam of $Cr_3OCl_2$ being p=((3!)(1!)(2!)/((0!)(0!)(1!)(2!)(0!)(0!)(1!)(2!)(0!)))((4.345/100)^0)((83.789/100)^0)((9.501/100)^1)((2.365/100)^2)((99.757/100)^0)((0.038/100)^0)((0.205/100)^1) ((75.78/100)^2)((24.22/100)^0)= 1.88×10^(−7)

the relative molecular mass of the isotopic combination being M=(49.946046)(0)+(51.940510)(0)+(52.940651)(1)+(53.938883)(2)+(15.994915)(0)+(16.999131)(0)+(17.999160)(1)+(34.968853)(2)+(36.965903)(0)=248.755

60. (Cr-54)(Cr-54)(Cr-54)(O-18)(Cl-35)(Cl-35), (aCr-50)= 0,(aCr-52)=0,(aCr-53)=0,(aCr-54)=3,(aO-16)=0,(aO-17)= 0,(aO-18)=,(aCl-35)=2,(aCl-37)=0 with the probability of finding this isotopic combination in a beam of $Cr_3OCl_2$ being p=((3!)(1!)(2!)/((0!)(0!)(0!)(3!)(0!)(0!)(1!)(2!)(0!)))((4.345/100)^0)((83.789/100)^0)((9.501/100)^0)((2.365/100)^3)((99.757/100)^0)((0.038/100)^0)((0.205/100)^1) ((75.78/100)^2)((24.22/100)^0)= 1.56×10^(−8)

the relative molecular mass of the isotopic combination being M=(49.946046)(0)+(51.940510)(0)+(52.940651)(0)+(53.938883)(3)+(15.994915)(0)+(16.999131)(0)+(17.999160)(1)+(34.968853)(2)+(36.965903)(0)=249.754

61. (Cr-50)(Cr-50)(Cr-50)(O-16)(Cl-35)(Cl-37), (aCr-50)= 3,(aCr-52)=0,(aCr-53)=0,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((3!)(0!)(0!)(0!)(1!)(0!)(0!)(1!)(1!)))((4.345/100)^3)((83.789/100)^0)

((9.501/100)^0)((2.365/100)^0)((99.757/100)^1)((0.038/100)^0)((0.205/100)^0) ((75.78/100)^1)((24.22/100)^1)=3.004×10^(−5)

the relative molecular mass of the isotopic combination being M=(49.946046)(3)+(51.940510)(0)+(52.940651) (0)+(53.938883)(0)+(15.994915)(1)+(16.999131)(0)+(17.999160)(0)+(34.968853)(1)+(36.965903)(1)=237.768

62. (Cr-50)(Cr-50)(Cr-52)(O-16)(Cl-35)(Cl-37), (aCr-50)= 2,(aCr-52)=1,(aCr-53)=0,(aCr-54)=0,(aO-16)=1,(aO-17)= 0,(aO-18)=0,(aCl-35)=,(aCl-37)=1 with the probability of finding this isotopic combination in a beam of $Cr_3OCl_2$ being p=((3!)(1!)(2!)/((2!)(1!)(0!)(0!)(1!)(0!)(0!)(1!)(1!)))((4.345/100)^2)((83.789/100)^1)((9.501/100)^0)((2.365/100)^0)((99.757/100)^1)((0.038/100)^0)((0.205/100)^0) ((75.78/100)^1)((24.22/100)^1)=1.738×10^(−3)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)+(34.968853)(1)+(36.965903)(1)=239.762

63. (Cr-50)(Cr-50)(Cr-53)(O-16)(Cl-35)(Cl-37), (aCr-50)= 2,(aCr-52)=0,(aCr-53)=1,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((2!)(0!)(1!)(0!)(1!)(0!)(0!)(1!)(1!)))((4.345/100)^2)((83.789/100)^0)((9.501/100)^1)((2.365/100)^0)((99.757/100)^1)((0.038/100)^0)((0.205/100)^0) ((75.78/100)^1)((24.22/100)^1)=1.970×10^(−4)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)+(34.968853)(1)+(36.965903)(1)=240.762

64. (Cr-50)(Cr-50)(Cr-54)(O-16)(Cl-35)(Cl-37), (aCr-50)= 2,(aCr-52)=0,(aCr-53)=0,(aCr-54)=1,(aO-16)=1,(aO-17)= 0,(aO-18)=0,(aCl-35)=,(aCl-37)=1 with the probability of finding this isotopic combination in a beam of $Cr_3OCl_2$ being p=((3!)(1!)(2!)/((2!)(0!)(0!)(1!)(1!)(0!)(0!)(1!)(1!)))((4.345/100)^2)((83.789/100)^0)((9.501/100)^0)((2.365/100)^1)((99.757/100)^1)((0.038/100)^0)((0.205/100)^0) ((75.78/100)^1)((24.22/100)^1)=4.905×10^(−5)

the relative molecular mass of the isotopic combination being M=(49.946046)(2)+(51.940510)(0)+(52.940651)(0)+(53.938883)(1)+(15.994915)(1)+(16.999131)(0)+(17.999160)(0)+(34.968853)(1)+(36.965903)(1)=241.761

65. (Cr-50)(Cr-52)(Cr-52)(O-16)(Cl-35)(Cl-37), (aCr-50)= 1,(aCr-52)=2,(aCr-53)=0,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((1!)(2!)(0!)(0!)(1!)(0!)(0!)(1!)(1!)))((4.345/100)^1)((83.789/100)^2)((9.501/100)^0)((2.365/100)^0)((99.757/100)^1)((0.038/100)^0)((0.205/100)^0) ((75.78/100)^1)((24.22/100)^1)=3.35×10^(−2)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)+(34.968853)(1)+(36.965903)(1)=241.757

66. (Cr-50)(Cr-52)(Cr-53)(O-16)(Cl-35)(Cl-37), (aCr-50)= 1,(aCr-52)=,(aCr-53)=1,(aCr-54)=0,(aO-16)=1,(aO-17)=0,(aO-18)=0,(aCl-35)=1,(aCl-37)=1 with the probability of finding this isotopic combination in a beam of $Cr_3OCl_2$ being p=((3!)(1!)(2!)/((1!)(1!)(1!)(0!)(1!)(0!)(0!)(1!)(1!)))((4.345/100)^1)((83.789/100)^1)((9.501/100)^1)((2.365/100)^0)((99.757/100)^1)((0.038/100)^0)((0.205/100)^0) ((75.78/100)^1)((24.22/100)^1)=7.600×10^(−3)

the relative molecular mass of the isotopic combination being M=(49.946046)(1)+(51.940510)(1)+(52.940651)(1)+(53.938883)(0)+(15.994915)(1)+(16.999131)(0) +(17.999160)(0)+(34.968853)(1)+(36.965903)(1)=242.757

67. (Cr-50)(Cr-52)(Cr-54)(O-16)(Cl-35)(Cl-37), (aCr-50)= 1,(aCr-52)=1,(aCr-53)=0,(aCr-54)=1,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((1!)(1!)(0!)(1!)(1!)(0!)(0!)(1!)(1!)))((4.345/100)^1)((83.789/100)^1)((9.501/100)^0)((2.365/100)^1)((99.757/100)^1)((0.038/100)^0)((0.205/100)^0) ((75.78/100)^1)((24.22/100)^1)=1.892×10^(−3)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)+(34.968853)(1)+(36.965903)(1)=243.755

68. (Cr-50)(Cr-53)(Cr-53)(O-16)(Cl-35)(Cl-37), (aCr-50)= 1,(aCr-52)=0,(aCr-53)=2,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((1!)(0!)(2!)(0!)(1!)(0!)(0!)(1!)(1!)))((4.345/100)^1)((83.789/100)^0)((9.501/100)^2)((2.365/100)^0)((99.757/100)^1)((0.038/100)^0)((0.205/100)^0) ((75.78/100)^1)((24.22/100)^1)=4.309×10^(−4)

the relative molecular mass of the isotopic combination being M=(49.946046)(1)+(51.940510)(0)+(52.940651)(2)+(53.938883)(0)+(15.994915)(1)+(16.999131)(0)+(17.999160)(0)+(34.968853)(1)+(36.965903)(1)=243.757

69. (Cr-50)(Cr-53)(Cr-54)(O-16)(Cl-35)(Cl-37), (aCr-50)= 1,(aCr-52)=0,(aCr-53)=1,(aCr-54)=1,(aO-16)=,(aO-17)=0,(aO-18)=0,(aCl-35)=1,(aCl-37)=1 with the probability of finding this isotopic combination in a beam of $Cr_3OCl_2$ being p=((3!)(1!)(2!)/((1!)(0!)(1!)(1!)(1!)(0!)(0!)(1!)(1!)))((4.345/100)^1)((83.789/100)^0)((9.501/100)^1)((2.365/100)^1)((99.757/100)^1)((0.038/100)^0)((0.205/100)^0)((75.78/100)^1)((24.22/100)^1)=2.145×10^(−4)

the relative molecular mass of the isotopic combination being M=(49.946046)(1)+(51.940510)(0)+(52.940651)(1)+(53.938883)(1)+(15.994915)(1)+(16.999131)(0)+(17.999160)(0)+(34.968853)(1)+(36.965903)(1)=244.755

70. (Cr-50)(Cr-54)(Cr-54)(O-16)(Cl-35)(Cl-37), (aCr-50)= 1,(aCr-52)=0,(aCr-53)=0,(aCr-54)=2,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((1!)(0!)(0!)(2!)(1!)(0!)(0!)(1!)(1!)))((4.345/100)^1)((83.789/100)^0)((9.501/100)^0)((2.365/100)^2)((99.757/100)^1)((0.038/100)^0)((0.205/100)^0)((75.78/100)^1)((24.22/100)^1)=2.670×10^(−5)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)+(34.968853)(1)+(36.965903)(1)=245.753

71. (Cr-52)(Cr-52)(Cr-52)(O-16)(Cl-35)(Cl-37), (aCr-50)= 0,(aCr-52)=3,(aCr-53)=0,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(3!)(0!)(0!)(1!)(0!)(0!)(1!)(1!)))((4.345/100)^0)((83.789/100)^3)((9.501/100)^0)((2.365/100)^0)((99.757/100)^1)((0.038/100)^0)((0.205/100)^0)((75.78/100)^1)((24.22/100)^1)=0.2154 the relative molecular mass of the isotopic combination being M=(49.946046)(0)+(51.940510)(3)+(52.940651)(0)+(53.938883)(0)+(15.994915)(1)+(16.999131)(0)+(17.999160)(0)+(34.968853)(1)+(36.965903)(1)=243.751

72. (Cr-52)(Cr-52)(Cr-53)(O-16)(Cl-35)(Cl-37), (aCr-50)= 0,(aCr-52)=2,(aCr-53)=1,(aCr-54)=0,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(2!)(1!)(0!)(1!)(0!)(0!)(1!)(1!)))((4.345/100)^0)((83.789/100)^2)((9.501/100)^1)((2.365/100)^0)((99.757/100)^1)((0.038/100)^0)((0.205/100)^0)((75.78/100)^1)((24.22/100)^1)=7.328×10^(−2)

the relative molecular mass of the isotopic combination being M=(49.946046)(0)+(51.940510)(2)+(52.940651)(1)+(53.938883)(0)+(15.994915)(1)+(16.999131)(0)+(17.999160)(0)+(34.968853)(1)+(36.965903)(1)=244.751

73. (Cr-52)(Cr-52)(Cr-54)(O-16)(Cl-35)(Cl-37), (aCr-50)= 0,(aCr-52)=2,(aCr-53)=0,(aCr-54)=1,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(2!)(0!)(1!)(1!)(0!)(0!)(1!)(1!)))((4.345/100)^0)((83.789/100)^2)((9.501/100)^0)((2.365/100)^1)((99.757/100)^1)((0.038/100)^0)((0.205/100)^0)((75.78/100)^1)((24.22/100)^1)=1.824×10^(−2)

the relative molecular mass of the isotopic combination being M=(49.946046)(0)+(51.940510)(2)+(52.940651)(0)+(53.938883)(1)+(15.994915)(1)+(16.999131)(0)+(17.999160)(0)+(34.968853)(1)+(36.965903)(1)=245.750

74. (Cr-52)(Cr-53)(Cr-53)(O-16)(Cl-35)(Cl-37), (aCr-50)= 0,(aCr-52)=,(aCr-53)=2,(aCr-54)=0,(aO-16)=1,(aO-17)=0,(aO-18)=0,(aCl-35)=1,(aCl-37)=1 with the probability of finding this isotopic combination in a beam of $Cr_3OCl_2$ being p=((3!)(1!)(2!)/((0!)(1!)(2!)(0!)(1!)(0!)(0!)(1!)(1!)))((4.345/100)^0)((83.789/100)^1)((9.501/100)^2)((2.365/100)^0)((99.757/100)^1)((0.038/100)^0)((0.205/100)^0)((75.78/100)^1)((24.22/100)^1)=8.309×10^(−3)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)+(34.968853)(1)+(36.965903)(1)=245.751

75. (Cr-52)(Cr-53)(Cr-54)(O-16)(Cl-35)(Cl-37), (aCr-50)= 0,(aCr-52)=1,(aCr-53)=1,(aCr-54)=1,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(1!)(1!)(1!)(1!)(0!)(0!)(1!)(1!)))((4.345/100)^0)((83.789/100)^1)((9.501/100)^1)((2.365/100)^1)((99.757/100)^1)((0.038/100)^0)((0.205/100)^0)((75.78/100)^1)((24.22/100)^1)=4.137×10^(−3)

the relative molecular mass of the isotopic combination being M=(49.946046)(0)+(51.940510)(1)+(52.940651)(1)+(53.938883)(1)+(15.994915)(1)+(16.999131)(0)+(17.999160)(0)+(34.968853)(1)+(36.965903)(1)=246.750

76. (Cr-52)(Cr-54)(Cr-54)(O-16)(Cl-35)(Cl-37), (aCr-50)= 0,(aCr-52)=1,(aCr-53)=0,(aCr-54)=2,(aO-16)=,(aO-17)=0,(aO-18)=0,(aCl-35)=1,(aCl-37)=1 with the probability of finding this isotopic combination in a beam of $Cr_3OCl_2$ being p=((3!)(1!)(2!)/((0!)(1!)(0!)(2!)(1!)(0!)(0!)(1!)(1!)))((4.345/100)^0)((83.789/100)^1)((9.501/100)^0)((2.365/100)^2)((99.757/100)^1)((0.038/100)^0)((0.205/100)^0)((75.78/100)^1)((24.22/100)^1)=5.148×10^(−4)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)+(34.968853)(1)+(36.965903)(1)=247.748

77. (Cr-53)(Cr-53)(Cr-53)(O-16)(Cl-35)(Cl-37), (aCr-50)= 0,(aCr-52)=0,(aCr-53)=3,(aCr-54)=0,(aO-16)=1,(aO-17)= 0,(aO-18)=0,(aCl-35)=,(aCl-37)=1 with the probability of finding this isotopic combination in a beam of $Cr_3OCl_2$ being p=((3!)(1!)(2!)/((0!)(0!)(3!)(0!)(1!)(0!)(0!)(1!)(1!)))((4.345/100)^0)((83.789/100)^0)((9.501/100)^3)((2.365/100)^0)((99.757/100)^1)((0.038/100)^0)((0.205/100)^0)((75.78/100)^1)((24.22/100)^1)=3.141×10^(−4)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)+(34.968853)(1)+(36.965903)(1)=246.752

78. (Cr-53)(Cr-53)(Cr-54)(O-16)(Cl-35)(Cl-37), (aCr-50)= 0,(aCr-52)=0,(aCr-53)=2,(aCr-54)=1,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(0!)(2!)(1!)(1!)(0!)(0!)(1!)(1!)))((4.345/100)^0)((83.789/100)^0)((9.501/100)^2)((2.365/100)^1)((99.757/100)^1)((0.038/100)^0)((0.205/100)^0)((75.78/100)^1)((24.22/100)^1)=2.345×10^(−4)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)+(34.968853)(1)+(36.965903)(1)=247.750

79. (Cr-53)(Cr-54)(Cr-54)(O-16)(Cl-35)(Cl-37), (aCr-50)= 0,(aCr-52)=0,(aCr-53)=1,(aCr-54)=2,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(0!)(1!)(2!)(1!)(0!)(0!)(1!)(1!)))((4.345/100)^0)((83.789/100)^0)((9.501/100)^1)((2.365/100)^2)((99.757/100)^1)((0.038/100)^0)((0.205/100)^0)((75.78/100)^1)((24.22/100)^1)=5.838×10^(−5)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)+(34.968853)(1)+(36.965903)(1)=248.748

80. (Cr-54)(Cr-54)(Cr-54)(O-16)(Cl-35)(Cl-37), (aCr-50)= 0,(aCr-52)=0,(aCr-53)=0,(aCr-54)=3,(aO-16)=1,(aO-17)= 0,(aO-18)=0,(aCl-35)=1,(aCl-37)=1 with the probability of finding this isotopic combination in a beam of $Cr_3OCl_2$ being p=((3!)(1!)(2!)/((0!)(0!)(0!)(3!)(1!)(0!)(0!)(1!)(1!)))((4.345/100)^0)((83.789/100)^0)

((9.501/100)^0)((2.365/100)^3)((99.757/100)^1)((0.038/100)^0)((0.205/100)^0)((75.78/100)^1)((24.22/100)^1)=4.844×10^(−6)

the relative molecular mass of the isotopic combination being M=(49.946046)(0)+(51.940510)(0)+(52.940651)(0)+(53.938883)(3)+(15.994915)(1)+(16.999131)(0)+(17.999160)(0)+(34.968853)(1)+(36.965903)(1)=249.746

81. (Cr-50)(Cr-50)(Cr-50)(O-17)(Cl-35)(Cl-37), (aCr-50)= 3,(aCr-52)=0,(aCr-53)=0,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((3!)(0!)(0!)(0!)(0!)(1!)(0!)(1!)(1!)))((4.345/100)^3)((83.789/100)^0)((9.501/100)^0)((2.365/100)^0)((99.757/100)^0)((0.038/100)^1)((0.205/100)^0)((75.78/100)^1)((24.22/100)^1)=1.1×10^(−8)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)+(34.968853)(1)+(36.965903)(1)=238.772

82. (Cr-50)(Cr-50)(Cr-52)(O-17)(Cl-35)(Cl-37), (aCr-50)= 2,(aCr-52)=1,(aCr-53)=0,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((2!)(1!)(0!)(0!)(0!)(1!)(0!)(1!)(1!)))((4.345/100)^2)((83.789/100)^1)((9.501/100)^0)((2.365/100)^0)((99.757/100)^0)((0.038/100)^1)((0.205/100)^0)((75.78/100)^1)((24.22/100)^1)=6.6×10^(−7)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)+(34.968853)(1)+(36.965903)(1)=240.766

83. (Cr-50)(Cr-50)(Cr-53)(O-17)(Cl-35)(Cl-37), (aCr-50)= 2,(aCr-52)=0,(aCr-53)=1,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((2!)(0!)(1!)(0!)(0!)(1!)(0!)(1!)(1!)))((4.345/100)^2)((83.789/100)^0)((9.501/100)^1)((2.365/100)^0)((99.757/100)^0)((0.038/100)^1)((0.205/100)^0)((75.78/100)^1)((24.22/100)^1)=7.5×10^(−8)

the relative molecular mass of the isotopic combination being M=(49.946046)(2)+(51.940510)(0)+(52.940651)(1)+(53.938883)(0)+(15.994915)(0)+(16.999131)(1)+(17.999160)(0)+(34.968853)(1)+(36.965903)(1)=241.767

84. (Cr-50)(Cr-50)(Cr-54)(O-17)(Cl-35)(Cl-37), (aCr-50)= 2,(aCr-52)=0,(aCr-53)=0,(aCr-54)=1,(aO-16)=0,(aO-17)= 1,(aO-18)=0,(aCl-35)=,(aCl-37)=1 with the probability of finding this isotopic combination in a beam of $Cr_3OCl_2$ being p=((3!)(1!)(2!)/((2!)(0!)(0!)(1!)(0!)(1!)(0!)(1!)(1!)))((4.345/100)^2)((83.789/100)^0)((9.501/100)^0)((2.365/100)^1)((99.757/100)^0)((0.038/100)^1)((0.205/100)^0)((75.78/100)^1)((24.22/100)^1)=1.9×10^(−8)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)+(34.968853)(1)+(36.965903)(1)=242.765

85. (Cr-50)(Cr-52)(Cr-52)(O-17)(Cl-35)(Cl-37), (aCr-50)= 1,(aCr-52)=2,(aCr-53)=0,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((1!)(2!)(0!)(0!)(0!)(1!)(0!)(1!)(1!)))((4.345/100)^1)((83.789/100)^2)((9.501/100)^0)((2.365/100)^0)((99.757/100)^0)((0.038/100)^1)((0.205/100)^0)((75.78/100)^1)((24.22/100)^1)=1.3×10^(−5)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)+(34.968853)(1)+(36.965903)(1)=242.761

86. (Cr-50)(Cr-52)(Cr-53)(O-17)(Cl-35)(Cl-37), (aCr-50)= 1,(aCr-52)=1,(aCr-53)=1,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((1!)(1!)(1!)(0!)(0!)(1!)(0!)(1!)(1!)))((4.345/100)^1)((83.789/100)^1)((9.501/100)^1)((2.365/100)^0)((99.757/100)^0)((0.038/100)^1)((0.205/100)^0)((75.78/100)^1)((24.22/100)^1)=2.9×10^(−6)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)+(34.968853)(1)+(36.965903)(1)=243.761

87. (Cr-50)(Cr-52)(Cr-54)(O-17)(Cl-35)(Cl-37), (aCr-50)= 1,(aCr-52)=1,(aCr-53)=0,(aCr-54)=1,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((1!)(1!)(0!)(1!)(0!)(1!)(0!)(1!)(1!)))((4.345/100)^1)((83.789/100)^1)((9.501/100)^0)((2.365/100)^1)((99.757/100)^0)((0.038/100)^1)((0.205/100)^0)((75.78/100)^1)((24.22/100)^1)=7.2×10^(−7)

the relative molecular mass of the isotopic combination being M=(49.946046)(1)+(51.940510)(1)+(52.940651)(0)+(53.938883)(1)+(15.994915)(0)+(16.999131)(1)+(17.999160)(0)+(34.968853)(1)+(36.965903)(1)=244.759

88. (Cr-50)(Cr-53)(Cr-53)(O-17)(Cl-35)(Cl-37), (aCr-50)= 1,(aCr-52)=0,(aCr-53)=2,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((1!)(0!)(2!)(0!)(0!)(1!)(0!)(1!)(1!)))((4.345/100)^1)((83.789/100)^0)((9.501/100)^2)((2.365/100)^0)((99.757/100)^0)((0.038/100)^1)((0.205/100)^0)((75.78/100)^1)((24.22/100)^1)=1.6×10^(−7)

the relative molecular mass of the isotopic combination being M=(49.946046)(1)+(51.940510)(0)+(52.940651)(2)+(53.938883)(0)+(15.994915)(0)+(16.999131)(1)+(17.999160)(0)+(34.968853)(1)+(36.965903)(1)=244.761

89. (Cr-50)(Cr-53)(Cr-54)(O-17)(Cl-35)(Cl-37), (aCr-50)= 1,(aCr-52)=0,(aCr-53)=1,(aCr-54)=1,(aO-16)=0,(aO-17)= 1,(aO-18)=0,(aCl-35)=,(aCl-37)=1 with the probability of finding this isotopic combination in a beam of $Cr_3OCl_2$ being p=((3!)(1!)(2!)/((1!)(0!)(1!)(1!)(0!)(1!)(0!)(1!)(1!)))((4.345/100)^1)((83.789/100)^0)((9.501/100)^1)((2.365/100)^1)((99.757/100)^0)((0.038/100)^1)((0.205/100)^0)((75.78/100)^1)((24.22/100)^1)=8.2×10^(−8)

the relative molecular mass of the isotopic combination being M=(49.946046)(1)+(51.940510)(0)+(52.940651)(1)+(53.938883)(1)+(15.994915)(0)+(16.999131)(1) +(17.999160)(0)+(34.968853)(1)+(36.965903)(1)=245.759

90. (Cr-50)(Cr-54)(Cr-54)(O-17)(Cl-35)(Cl-37), (aCr-50)= 1,(aCr-52)=0,(aCr-53)=0,(aCr-54)=2,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((1!)(0!)(0!)(2!)(0!)(1!)(0!)(1!)(1!)))((4.345/100)^1)((83.789/100)^0)((9.501/100)^0)((2.365/100)^2)((99.757/100)^0)((0.038/100)^1)((0.205/100)^0)((75.78/100)^1)((24.22/100)^1)=1.0×10^(−8)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)+(34.968853)(1)+(36.965903)(1)=246.758

91. (Cr-52)(Cr-52)(Cr-52)(O-17)(Cl-35)(Cl-37), (aCr-50)= 0,(aCr-52)=3,(aCr-53)=0,(aCr-54)=0,(aO-16)=0,(aO-117)= ,(aO-18)=0,(aCl-35)=1,(aCl-37)=1 with the probability of finding this isotopic combination in a beam of $Cr_3OCl_2$ being p=((3!)(1!)(2!)/((0!)(3!)(0!)(0!)(0!)(1!)(0!)(1!)(1!)))((4.345/100)^0)((83.789/100)^3)((9.501/100)^0)((2.365/100)^0)((99.757/100)^0)((0.038/100)^1)((0.205/100)^0)((75.78/100)^1)((24.22/100)^1)=8.2×10^(−5)

the relative molecular mass of the isotopic combination being M=(49.946046)(0)+(51.940510)(3)+(52.940651)(0)+(53.938883)(0)+(15.994915)(0)+(16.999131)(1)+(17.999160)(0)+(34.968853)(1)+(36.965903)(1)=244.755

92. (Cr-52)(Cr-52)(Cr-53)(O-17)(Cl-35)(Cl-37), (aCr-50)= 0,(aCr-52)=2,(aCr-53)=1,(aCr-54)=0,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((0!)(2!)(1!)(0!)(0!)(1!)(0!)(1!)(1!)))((4.345/100)^0)((83.789/100)^2)((9.501/100)^1)((2.365/100)^0)((99.757/100)^0)((0.038/100)^1)((0.205/100)^0)((75.78/100)^1)((24.22/100)^1)=2.8×10^(−5)

the relative molecular mass of the isotopic combination being M=(49.946046)(0)+(51.940510)(2)+(52.940651)(1)+(53.938883)(0)+(15.994915)(0)+(16.999131)(1) +(17.999160)(0)+(34.968853)(1)+(36.965903)(1)=245.756

93. (Cr-52)(Cr-52)(Cr-54)(O-17)(Cl-35)(Cl-37), (aCr-50)= 0,(aCr-52)=2,(aCr-53)=0,(aCr-54)=1,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((0!)(2!)(0!)(1!)(0!)(1!)(0!)(1!)(1!)))((4.345/100)^0)((83.789/100)^2)((9.501/100)^0)((2.365/100)^1)((99.757/100)^0)((0.038/100)^1)((0.205/100)^0)((75.78/100)^1)((24.22/100)^1)=6.9×10^(−6)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)+(34.968853)(1)+(36.965903)(1)=246.754

94. (Cr-52)(Cr-53)(Cr-53)(O-17)(Cl-35)(Cl-37), (aCr-50)= 0,(aCr-52)=,(aCr-53)=2,(aCr-54)=0,(aO-16)=0,(aO-17)=1,(aO-18)=0,(aCl-35)=1,(aCl-37)=1 with the probability of finding this isotopic combination in a beam of $Cr_3OCl_2$ being p=((3!)(1!)(2!)/((0!)(1!)(2!)(0!)(0!)(1!)(0!)(1!)(1!)))((4.345/100)^0)((83.789/100)^1)((9.501/100)^2)((2.365/100)^0)((99.757/100)^0)((0.038/100)^1)((0.205/100)^0)((75.78/100)^1)((24.22/100)^1)=3.2×10^(−6)

the relative molecular mass of the isotopic combination being M=(49.946046)(0)+(51.940510)(1)+(52.940651)(2)+(53.938883)(0)+(15.994915)(0)+(16.999131)(1)+(17.999160)(0)+(34.968853)(1)+(36.965903)(1)=246.756

95. (Cr-52)(Cr-53)(Cr-54)(O-17)(Cl-35)(Cl-37), (aCr-50)= 0,(aCr-52)=1,(aCr-53)=1,(aCr-54)=1,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((0!)(1!)(1!)(1!)(0!)(1!)(0!)(1!)(1!)))((4.345/100)^0)((83.789/100)^1)((9.501/100)^1)((2.365/100)^1)((99.757/100)^0)((0.038/100)^1)((0.205/100)^0)((75.78/100)^1)((24.22/100)^1)=10.6×10^(−6)

the relative molecular mass of the isotopic combination being M=(49.946046)(0)+(51.940510)(1)+(52.940651)(1)+(53.938883)(1)+(15.994915)(0)+(16.999131)(1) +(17.999160)(0)+(34.968853)(1)+(36.965903)(1)=247.754

96. (Cr-52)(Cr-54)(Cr-54)(O-17)(Cl-35)(Cl-37), (aCr-50)= 0,(aCr-52)=1,(aCr-53)=0,(aCr-54)=2,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((0!)(1!)(0!)(2!)(0!)(1!)(0!)(1!)(1!)))((4.345/100)^0)((83.789/100)^1)((9.501/100)^0)((2.365/100)^2)((99.757/100)^0)((0.038/100)^1)((0.205/100)^0)((75.78/100)^1)((24.22/100)^1)=2.0×10^(−7)

the relative molecular mass of the isotopic combination being M=(49.946046)(0)+(51.940510)(1)+(52.940651)(0)+(53.938883)(2)+(15.994915)(0)+(16.999131)(1)+(17.999160)(0)+(34.968853)(1)+(36.965903)(1)=248.752

97. (Cr-53)(Cr-53)(Cr-53)(O-17)(Cl-35)(Cl-37), (aCr-50)= 0,(aCr-52)=0,(aCr-53)=3,(aCr-54)=0,(aO-16)=0,(aO-17)= 1,(aO-18)=0,(aCl-35)=,(aCl-37)=1 with the probability of finding this isotopic combination in a beam of $Cr_3OCl_2$ being p=((3!)(1!)(2!)/((0!)(0!)(3!)(0!)(0!)(1!)(0!)(1!)(1!)))((4.345/100)^0)((83.789/100)^0)((9.501/100)^3)((2.365/100)^0)((99.757/100)^0)((0.038/100)^1)((0.205/100)^0)((75.78/100)^1)((24.22/100)^1)=1.2×10^(−7)

the relative molecular mass of the isotopic combination being M=(49.946046)(0)+(51.940510)(0)+(52.940651)(3)+(53.938883)(0)+(15.994915)(0)+(16.999131)(1)+(17.999160)(0)+(34.968853)(1)+(36.965903)(1)=247.756

98. (Cr-53)(Cr-53)(Cr-54)(O-17)(Cl-35)(Cl-37), (aCr-50)= 0,(aCr-52)=0,(aCr-53)=2,(aCr-54)=1,(aO-16)=0,(aO-17)= 1,(aO-18)=0,(aCl-35)=1,(aCl-37)=1 with the probability of finding this isotopic combination in a beam of $Cr_3OCl_2$ being p=((3!)(1!)(2!)/((0!)(0!)(2!)(1!)(0!)(1!)(0!)(1!)(1!)))((4.345/100)^0)((83.789/100)^0)((9.501/100)^2)((2.365/100)^1)((99.757/100)^0)((0.038/100)^1)((0.205/100)^0)((75.78/100)^1)((24.22/100)^1)=8.9×10^(−8)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)+(34.968853)(1)+(36.965903)(1)=248.754

99. (Cr-53)(Cr-54)(Cr-54)(O-17)(Cl-35)(Cl-37), (aCr-50)= 0,(aCr-52)=0,(aCr-53)=1,(aCr-54)=2,(aO-16)=0,(aO-17)= 1,(aO-18)=0,(aCl-35)=,(aCl-37)=1 with the probability of finding this isotopic combination in a beam of $Cr_3OCl_2$ being p=((3!)(1!)(2!)/((0!)(0!)(1!)(2!)(0!)(1!)(0!)(1!)(1!)))((4.345/100)^0)((83.789/100)^0)

((9.501/100)^1)((2.365/100)^2)((99.757/100)^0)((0.038/100)^1)((0.205/100)^0)((75.78/100)^1)((24.22/100)^1)=2.2×10^(8)

the relative molecular mass of the isotopic combination being M=(49.946046)(0)+(51.940510)(0)+(52.940651)(1)+(53.938883)(2)+(15.994915)(0)+(16.999131)(1)+(17.999160)(0)+(34.968853)(1)+(36.965903)(1)=249.752

100. (Cr-54)(Cr-54)(Cr-54)(O-17)(Cl-35)(Cl-37), (aCr-50)=0,(aCr-52)=0,(aCr-53)=0,(aCr-54)=3,(aO-16)=0,(aO-17)=1,(aO-18)=0,(aCl-35)=1,(aCl-37)=1 with the probability of finding this isotopic combination in a beam of $Cr_3OCl_2$ being p=((3!)(1!)(2!)/((0!)(0!)(0!)(3!)(0!)(1!)(0!)(1!)(1!)))((4.345/100)^0)((83.789/100)^0)((9.501/100)^0)((2.365/100)^3)((99.757/100)^0)((0.038/100)^1)((0.205/100)^0)((75.78/100)^1)((24.22/100)^1)=1.8×10^(−9)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)+(34.968853)(1)+(36.965903)(1)=250.751

101. (Cr-50)(Cr-50)(Cr-50)(O-18)(Cl-35)(Cl-37), (aCr-50)=3,(aCr-52)=0,(aCr-53)=0,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((3!)(0!)(0!)(0!)(0!)(0!)(1!)(1!)(1!)))((4.345/100)^3)((83.789/100)^0)((9.501/100)^0)((2.365/100)^0)((99.757/100)^0)((0.038/100)^0)((0.205/100)^1)((75.78/100)^1)((24.22/100)^1)=6.17×10^(−8)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)+(34.968853)(1)+(36.965903)(1)=239.772

102. (Cr-50)(Cr-50)(Cr-52)(O-18)(Cl-35)(Cl-37), (aCr-50)=2,(aCr-52)=1,(aCr-53)=0,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((2!)(1!)(0!)(0!)(0!)(0!)(1!)(1!)(1!)))((4.345/100)^2)((83.789/100)^1)((9.501/100)^0)((2.365/100)^0)((99.757/100)^0)((0.038/100)^0)((0.205/100)^1)((75.78/100)^1)((24.22/100)^1)=3.57×10^(−6)

the relative molecular mass of the isotopic combination being M=(49.946046)(2)+(51.940510)(1)+(52.940651)(0)+(53.938883)(0)+(15.994915)(0)+(16.999131)(0) +(17.999160)(1)+(34.968853)(1)+(36.965903)(1)=241.767

103. (Cr-50)(Cr-50)(Cr-53)(O-18)(Cl-35)(Cl-37), (aCr-50)=2,(aCr-52)=0,(aCr-53)=,(aCr-54)=0,(aO-16)=0,(aO-17)= 0,(aO-18)=1,(aCl-35)=1,(aCl-37)=1 with the probability of finding this isotopic combination in a beam of $Cr_3OCl_2$ being p=((3!)(1!)(2!)/((2!)(0!)(1!)(0!)(0!)(0!)(1!)(1!)(1!)))((4.345/100)^2)((83.789/100)^0)((9.501/100)^1)((2.365/100)^0)((99.757/100)^0)((0.038/100)^0)((0.205/100)^1)((75.78/100)^1)((24.22/100)^1)=4.05×10^(−7)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)+(34.968853)(1)+(36.965903)(1)=242.767

104. (Cr-50)(Cr-50)(Cr-54)(O-18)(Cl-35)(Cl-37), (aCr-50)=2,(aCr-52)=0,(aCr-53)=0,(aCr-54)=1,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((2!)(0!)(0!)(1!)(0!)(0!)(1!)(1!)(1!)))((4.345/100)^2)((83.789/100)^0)((9.501/100)^0)((2.365/100)^1)((99.757/100)^0)((0.038/100)^0)((0.205/100)^1)((75.78/100)^1)((24.22/100)^1)=1.01×10^(−7)

the relative molecular mass of the isotopic combination being M=(49.946046)(2)+(51.940510)(0)+(52.940651)(0)+(53.938883)(1)+(15.994915)(0)+(16.999131)(0)+(17.999160)(1)+(34.968853)(1)+(36.965903)(1)=243.765

105. (Cr-50)(Cr-52)(Cr-52)(O-18)(Cl-35)(Cl-37), (aCr-50)=1,(aCr-52)=2,(aCr-53)=0,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((1!)(2!)(0!)(0!)(0!)(0!)(1!)(1!)(1!)))((4.345/100)^1)((83.789/100)^2)((9.501/100)^0)((2.365/100)^0)((99.757/100)^0)((0.038/100)^0)((0.205/100)^1)((75.78/100)^1)((24.22/100)^1)=6.89×10^(−5)

the relative molecular mass of the isotopic combination being M=(49.946046)(1)+(51.940510)(2)+(52.940651)(0)+(53.938883)(0)+(15.994915)(0)+(16.999131)(0)+(17.999160)(1)+(34.968853)(1)+(36.965903)(1)=243.761

106. (Cr-50)(Cr-52)(Cr-53)(O-18)(Cl-35)(Cl-37), (aCr-50)=1,(aCr-52)=1,(aCr-53)=1,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((1!)(1!)(1!)(0!)(0!)(0!)(1!)(1!)(1!)))((4.345/100)^1)((83.789/100)^1)((9.501/100)^1)((2.365/100)^0)((99.757/100)^0)((0.038/100)^0)((0.205/100)^1)((75.78/100)^1)((24.22/100)^1)=1.56×10^(−5)

the relative molecular mass of the isotopic combination being M=(49.946046)(1)+(51.940510)(1)+(52.940651)(1)+(53.938883)(0)+(15.994915)(0)+(16.999131)(0)+(17.999160)(1)+(34.968853)(1)+(36.965903)(1)=244.761

107. (Cr-50)(Cr-52)(Cr-54)(O-18)(Cl-35)(Cl-37), (aCr-50)=1,(aCr-52)=,(aCr-53)=0,(aCr-54)=1,(aO-16)=0,(aO-17)= 0,(aO-18)=1,(aCl-35)=1,(aCl-37)=1 with the probability of finding this isotopic combination in a beam of $Cr_3OCl_2$ being p=((3!)(1!)(2!)/((1!)(1!)(0!)(1!)(0!)(0!)(1!)(1!)(1!)))((4.345/100)^1)((83.789/100)^1)((9.501/100)^0)((2.365/100)^1)((99.757/100)^0)((0.038/100)^0)((0.205/100)^1)((75.78/100)^1)((24.22/100)^1)=3.89×10^(−6)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)+(34.968853)(1)+(36.965903)(1)=245.759

108. (Cr-50)(Cr-53)(Cr-53)(O-18)(Cl-35)(Cl-37), (aCr-50)=1,(aCr-52)=0,(aCr-53)=2,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((1!)(0!)(2!)(0!)(0!)(0!)(1!)(1!)(1!)))((4.345/100)^1)((83.789/100)^0)((9.501/100)^2)((2.365/100)^0)((99.757/100)^0)((0.038/100)^0)((0.205/100)^1)((75.78/100)^1)((24.22/100)^1)=8.85×10^(−7)

the relative molecular mass of the isotopic combination being M=(49.946046)(1)+(51.940510)(0)+(52.940651)(2)+(53.938883)(0)+(15.994915)(0)+(16.999131)(0)+(17.999160)(1)+(34.968853)(1)+(36.965903)(1)=245.761

109. (Cr-50)(Cr-53)(Cr-54)(O-18)(Cl-35)(Cl-37), (aCr-50)=1,(aCr-52)=0,(aCr-53)=,(aCr-54)=1,(aO-16)=0,(aO-17)= 0,(aO-18)=1,(aCl-35)=,(aCl-37)=1 with the probability of finding this isotopic combination in a beam of $Cr_3OCl_2$ being p=((3!)(1!)(2!)/((1!)(0!)(1!)(1!)(0!)(0!)(1!)(1!)(1!)))((4.345/100)^1)((83.789/100)^0)((9.501/100)^1)((2.365/100)^1)((99.757/100)^0)((0.038/100)^0)((0.205/100)^1)((75.78/100)^1)((24.22/100)^1)=4.41×10^(−7)

the relative molecular mass of the isotopic combination being M=(49.946046)(1)+(51.940510)(0)+(52.940651)(1)+(53.938883)(1)+(15.994915)(0)+(16.999131)(0)+(17.999160)(1)+(34.968853)(1)+(36.965903)(1)=246.759

110. (Cr-50)(Cr-54)(Cr-54)(O-18)(Cl-35)(Cl-37), (aCr-50)=1,(aCr-52)=0,(aCr-53)=0,(aCr-54)=2,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((1!)(0!)(0!)(2!)(0!)(0!)(1!)(1!)(1!)))((4.345/100)^1)((83.789/100)^0)((9.501/100)^0)((2.365/100)^2)((99.757/100)^0)((0.038/100)^0)((0.205/100)^1)((75.78/100)^1)((24.22/100)^1)=5.49×10^(−8)

the relative molecular mass of the isotopic combination being M=(49.946046)(1)+(51.940510)(0)+(52.940651)(0)+(53.938883)(2)+(15.994915)(0)+(16.999131)(0) +(17.999160)(1)+(34.968853)(1)+(36.965903)(1)=247.758

111. (Cr-52)(Cr-52)(Cr-52)(O-18)(Cl-35)(Cl-37), (aCr-50)=0,(aCr-52)=3,(aCr-53)=0,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((0!)(3!)(0!)(0!)(0!)(0!)(1!)(1!)(1!)))((4.345/100)^0)((83.789/100)^3)((9.501/100)^0)((2.365/100)^0)((99.757/100)^0)((0.038/100)^0)((0.205/100)^1)((75.78/100)^1)((24.22/100)^1)=4.43×10^(−4)

the relative molecular mass of the isotopic combination being M=(49.946046)(0)+(51.940510)(3)+(52.940651)(0)+(53.938883)(0)+(15.994915)(0)+(16.999131)(0)+(17.999160)(1)+(34.968853)(1)+(36.965903)(1)=245.755

112. (Cr-52)(Cr-52)(Cr-53)(O-18)(Cl-35)(Cl-37), (aCr-50)=0,(aCr-52)=2,(aCr-53)=1,(aCr-54)=0,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((0!)(2!)(1!)(0!)(0!)(0!)(1!)(1!)(1!)))((4.345/100)^0)((83.789/100)^2)((9.501/100)^1)((2.365/100)^0)((99.757/100)^0)((0.038/100)^0)((0.205/100)^1)((75.78/100)^1)((24.22/100)^1)=1.51×10^(−4)

the relative molecular mass of the isotopic combination being M=(49.946046)(0)+(51.940510)(2)+(52.940651)(1)+(53.938883)(0)+(15.994915)(0)+(16.999131)(0)+(17.999160)(1)+(34.968853)(1)+(36.965903)(1)=246.756

113. (Cr-52)(Cr-52)(Cr-54)(O-18)(Cl-35)(Cl-37), (aCr-50)=0,(aCr-52)=2,(aCr-53)=0,(aCr-54)=1,(aO-16)=0,(aO-17)=0,(aO-18)=,(aCl-35)=1,(aCl-37)=1 with the probability of finding this isotopic combination in a beam of $Cr_3OCl_2$ being p=((3!)(1!)(2!)/((0!)(2!)(0!)(1!)(0!)(0!)(1!)(1!)(1!)))((4.345/100)^0)((83.789/100)^2)((9.501/100)^0)((2.365/100)^1)((99.757/100)^0)((0.038/100)^0)((0.205/100)^1)((75.78/100)^1)((24.22/100)^1)=3.75×10^(−5)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)+(34.968853)(1)+(36.965903)(1)=247.754

114. (Cr-52)(Cr-53)(Cr-53)(O-18)(Cl-35)(Cl-37), (aCr-50)=0,(aCr-52)=,(aCr-53)=2,(aCr-54)=0,(aO-16)=0,(aO-17)= 0,(aO-18)=1,(aCl-35)=1,(aCl-37)=1 with the probability of finding this isotopic combination in a beam of $Cr_3OCl_2$ being p=((3!)(1!)(2!)/((0!)(1!)(2!)(0!)(0!)(0!)(1!)(1!)(1!)))((4.345/100)^0)((83.789/100)^1)((9.501/100)^2)((2.365/100)^0)((99.757/100)^0)((0.038/100)^0)((0.205/100)^1)((75.78/100)^1)((24.22/100)^1)=1.71×10^(−5)

the relative molecular mass of the isotopic combination being M=(49.946046)(0)+(51.940510)(1)+(52.940651)(2)+(53.938883)(0)+(15.994915)(0)+(16.999131)(0)+(17.999160)(1)+(34.968853)(1)+(36.965903)(1)=247.756

115. (Cr-52)(Cr-53)(Cr-54)(O-18)(Cl-35)(Cl-37), (aCr-50)=0,(aCr-52)=1,(aCr-53)=1,(aCr-54)=1,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((0!)(1!)(1!)(1!)(0!)(0!)(1!)(1!)(1!)))((4.345/100)^0)((83.789/100)^1)((9.501/100)^1)((2.365/100)^1)((99.757/100)^0)((0.038/100)^0)((0.205/100)^1)((75.78/100)^1)((24.22/100)^1)=8.50×10^(−6)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)+(34.968853)(1)+(36.965903)(1)=248.754

116. (Cr-52)(Cr-54)(Cr-54)(O-18)(Cl-35)(Cl-37), (aCr-50)=0,(aCr-52)=,(aCr-53)=0,(aCr-54)=2,(aO-16)=0,(aO-17)= 0,(aO-18)=1,(aCl-35)=1,(aCl-37)=1 with the probability of finding this isotopic combination in a beam of $Cr_3OCl_2$ being p=((3!)(1!)(2!)/((0!)(1!)(0!)(2!)(0!)(0!)(1!)(1!)(1!)))((4.345/100)^0)((83.789/100)^1)((9.501/100)^0)((2.365/100)^2)((99.757/100)^0)((0.038/100)^0)((0.205/100)^1)((75.78/100)^1)((24.22/100)^1)=10.06×10^(−6)

the relative molecular mass of the isotopic combination being M=(49.946046)(0)+(51.940510)(1)+(52.940651)(0)+(53.938883)(2)+(15.994915)(0)+(16.999131)(0)+(17.999160)(1)+(34.968853)(1)+(36.965903)(1)=249.752

117. (Cr-53)(Cr-53)(Cr-53)(O-18)(Cl-35)(Cl-37), (aCr-50)=0,(aCr-52)=0,(aCr-53)=3,(aCr-54)=0,(aO-16)=0,(aO-17)=0,(aO-18)=1,(aCl-35)=,(aCl-37)=1 with the probability of finding this isotopic combination in a beam of $Cr_3OCl_2$ being p=((3!)(1!)(2!)/((0!)(0!)(3!)(0!)(0!)(0!)(1!)(1!)(1!)))((4.345/100)^0)((83.789/100)^0)((9.501/100)^3)((2.365/100)^0)((99.757/100)^0)((0.038/100)^0)((0.205/100)^1)((75.78/100)^1)((24.22/100)^1)=6.45×10^(−7)

the relative molecular mass of the isotopic combination being M=(49.946046)(0)+(51.940510)(0)+(52.940651)(3)+(53.938883)(0)+(15.994915)(0)+(16.999131)(0)+(17.999160)(1)+(34.968853)(1)+(36.965903)(1)=248.756

118. (Cr-53)(Cr-53)(Cr-54)(O-18)(Cl-35)(Cl-37), (aCr-50)=0,(aCr-52)=0,(aCr-53)=2,(aCr-54)=1,(aO-16)=0,(aO-17)=0,(aO-18)=,(aCl-35)=1,(aCl-37)=1 with the probability of finding this isotopic combination in a beam of $Cr_3OCl_2$ being p=((3!)(1!)(2!)/((0!)(0!)(2!)(1!)(0!)(0!)(1!)(1!)(1!)))((4.345/100)^0)((83.789/100)^0)

((9.501/100)^2)((2.365/100)^1)((99.757/100)^0)((0.038/100)^0)((0.205/100)^1)((75.78/100)^1)((24.22/100)^1)=4.82×10^(−7)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)+(34.968853)(1)+(36.965903)(1)=249.754

119. (Cr-53)(Cr-54)(Cr-54)(O-18)(Cl-35)(Cl-37), (aCr-50)=0,(aCr-52)=0,(aCr-53)=1,(aCr-54)=2,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((0!)(0!)(1!)(2!)(0!)(0!)(1!)(1!)(1!)))((4.345/100)^0)((83.789/100)^0)((9.501/100)^1)((2.365/100)^2)((99.757/100)^0)((0.038/100)^0)((0.205/100)^1)((75.78/100)^1)((24.22/100)^1)=1.20×10^(−7)

the relative molecular mass of the isotopic combination being M=(49.946046)(0)+(51.940510)(0)+(52.940651)(1)+(53.938883)(2)+(15.994915)(0)+(16.999131)(0)+(17.999160)(1)+(34.968853)(1)+(36.965903)(1)=250.752

120. (Cr-54)(Cr-54)(Cr-54)(O-18)(Cl-35)(Cl-37), (aCr-50)=0,(aCr-52)=0,(aCr-53)=0,(aCr-54)=3,(aO-16)=0,(aO-17)=0,(aO-18)=1,(aCl-35)=1,(aCl-37)=1 with the probability of finding this isotopic combination in a beam of $Cr_3OCl_2$ being p=((3!)(1!)(2!)/((0!)(0!)(0!)(3!)(0!)(0!)(1!)(1!)(1!)))((4.345/100)^0)((83.789/100)^0)((9.501/100)^0)((2.365/100)^3)((99.757/100)^0)((0.038/100)^0)((0.205/100)^1)((75.78/100)^1)((24.22/100)^1)=9.95×10^(−9)

the relative molecular mass of the isotopic combination being M=(49.946046)(0)+(51.940510)(0)+(52.940651)(0)+(53.938883)(3)+(15.994915)(0)+(16.999131)(0)+(17.999160)(1)+(34.968853)(1)+(36.965903)(1)=251.751

121. (Cr-50)(Cr-50)(Cr-50)(O-16)(Cl-37)(Cl-37), (aCr-50)=3,(aCr-52)=0,(aCr-53)=0,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((3!)(0!)(0!)(0!)(1!)(0!)(0!)(0!)(2!)))((4.345/100)^3)((83.789/100)^0)((9.501/100)^0)((2.365/100)^0)((99.757/100)^1)((0.038/100)^0)((0.205/100)^0)((75.78/100)^0)((24.22/100)^2)=4.800×10^(−6)

the relative molecular mass of the isotopic combination being M=(49.946046)(3)+(51.940510)(0)+(52.940651)(0)+(53.938883)(0)+(15.994915)(1)+(16.999131)(0)+(17.999160)(0)+(34.968853)(0)+(36.965903)(2)=239.765

122. (Cr-50)(Cr-50)(Cr-52)(O-16)(Cl-37)(Cl-37), (aCr-50)=2,(aCr-52)=1,(aCr-53)=0,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((2!)(1!)(0!)(0!)(1!)(0!)(0!)(0!)(2!)))((4.345/100)^2)((83.789/100)^1)((9.501/100)^0)((2.365/100)^0)((99.757/100)^1)((0.038/100)^0)((0.205/100)^0)((75.78/100)^0)((24.22/100)^2)=2.777×10^(−4)

the relative molecular mass of the isotopic combination being M=(49.946046)(2)+(51.940510)(1)+(52.940651)(0)+(53.938883)(0)+(15.994915)(1)+(16.999131)(0)+(17.999160)(0)+(34.968853)(0)+(36.965903)(2)=241.759

123. (Cr-50)(Cr-50)(Cr-53)(O-16)(Cl-37)(Cl-37), (aCr-50)=2,(aCr-52)=0,(aCr-53)=1,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((2!)(0!)(1!)(0!)(1!)(0!)(0!)(0!)(2!)))((4.345/100)^2)((83.789/100)^0)((9.501/100)^1)((2.365/100)^0)((99.757/100)^1)((0.038/100)^0)((0.205/100)^0)((75.78/100)^0)((24.22/100)^2)=3.149×10^(−5)

the relative molecular mass of the isotopic combination being M=(49.946046)(2)+(51.940510)(0)+(52.940651)(1)+(53.938883)(0)+(15.994915)(1)+(16.999131)(0)+(17.999160)(0)+(34.968853)(0)+(36.965903)(2)=242.759

124. (Cr-50)(Cr-50)(Cr-54)(O-16)(Cl-37)(Cl-37), (aCr-50)=2,(aCr-52)=0,(aCr-53)=0,(aCr-54)=1,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((2!)(0!)(0!)(1!)(1!)(0!)(0!)(0!)(2!)))((4.345/100)^2)((83.789/100)^0)((9.501/100)^0)((2.365/100)^1)((99.757/100)^1)((0.038/100)^0)((0.205/100)^0)((75.78/100)^0)((24.22/100)^2)=7.838×10^(−6)

the relative molecular mass of the isotopic combination being M=(49.946046)(2)+(51.940510)(0)+(52.940651)(0)+(53.938883)(1)+(15.994915)(1)+(16.999131)(0)+(17.999160)(0)+(34.968853)(0)+(36.965903)(2)=243.758

125. (Cr-50)(Cr-52)(Cr-52)(O-16)(Cl-37)(Cl-37), (aCr-50)=1,(aCr-52)=2,(aCr-53)=0,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((1!)(2!)(0!)(0!)(1!)(0!)(0!)(0!)(2!)))((4.345/100)^1)((83.789/100)^2)((9.501/100)^0)((2.365/100)^0)((99.757/100)^1)((0.038/100)^0)((0.205/100)^0)((75.78/100)^0)((24.22/100)^2)=5.355×10^(−3)

the relative molecular mass of the isotopic combination being M=(49.946046)(1)+(51.940510)(2)+(52.940651)(0)+(53.938883)(0)+(15.994915)(1)+(16.999131)(0)+(17.999160)(0)+(34.968853)(0)+(36.965903)(2)=243.754

126. (Cr-50)(Cr-52)(Cr-53)(O-16)(Cl-37)(Cl-37), (aCr-50)=1,(aCr-52)=1,(aCr-53)=1,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((1!)(1!)(1!)(0!)(1!)(0!)(0!)(0!)(2!)))((4.345/100)^1)((83.789/100)^1)((9.501/100)^1)((2.365/100)^0)((99.757/100)^1)((0.038/100)^0)((0.205/100)^0)((75.78/100)^0)((24.22/100)^2)=1.214×10^(−3)

the relative molecular mass of the isotopic combination being M=(49.946046)(1)+(51.940510)(1)+(52.940651)(1)+(53.938883)(0)+(15.994915)(1)+(16.999131)(0)+ (17.999160)(0)+(34.968853)(0)+(36.965903)(2)=244.754

127. (Cr-50)(Cr-52)(Cr-54)(O-16)(Cl-37)(Cl-37), (aCr-50)=1,(aCr-52)=,(aCr-53)=0,(aCr-54)=1,(aO-16)=1,(aO-17)= 0,(aO-18)=0,(aCl-35)=0,(aCl-37)=2 with the probability of finding this isotopic combination in a beam of $Cr_3OCl_2$ being p=((3!)(1!)(2!)/((1!)(1!)(0!)(1!)(1!)(0!)(0!)(0!)(2!)))((4.345/100)^1)((83.789/100)^1)((9.501/100)^0)((2.365/100)^1)((99.757/100)^1)((0.038/100)^0)((0.205/100)^0)((75.78/100)^0)((24.22/100)^2)=3.023×10^(−4)

the relative molecular mass of the isotopic combination being M=(49.946046)(1)+(51.940510)(1)+(52.940651)(0)+(53.938883)(1)+(15.994915)(1)+(16.999131)(0)+(17.999160)(0)+(34.968853)(0)+(36.965903)(2)=245.752

128. (Cr-50)(Cr-53)(Cr-53)(O-16)(Cl-37)(Cl-37), (aCr-50)=1,(aCr-52)=0,(aCr-53)=2,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((1!)(0!)(2!)(0!)(1!)(0!)(0!)(0!)(2!)))((4.345/100)^1)((83.789/100)^0)((9.501/100)^2)((2.365/100)^0)((99.757/100)^1)((0.038/100)^0)((0.205/100)^0)((75.78/100)^0)((24.22/100)^2)=6.886×10^(−5)

the relative molecular mass of the isotopic combination being M=(49.946046)(1)+(51.940510)(0)+(52.940651) (2)+(53.938883)(0)+(15.994915)(1)+(16.999131)(0)+(17.999160)(0)+(34.968853)(0)+(36.965903)(2)=245.754

129. (Cr-50)(Cr-53)(Cr-54)(O-16)(Cl-37)(Cl-37), (aCr-50)=1,(aCr-52)=0,(aCr-53)=1,(aCr-54)=1,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((1!)(0!)(1!)(1!)(1!)(0!)(0!)(0!)(2!)))((4.345/100)^1)((83.789/100)^0)((9.501/100)^1)((2.365/100)^1)((99.757/100)^1)((0.038/100)^0)((0.205/100)^0)((75.78/100)^0)((24.22/100)^2)=3.428×10^(−5)

the relative molecular mass of the isotopic combination being M=(49.946046)(1)+(51.940510)(0)+(52.940651)(1)+(53.938883)(1)+(15.994915)(1)+(16.999131)(0) +(17.999160)(0)+(34.968853)(0)+(36.965903)(2)=246.752

130. (Cr-50)(Cr-54)(Cr-54)(O-16)(Cl-37)(Cl-37), (aCr-50)=1,(aCr-52)=0,(aCr-53)=0,(aCr-54)=2,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((1!)(0!)(0!)(2!)(1!)(0!)(0!)(0!)(2!)))((4.345/100)^1)((83.789/100)^0)((9.501/100)^0)((2.365/100)^2)((99.757/100)^1)((0.038/100)^0)((0.205/100)^0)((75.78/100)^0)((24.22/100)^2)=4.266×10^(−6)

the relative molecular mass of the isotopic combination being M=(49.946046)(1)+(51.940510)(0)+(52.940651)(0)+(53.938883)(2)+(15.994915)(1)+(16.999131)(0)+(17.999160)(0)+(34.968853)(0)+(36.965903)(2)=247.751

131. (Cr-52)(Cr-52)(Cr-52)(O-16)(Cl-37)(Cl-37), (aCr-50)=0,(aCr-52)=3,(aCr-53)=0,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(3!)(0!)(0!)(1!)(0!)(0!)(0!)(2!)))((4.345/100)^0)((83.789/100)^3)((9.501/100)^0)((2.365/100)^0)((99.757/100)^1)((0.038/100)^0)((0.205/100)^0)((75.78/100)^0)((24.22/100)^2)=3.442×10^(−2)

the relative molecular mass of the isotopic combination being M=(49.946046)(0)+(51.940510)(3)+(52.940651)(0)+(53.938883)(0)+(15.994915)(1)+(16.999131)(0)+(17.999160)(0)+(34.968853)(0)+(36.965903)(2)=245.748

132. (Cr-52)(Cr-52)(Cr-53)(O-16)(Cl-37)(Cl-37), (aCr-50)=0,(aCr-52)=2,(aCr-53)=1,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(2!)(1!)(0!)(1!)(0!)(0!)(0!)(2!)))((4.345/100)^0)((83.789/100)^2)((9.501/100)^1)((2.365/100)^0)((99.757/100)^1)((0.038/100)^0)((0.205/100)^0)((75.78/100)^0)((24.22/100)^2)=1.171×10^(−2)

the relative molecular mass of the isotopic combination being M=(49.946046)(0)+(51.940510)(2)+(52.940651)(1)+(53.938883)(0)+(15.994915)(1)+(16.999131)(0)+(17.999160)(0)+(34.968853)(0)+(36.965903)(2)=246.748

133. (Cr-52)(Cr-52)(Cr-54)(O-16)(Cl-37)(Cl-37), (aCr-50)=0,(aCr-52)=2,(aCr-53)=0,(aCr-54)=1,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(2!)(0!)(1!)(1!)(0!)(0!)(0!)(2!)))((4.345/100)^0)((83.789/100)^2)((9.501/100)^0)((2.365/100)^1)((99.757/100)^1)((0.038/100)^0)((0.205/100)^0)((75.78/100)^0)((24.22/100)^2)=2.915×10^(−3)

the relative molecular mass of the isotopic combination being M=(49.946046)(0)+(51.940510)(2)+(52.940651)(0)+(53.938883)(1)+(15.994915)(1)+(16.999131)(0)+(17.999160)(0)+(34.968853)(0)+(36.965903)(2)=247.747

134. (Cr-52)(Cr-53)(Cr-53)(O-16)(Cl-37)(Cl-37), (aCr-50)=0,(aCr-52)=1,(aCr-53)=2,(aCr-54)=0,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(1!)(2!)(0!)(1!)(0!)(0!)(0!)(2!)))((4.345/100)^0)((83.789/100)^1)((9.501/100)^2)((2.365/100)^0)((99.757/100)^1)((0.038/100)^0)((0.205/100)^0)((75.78/100)^0)((24.22/100)^2)=1.328×10^(−3)

the relative molecular mass of the isotopic combination being M=(49.946046)(0)+(51.940510)(1)+(52.940651)(2)+(53.938883)(0)+(15.994915)(1)+(16.999131)(0)+(17.999160)(0)+(34.968853)(0)+(36.965903)(2)=247.749

135. (Cr-52)(Cr-53)(Cr-54)(O-16)(Cl-37)(Cl-37), (aCr-50)=0,(aCr-52)=1,(aCr-53)=1,(aCr-54)=1,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(1!)(1!)(1!)(1!)(0!)(0!)(0!)(2!)))((4.345/100)^0)((83.789/100)^1)((9.501/100)^1)((2.365/100)^1)((99.757/100)^1)((0.038/100)^0)((0.205/100)^0)((75.78/100)^0)((24.22/100)^2)=6.610×10^(−4)

the relative molecular mass of the isotopic combination being M=(49.946046)(0)+(51.940510)(1)+(52.940651)(1)+(53.938883)(1)+(15.994915)(1)+(16.999131)(0)+(17.999160)(0)+(34.968853)(0)+(36.965903)(2)=248.747

136. (Cr-52)(Cr-54)(Cr-54)(O-16)(Cl-37)(Cl-37), (aCr-50)=0,(aCr-52)=,(aCr-53)=0,(aCr-54)=2,(aO-16)=1,(aO-17)= 0,(aO-18)=0,(aCl-35)=0,(aCl-37)=2 with the probability of finding this isotopic combination in a beam of $Cr_3OCl_2$ being p=((3!)(1!)(2!)/((0!)(1!)(0!)(2!)(1!)(0!)(0!)(0!)(2!)))((4.345/100)^0)((83.789/100)^1)((9.501/100)^0)((2.365/100)^2)((99.757/100)^1)((0.038/100)^0)((0.205/100)^0)((75.78/100)^0)((24.22/100)^2)=8.227×10^(−5)

the relative molecular mass of the isotopic combination being M=(49.946046)(0)+(51.940510)(1)+(52.940651)(0)+(53.938883)(2)+(15.994915)(1)+(16.999131)(0)+(17.999160)(0)+(34.968853)(0)+(36.965903)(2)=249.745

137. (Cr-53)(Cr-53)(Cr-53)(O-16)(Cl-37)(Cl-37), (aCr-50)=0,(aCr-52)=0,(aCr-53)=3,(aCr-54)=0,(aO-16)=,(aO-17)= 0,(aO-18)=0,(aCl-35)=0,(aCl-37)=2 with the probability of finding this isotopic combination in a beam of $Cr_3OCl_2$ being p=((3!)(1!)(2!)/((0!)(0!)(3!)(0!)(1!)(0!)(0!)(0!)(2!)))((4.345/100)^0)((83.789/100)^0)

((9.501/100)^3)((2.365/100)^0)((99.757/100)^1)((0.038/100)^0)((0.205/100)^0)((75.78/100)^0)((24.22/100)^2)=5.019×10^(−5)

the relative molecular mass of the isotopic combination being M=(49.946046)(0)+(51.940510)(0)+(52.940651)(3)+(53.938883)(0)+(15.994915)(1)+(16.999131)(0)+(17.999160)(0)+(34.968853)(0)+(36.965903)(2)=248.749

138. (Cr-53)(Cr-53)(Cr-54)(O-16)(Cl-37)(Cl-37), (aCr-50)=0,(aCr-52)=0,(aCr-53)=2,(aCr-54)=1,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(0!)(2!)(1!)(1!)(0!)(0!)(0!)(2!)))((4.345/100)^0)((83.789/100)^0)((9.501/100)^2)((2.365/100)^1)((99.757/100)^1)((0.038/100)^0)((0.205/100)^0)((75.78/100)^0)((24.22/100)^2)=3.748×10^(−5)

the relative molecular mass of the isotopic combination being M=(49.946046)(0)+(51.940510)(0)+(52.940651)(2)+(53.938883)(1)+(15.994915)(1)+(16.999131)(0)+(17.999160)(0)+(34.968853)(0)+(36.965903)(2)=249.747

139. (Cr-53)(Cr-54)(Cr-54)(O-16)(Cl-37)(Cl-37), (aCr-50)=0,(aCr-52)=0,(aCr-53)=1,(aCr-54)=2,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(0!)(1!)(2!)(1!)(0!)(0!)(0!)(2!)))((4.345/100)^0)((83.789/100)^0)((9.501/100)^1)((2.365/100)^2)((99.757/100)^1)((0.038/100)^0)((0.205/100)^0)((75.78/100)^0)((24.22/100)^2)=9.329×10^(−6)

the relative molecular mass of the isotopic combination being M=(49.946046)(0)+(51.940510)(0)+(52.940651)(1)+(53.938883)(2)+(15.994915)(1)+(16.999131)(0)+(17.999160)(0)+(34.968853)(0)+(36.965903)(2)=250.745

140. (Cr-54)(Cr-54)(Cr-54)(O-16)(Cl-37)(Cl-37), (aCr-50)=0,(aCr-52)=0,(aCr-53)=0,(aCr-54)=3,(aO-16)=1,(aO-17)=0,(aO-18)=0,(aCl-35)=0,(aCl-37)=2 with the probability of finding this isotopic combination in a beam of $Cr_3OCl_2$ being p=((3!)(1!)(2!)/((0!)(0!)(0!)(3!)(1!)(0!)(0!)(0!)(2!)))((4.345/100)^0)((83.789/100)^0)((9.501/100)^0)((2.365/100)^3)((99.757/100)^1)((0.038/100)^0)((0.205/100)^0)((75.78/100)^0)((24.22/100)^2)=7.741×10^(−7)

the relative molecular mass of the isotopic combination being M=(49.946046)(0)+(51.940510)(0)+(52.940651)(0)+(53.938883)(3)+(15.994915)(1)+(16.999131)(0)+(17.999160)(0)+(34.968853)(0)+(36.965903)(2)=251.743

141. (Cr-50)(Cr-50)(Cr-50)(O-17)(Cl-37)(Cl-37), (aCr-50)=3,(aCr-52)=0,(aCr-53)=0,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((3!)(0!)(0!)(0!)(0!)(1!)(0!)(0!)(2!)))((4.345/100)^3)((83.789/100)^0)((9.501/100)^0)((2.365/100)^0)((99.757/100)^0)((0.038/100)^1)((0.205/100)^0)((75.78/100)^0)((24.22/100)^2)=1.8×10^(−9)

the relative molecular mass of the isotopic combination being M=(49.946046)(3)+(51.940510)(0)+(52.940651)(0)+(53.938883)(0)+(15.994915)(0)+(16.999131)(1)+(17.999160)(0)+(34.968853)(0)+(36.965903)(2)=240.769

142. (Cr-50)(Cr-50)(Cr-52)(O-17)(Cl-37)(Cl-37), (aCr-50)=2,(aCr-52)=,(aCr-53)=0,(aCr-54)=0,(aO-16)=0,(aO-17)= 1,(aO-18)=0,(aCl-35)=0,(aCl-37)=2 with the probability of finding this isotopic combination in a beam of $Cr_3OCl_2$ being p=((3!)(1!)(2!)/((2!)(1!)(0!)(0!)(0!)(1!)(0!)(0!)(2!)))((4.345/100)^2)((83.789/100)^1)((9.501/100)^0)((2.365/100)^0)((99.757/100)^0)((0.038/100)^1)((0.205/100)^0)((75.78/100)^0)((24.22/100)^2)=10.1×10^(−7)

the relative molecular mass of the isotopic combination being M=(49.946046)(2)+(51.940510)(1)+(52.940651)(0)+(53.938883)(0)+(15.994915)(0)+(16.999131)(1)+(17.999160)(0)+(34.968853)(0)+(36.965903)(2)=242.764

143. (Cr-50)(Cr-50)(Cr-53)(O-17)(Cl-37)(Cl-37), (aCr-50)=2,(aCr-52)=0,(aCr-53)=1,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((2!)(0!)(1!)(0!)(0!)(1!)(0!)(0!)(2!)))((4.345/100)^2)((83.789/100)^0)((9.501/100)^1)((2.365/100)^0)((99.757/100)^0)((0.038/100)^1)((0.205/100)^0)((75.78/100)^0)((24.22/100)^2)=1.2×10^(−8)

the relative molecular mass of the isotopic combination being M=(49.946046)(2)+(51.940510)(0)+(52.940651)(1)+(53.938883)(0)+(15.994915)(0)+(16.999131)(1)+(17.999160)(0)+(34.968853)(0)+(36.965903)(2)=243.764

144. (Cr-50)(Cr-50)(Cr-54)(O-17)(Cl-37)(Cl-37), (aCr-50)=2,(aCr-52)=0,(aCr-53)=0,(aCr-54)=1,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((2!)(0!)(0!)(1!)(0!)(1!)(0!)(0!)(2!)))((4.345/100)^2)((83.789/100)^0)((9.501/100)^0)((2.365/100)^1)((99.757/100)^0)((0.038/100)^1)((0.205/100)^0)((75.78/100)^0)((24.22/100)^2)=3.0×10^(−9)

the relative molecular mass of the isotopic combination being M=(49.946046)(2)+(51.940510)(0)+(52.940651)(0)+(53.938883)(1)+(15.994915)(0)+(16.999131)(1)+(17.999160)(0)+(34.968853)(0)+(36.965903)(2)=244.762

145. (Cr-50)(Cr-52)(Cr-52)(O-17)(Cl-37)(Cl-37), (aCr-50)=1,(aCr-52)=2,(aCr-53)=0,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((1!)(2!)(0!)(0!)(0!)(1!)(0!)(0!)(2!)))((4.345/100)^1)((83.789/100)^2)((9.501/100)^0)((2.365/100)^0)((99.757/100)^0)((0.038/100)^1)((0.205/100)^0)((75.78/100)^0)((24.22/100)^2)=2.0×10^(−6)

the relative molecular mass of the isotopic combination being M=(49.946046)(1)+(51.940510)(2)+(52.940651)(0)+(53.938883)(0)+(15.994915)(0)+(16.999131)(1)+(17.999160)(0)+(34.968853)(0)+(36.965903)(2)=244.758

146. (Cr-50)(Cr-52)(Cr-53)(O-17)(Cl-37)(Cl-37), (aCr-50)=1,(aCr-52)=1,(aCr-53)=1,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((1!)(1!)(1!)(0!)(0!)(1!)(0!)(0!)(2!)))((4.345/100)^1)((83.789/100)^1)((9.501/100)^1)((2.365/100)^0)((99.757/100)^0)((0.038/100)^1)((0.205/100)^0)((75.78/100)^0)((24.22/100)^2)=4.6×10^(−7)

the relative molecular mass of the isotopic combination being M=(49.946046)(1)+(51.940510)(1)+(52.940651)(1)+(53.938883)(0)+(15.994915)(0)+(16.999131)(1)+(17.999160)(0)+(34.968853)(0)+(36.965903)(2)=245.758

147. (Cr-50)(Cr-52)(Cr-54)(O-17)(Cl-37)(Cl-37), (aCr-50)=1,(aCr-52)=,(aCr-53)=0,(aCr-54)=1,(aO-16)=0,(aO-17)= 1,(aO-18)=0,(aCl-35)=0,(aCl-37)=2 with the probability of finding this isotopic combination in a beam of $Cr_3OCl_2$ being p=((3!)(1!)(2!)/((1!)(1!)(0!)(1!)(0!)(1!)(0!)(0!)(2!)))((4.345/100)^1)((83.789/100)^1)((9.501/100)^0)((2.365/100)^1)((99.757/100)^0)((0.038/100)^1)((0.205/100)^0)((75.78/100)^0)((24.22/100)^2)=1.2×10^(−7)

the relative molecular mass of the isotopic combination being M=(49.946046)(1)+(51.940510)(1)+(52.940651)(0)+(53.938883)(1)+(15.994915)(0)+(16.999131)(1)+(17.999160)(0)+(34.968853)(0)+(36.965903)(2)=246.756

148. (Cr-50)(Cr-53)(Cr-53)(O-17)(Cl-37)(Cl-37), (aCr-50)=1,(aCr-52)=0,(aCr-53)=2,(aCr-54)=0,(aO-16)=0,(aO-17)=,(aO-18)=0,(aCl-35)=0,(aCl-37)=2 with the probability of finding this isotopic combination in a beam of $Cr_3OCl_2$ being p=((3!)(1!)(2!)/((1!)(0!)(2!)(0!)(0!)(1!)(0!)(0!)(2!)))((4.345/100)^1)((83.789/100)^0)((9.501/100)^2)((2.365/100)^0)((99.757/100)^0)((0.038/100)^1)((0.205/100)^0)((75.78/100)^0)((24.22/100)^2)=2.6×10^(−8)

the relative molecular mass of the isotopic combination being M=(49.946046)(1)+(51.940510)(0)+(52.940651)(2)+(53.938883)(0)+(15.994915)(0)+(16.999131)(1)+(17.999160)(0)+(34.968853)(0)+(36.965903)(2)=246.758

149. (Cr-50)(Cr-53)(Cr-54)(O-17)(Cl-37)(Cl-37), (aCr-50)=1,(aCr-52)=0,(aCr-53)=1,(aCr-54)=1,(aO-16)=0,(aO-117)=1,(aO-18)=0,(aCl-35)=0,(aCl-37)=2 with the probability of finding this isotopic combination in a beam of $Cr_3OCl_2$ being p=((3!)(1!)(2!)/((1!)(0!)(1!)(1!)(0!)(1!)(0!)(0!)(2!)))((4.345/100)^1)((83.789/100)^0)((9.501/100)^1)((2.365/100)^1)((99.757/100)^1)((0.038/100))((0.205/100)^0)((75.78/100)^0)((24.22/100)^2)=1.3×10^(−8)

the relative molecular mass of the isotopic combination being M=(49.946046)(1)+(51.940510)(0)+(52.940651)(1)+(53.938883)(1)+(15.994915)(0)+(16.999131)(1)+(17.999160)(0)+(34.968853)(0)+(36.965903)(2)=247.757

150. (Cr-50)(Cr-54)(Cr-54)(O-17)(Cl-37)(Cl-37), (aCr-50)=1,(aCr-52)=0,(aCr-53)=0,(aCr-54)=2,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((1!)(0!)(0!)(2!)(0!)(1!)(0!)(0!)(2!)))((4.345/100)^1)((83.789/100)^0)((9.501/100)^0)((2.365/100)^2)((99.757/100)^0)((0.038/100)^1)((0.205/100)^0)((75.78/100)^0)((24.22/100)^2)=1.6×10^(−9)

the relative molecular mass of the isotopic combination being M=(49.946046)(1)+(51.940510)(0)+(52.940651)(0)+(53.938883)(2)+(15.994915)(0)+(16.999131)(1)+(17.999160)(0)+(34.968853)(0)+(36.965903)(2)=248.755

151. (Cr-52)(Cr-52)(Cr-52)(O-17)(Cl-37)(Cl-37), (aCr-50)=0,(aCr-52)=3,(aCr-53)=0,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(3!)(0!)(0!)(0!)(1!)(0!)(0!)(2!)))((4.345/100)^0)((83.789/100)^3)((9.501/100)^0)((2.365/100)^0)((99.757/100)^0)((0.038/100)^1)((0.205/100)^0)((75.78/100)^0)((24.22/100)^2)=1.3×10^(−5)

the relative molecular mass of the isotopic combination being M=(49.946046)(0)+(51.940510)(3)+(52.940651)(0)+(53.938883)(0)+(15.994915)(0)+(16.999131)(1)+(17.999160)(0)+(34.968853)(0)+(36.965903)(2)=246.752

152. (Cr-52)(Cr-52)(Cr-53)(O-17)(Cl-37)(Cl-37), (aCr-50)=0,(aCr-52)=2,(aCr-53)=1,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(2!)(1!)(0!)(0!)(1!)(0!)(0!)(2!)))((4.345/100)^0)((83.789/100)^2)((9.501/100)^1)((2.365/100)^0)((99.757/100)^0)((0.038/100)^1)((0.205/100)^0)((75.78/100)^0)((24.22/100)^2)=4.5×10^(−6)

the relative molecular mass of the isotopic combination being M=(49.946046)(0)+(51.940510)(2)+(52.940651)(1)+(53.938883)(0)+(15.994915)(0)+(16.999131)(1)+(17.999160)(0)+(34.968853)(0)+(36.965903)(2)=247.753

153. (Cr-52)(Cr-52)(Cr-54)(O-17)(Cl-37)(Cl-37), (aCr-50)=0,(aCr-52)=2,(aCr-53)=0,(aCr-54)=1,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(2!)(0!)(1!)(0!)(1!)(0!)(0!)(2!)))((4.345/100)^0)((83.789/100)^2)((9.501/100)^0)((2.365/100)^1)((99.757/100)^0)((0.038/100)^1)((0.205/100)^0)((75.78/100)^0)((24.22/100)^2)=1.1×10^(−6)

the relative molecular mass of the isotopic combination being M=(49.946046)(0)+(51.940510)(2)+(52.940651)(0)+(53.938883)(1)+(15.994915)(0)+(16.999131)(1)+(17.999160)(0)+(34.968853)(0)+(36.965903)(2)=248.751

154. (Cr-52)(Cr-53)(Cr-53)(O-17)(Cl-37)(Cl-37), (aCr-50)=0,(aCr-52)=,(aCr-53)=2,(aCr-54)=0,(aO-16)=0,(aO-17)=, (aO-18)=0,(aCl-35)=0,(aCl-37)=2 with the probability of finding this isotopic combination in a beam of $Cr_3OCl_2$ being p=((3!)(1!)(2!)/((0!)(1!)(2!)(0!)(0!)(1!)(0!)(0!)(2!)))((4.345/100)^0)((83.789/100)^1)((9.501/100)^2)((2.365/100)^0)((99.757/100)^0)((0.038/100)^1)((0.205/100)^0)((75.78/100)^0)((24.22/100)^2)=5.1×10^(−7)

the relative molecular mass of the isotopic combination being M=(49.946046)(0)+(51.940510)(1)+(52.940651)(2)+(53.938883)(0)+(15.994915)(0)+(16.999131)(1)+(17.999160)(0)+(34.968853)(0)+(36.965903)(2)=248.753

155. (Cr-52)(Cr-53)(Cr-54)(O-17)(Cl-37)(Cl-37), (aCr-50)=0,(aCr-52)=1,(aCr-53)=1,(aCr-54)=1,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(1!)(1!)(1!)(0!)(1!)(0!)(0!)(2!)))((4.345/100)^0)((83.789/100)^1)((9.501/100)^1)((2.365/100)^1)((99.757/100)^0)((0.038/100)^1)((0.205/100)^0)((75.78/100)^0)((24.22/100)^2)=2.5×10^(−7)

the relative molecular mass of the isotopic combination being M=(49.946046)(0)+(51.940510)(1)+(52.940651)(1)+(53.938883)(1)+(15.994915)(0)+(16.999131)(1) +(17.999160)(0)+(34.968853)(0)+(36.965903)(2)=249.751

156. (Cr-52)(Cr-54)(Cr-54)(O-17)(Cl-37)(Cl-37), (aCr-50)=0,(aCr-52)=,(aCr-53)=0,(aCr-54)=2,(aO-16)=0,(aO-17)=, (aO-18)=0,(aCl-35)=0,(aCl-37)=2 with the probability of finding this isotopic combination in a beam of $Cr_3OCl_2$ being p=((3!)(1!)(2!)/((0!)(1!)(0!)(2!)(0!)(1!)(0!)(0!)(2!)))((4.345/100)^0)((83.789/100)^1)

((9.501/100)^0)((2.365/100)^2)((99.757/100)^0)((0.038/100)^1)((0.205/100)^0)((75.78/100)^0)((24.22/100)^2)=3.1×10^(−8)

the relative molecular mass of the isotopic combination being M=(49.946046)(0)+(51.940510)(1)+(52.940651)(0)+(53.938883)(2)+(15.994915)(0)+(16.999131)(1) + (17.999160)(0)+(34.968853)(0)+(36.965903)(2)=250.749

157. (Cr-53)(Cr-53)(Cr-53)(O-17)(Cl-37)(Cl-37), (aCr-50)=0,(aCr-52)=0,(aCr-53)=3,(aCr-54)=0,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(0!)(3!)(0!)(0!)(1!)(0!)(0!)(2!)))((4.345/100)^0)((83.789/100)^0)((9.501/100)^3)((2.365/100)^0)((99.757/100)^0)((0.038/100)^1)((0.205/100)^0)((75.78/100)^0)((24.22/100)^2)=1.9×10^(−8)

the relative molecular mass of the isotopic combination being M=(49.946046)(0)+(51.940510)(0)+(52.940651)(3)+(53.938883)(0)+(15.994915)(0)+(16.999131)(1) + (17.999160)(0)+(34.968853)(0)+(36.965903)(2)=249.753

158. (Cr-53)(Cr-53)(Cr-54)(O-17)(Cl-37)(Cl-37), (aCr-50)=0,(aCr-52)=0,(aCr-53)=2,(aCr-54)=1,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(0!)(2!)(1!)(0!)(1!)(0!)(0!)(2!)))((4.345/100)^0)((83.789/100)^0)((9.501/100)^2)((2.365/100)^1)((99.757/100)^0)((0.038/100)^1)((0.205/100)^0)((75.78/100)^0)((24.22/100)^2)=1.4×10^(−8)

the relative molecular mass of the isotopic combination being M=(49.946046)(0)+(51.940510)(0)+(52.940651)(2)+(53.938883)(1)+(15.994915)(0)+(16.999131)(1)+(17.999160)(0)+(34.968853)(0)+(36.965903)(2)=250.751

159. (Cr-53)(Cr-54)(Cr-54)(O-17)(Cl-37)(Cl-37), (aCr-50)=0,(aCr-52)=0,(aCr-53)=1,(aCr-54)=2,(aO-16)=0,(aO-117)=1,(aO-18)=0,(aCl-35)=0,(aCl-37)=2 with the probability of finding this isotopic combination in a beam of $Cr_3OCl_2$ being p=((3!)(1!)(2!)/((0!)(0!)(1!)(2!)(0!)(1!)(0!)(0!)(2!)))((4.345/100)^0)((83.789/100)^0)((9.501/100)^1)((2.365/100)^2)((99.757/100)^0)((0.038/100)^1)((0.205/100)^0)((75.78/100)^0)((24.22/100)^2)=3.6×10^(−9)

the relative molecular mass of the isotopic combination being M=(49.946046)(0)+(51.940510)(0)+(52.940651)(1)+(53.938883)(2)+(15.994915)(0)+(16.999131)(1)+(17.999160)(0)+(34.968853)(0)+(36.965903)(2)=251.749

160. (Cr-54)(Cr-54)(Cr-54)(O-17)(Cl-37)(Cl-37), (aCr-50)=0,(aCr-52)=0,(aCr-53)=0,(aCr-54)=3,(aO-16)=0,(aO-17)=1,(aO-18)=0,(aCl-35)=0,(aCl-37)=2 with the probability of finding this isotopic combination in a beam of $Cr_3OCl_2$ being p=((3!)(1!)(2!)/((0!)(0!)(0!)(3!)(0!)(1!)(0!)(0!)(2!)))((4.345/100)^0)((83.789/100)^0)((9.501/100)^0)((2.365/100)^3)((99.757/100)^0)((0.038/100)^1)((0.205/100)^0)((75.78/100)^0)((24.22/100)^2)=2.9×10^(−10)

the relative molecular mass of the isotopic combination being M=(49.946046)(0)+(51.940510)(0)+(52.940651)(0)+(53.938883)(3)+(15.994915)(0)+(16.999131)(1)+(17.999160)(0)+(34.968853)(0)+(36.965903)(2)=252.748

161. (Cr-50)(Cr-50)(Cr-50)(O-18)(Cl-37)(Cl-37), (aCr-50)=3,(aCr-52)=0,(aCr-53)=0,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((3!)(0!)(0!)(0!)(0!)(0!)(1!)(0!)(2!)))((4.345/100)^3)((83.789/100)^0)((9.501/100)^0)((2.365/100)^0)((99.757/100)^0)((0.038/100)^0)((0.205/100)^1)((75.78/100)^0)((24.22/100)^2)=9.86×10^(−9)

the relative molecular mass of the isotopic combination being M=(49.946046)(3)+(51.940510)(0)+(52.940651)(0)+(53.938883)(0)+(15.994915)(0)+(16.999131)(0)+(17.999160)(1)+(34.968853)(0)+(36.965903)(2)=241.769

162. (Cr-50)(Cr-50)(Cr-52)(O-18)(Cl-37)(Cl-37), (aCr-50)=2,(aCr-52)=1,(aCr-53)=0,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((2!)(1!)(0!)(0!)(0!)(0!)(1!)(0!)(2!)))((4.345/100)^2)((83.789/100)^1)((9.501/100)^0)((2.365/100)^0)((99.757/100)^0)((0.038/100)^0)((0.205/100)^1)((75.78/100)^0)((24.22/100)^2)=5.7×10^(−7)

the relative molecular mass of the isotopic combination being M=(49.946046)(2)+(51.940510)(1)+(52.940651)(0)+(53.938883)(0)+(15.994915)(0)+(16.999131)(0)+(17.999160)(1)+(34.968853)(0)+(36.965903)(2)=243.764

163. (Cr-50)(Cr-50)(Cr-53)(O-18)(Cl-37)(Cl-37), (aCr-50)=2,(aCr-52)=0,(aCr-53)=,(aCr-54)=0,(aO-16)=0,(aO-17)= 0,(aO-18)=,(aCl-35)=0,(aCl-37)=2 with the probability of finding this isotopic combination in a beam of $Cr_3OCl_2$ being p=((3!)(1!)(2!)/((2!)(0!)(1!)(0!)(0!)(0!)(1!)(0!)(2!)))((4.345/100)^2)((83.789/100)^0)((9.501/100)^1)((2.365/100)^0)((99.757/100)^0)((0.038/100)^0)((0.205/100)^1)((75.78/100)^0)((24.22/100)^2)=6.47x10^(−8)

the relative molecular mass of the isotopic combination being M=(49.946046)(2)+(51.940510)(0)+(52.940651)(1)+(53.938883)(0)+(15.994915)(0)+(16.999131)(0)+(17.999160)(1)+(34.968853)(0)+(36.965903)(2)=244.764

164. (Cr-50)(Cr-50)(Cr-54)(O-18)(Cl-37)(Cl-37), (aCr-50)=2,(aCr-52)=0,(aCr-53)=0,(aCr-54)=1,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((2!)(0!)(0!)(1!)(0!)(0!)(1!)(0!)(2!)))((4.345/100)^2)((83.789/100)^0)((9.501/100)^0)((2.365/100)^1)((99.757/100)^0)((0.038/100)^0)((0.205/100)^1)((75.78/100)^0)((24.22/100)^2)=1.61×10^(−8)

the relative molecular mass of the isotopic combination being M=(49.946046)(2)+(51.940510)(0)+(52.940651)(0)+(53.938883)(1)+(15.994915)(0)+(16.999131)(0)+(17.999160)(1)+(34.968853)(0)+(36.965903)(2)=245.762

165. (Cr-50)(Cr-52)(Cr-52)(O-18)(Cl-37)(Cl-37), (aCr-50)=1,(aCr-52)=2,(aCr-53)=0,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((1!)(2!)(0!)(0!)(0!)(0!)(1!)(0!)(2!)))((4.345/100)^1)((83.789/100)^2)((9.501/100)^0)((2.365/100)^0)((99.757/100)^0)((0.038/100)^0)((0.205/100)^1)((75.78/100)^0)((24.22/100)^2)=1.10×10^(−5)

the relative molecular mass of the isotopic combination being M=(49.946046)(1)+(51.940510)(2)+(52.940651)(0)+(53.938883)(0)+(15.994915)(0)+(16.999131)(0)+(17.999160)(1)+(34.968853)(0)+(36.965903)(2)=245.758

166. (Cr-50)(Cr-52)(Cr-53)(O-18)(Cl-37)(Cl-37), (aCr-50)=1,(aCr-52)=,(aCr-53)=1,(aCr-54)=0,(aO-16)=0,(aO-17)= 0,(aO-18)=,(aCl-35)=0,(aCl-37)=2 with the probability of finding this isotopic combination in a beam of $Cr_3OCl_2$ being p=((3!)(l!)(2!)/((1!)(1!)(1!)(0!)(0!)(0!)(1!)(0!)(2!)))((4.345/100)^1)((83.789/100)^1)((9.501/100)^1)((2.365/100)^0)((99.757/100)^0)((0.038/100)^0)((0.205/100)^1)((75.78/100)^0)((24.22/100)^2)=2.50×10^(−6)

the relative molecular mass of the isotopic combination being M=(49.946046)(1)+(51.940510)(1)+(52.940651)(1)+(53.938883)(0)+(15.994915)(0)+(16.999131)(0)+(17.999160)(1)+(34.968853)(0)+(36.965903)(2)=246.758

167. (Cr-50)(Cr-52)(Cr-54)(O-18)(Cl-37)(Cl-37), (aCr-50)=1,(aCr-52)=,(aCr-53)=0,(aCr-54)=1,(aO-16)=0,(aO-17)= 0,(aO-18)=1,(aCl-35)=0,(aCl-37)=2 with the probability of finding this isotopic combination in a beam of $Cr_3OCl_2$ being p=((3!)(1!)(2!)/((1!)(1!)(0!)(1!)(0!)(0!)(1!)(0!)(2!)))((4.345/100)^1)((83.789/100)^1)((9.501/100)^0)((2.365/100)^1)((99.757/100)^0)((0.038/100)^0)((0.205/100)^1)((75.78/100)^0)((24.22/100)^2)=6.2×10^(−7)

the relative molecular mass of the isotopic combination being M=(49.946046)(1)+(51.940510)(1)+(52.940651)(0)+(53.938883)(1)+(15.994915)(0)+(16.999131)(0)+(17.999160)(1)+(34.968853)(0)+(36.965903)(2)=247.756

168. (Cr-50)(Cr-53)(Cr-53)(O-18)(Cl-37)(Cl-37), (aCr-50)=1,(aCr-52)=0,(aCr-53)=2,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((1!)(0!)(2!)(0!)(0!)(0!)(1!)(0!)(2!)))((4.345/100)^1)((83.789/100)^0)((9.501/100)^2)((2.365/100)^0)((99.757/100)^0)((0.038/100)^0)((0.205/100)^1)((75.78/100)^0)((24.22/100)^2)=1.41×10^(−7)

the relative molecular mass of the isotopic combination being M=(49.946046)(1)+(51.940510)(0)+(52.940651)(2)+(53.938883)(0)+(15.994915)(0)+(16.999131)(0) +(17.999160)(1)+(34.968853)(0)+(36.965903)(2)=247.758

169. (Cr-50)(Cr-53)(Cr-54)(O-18)(Cl-37)(Cl-37), (aCr-50)=1,(aCr-52)=0,(aCr-53)=1,(aCr-54)=1,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((1!)(0!)(1!)(1!)(0!)(0!)(1!)(0!)(2!)))((4.345/100)^1)((83.789/100)^0)((9.501/100)^1)((2.365/100)^1)((99.757/100)^0)((0.038/100)^0)((0.205/100)^1)((75.78/100)^0)((24.22/100)^2)=7.04×10^(−8)

the relative molecular mass of the isotopic combination being M=(49.946046)(1)+(51.940510)(0)+(52.940651)(1)+(53.938883)(1)+(15.994915)(0)+(16.999131)(0)+(17.999160)(1)+(34.968853)(0)+(36.965903)(2)=248.757

170. (Cr-50)(Cr-54)(Cr-54)(O-18)(Cl-37)(Cl-37), (aCr-50)=1,(aCr-52)=0,(aCr-53)=0,(aCr-54)=2,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((1!)(0!)(0!)(2!)(0!)(0!)(1!)(0!)(2!)))((4.345/100)^1)((83.789/100)^0)((9.501/100)^0)((2.365/100)^2)((99.757/100)^0)((0.038/100)^0)((0.205/100)^1)((75.78/100)^0)((24.22/100)^2)=8.77×10^(−9)

the relative molecular mass of the isotopic combination being M=(49.946046)(1)+(51.940510)(0)+(52.940651)(0)+(53.938883)(2)+(15.994915)(0)+(16.999131)(0)+(17.999160)(1)+(34.968853)(0)+(36.965903)(2)=249.755

171. (Cr-52)(Cr-52)(Cr-52)(O-18)(Cl-37)(Cl-37), (aCr-50)=0,(aCr-52)=3,(aCr-53)=0,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(3!)(0!)(0!)(0!)(0!)(1!)(0!)(2!)))((4.345/100)^0)((83.789/100)^3)((9.501/100)^0)((2.365/100)^0)((99.757/100)^0)((0.038/100)^0)((0.205/100)^1)((75.78/100)^0)((24.22/100)^2)=7.07×10^(−5)

the relative molecular mass of the isotopic combination being M=(49.946046)(0)+(51.940510)(3)+(52.940651)(0)+(53.938883)(0)+(15.994915)(0)+(16.999131)(0)+(17.999160)(1)+(34.968853)(0)+(36.965903)(2)=247.752

172. (Cr-52)(Cr-52)(Cr-53)(O-18)(Cl-37)(Cl-37), (aCr-50)=0,(aCr-52)=2,(aCr-53)=1,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(2!)(1!)(0!)(0!)(0!)(1!)(0!)(2!)))((4.345/100)^0)((83.789/100)^2)((9.501/100)^1)((2.365/100)^0)((99.757/100)^0)((0.038/100)^0)((0.205/100)^1)((75.78/100)^0)((24.22/100)^2)=2.41×10^(−5)

the relative molecular mass of the isotopic combination being M=(49.946046)(0)+(51.940510)(2)+(52.940651)(1)+(53.938883)(0)+(15.994915)(0)+(16.999131)(0)+(17.999160)(1)+(34.968853)(0)+(36.965903)(2)=248.753

173. (Cr-52)(Cr-52)(Cr-54)(O-18)(Cl-37)(Cl-37), (aCr-50)=0,(aCr-52)=2,(aCr-53)=0,(aCr-54)=1,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(2!)(0!)(1!)(0!)(0!)(1!)(0!)(2!)))((4.345/100)^0)((83.789/100)^2)((9.501/100)^0)((2.365/100)^1)((99.757/100)^0)((0.038/100)^0)((0.205/100)^1)((75.78/100)^0)((24.22/100)^2)=5.99×10^(−6)

the relative molecular mass of the isotopic combination being M=(49.946046)(0)+(51.940510)(2)+(52.940651)(0)+(53.938883)(1)+(15.994915)(0)+(16.999131)(0)+(17.999160)(1)+(34.968853)(0)+(36.965903)(2)=249.751

174. (Cr-52)(Cr-53)(Cr-53)(O-18)(Cl-37)(Cl-37), (aCr-50)=0,(aCr-52)=,(aCr-53)=2,(aCr-54)=0,(aO-16)=0,(aO-17)= 0,(aO-18)=1,(aCl-35)=0,(aCl-37)=2 with the probability of finding this isotopic combination in a beam of $Cr_3OCl_2$ being p=((3!)(1!)(2!)/((0!)(1!)(2!)(0!)(0!)(0!)(1!)(0!)(2!)))((4.345/100)^0)((83.789/100)^1)((9.501/100)^2)((2.365/100)^0)((99.757/100)^0)((0.038/100)^0)((0.205/100)^1)((75.78/100)^0)((24.22/100)^2)=2.73×10^(−6)

the relative molecular mass of the isotopic combination being M=(49.946046)(0)+(51.940510)(1)+(52.940651)(2)+(53.938883)(0)+(15.994915)(0)+(16.999131)(0)+(17.999160)(1)+(34.968853)(0)+(36.965903)(2)=249.753

175. (Cr-52)(Cr-53)(Cr-54)(O-18)(Cl-37)(Cl-37), (aCr-50)=0,(aCr-52)=1,(aCr-53)=1,(aCr-54)=1,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(1!)(1!)(1!)(0!)(0!)(1!)(0!)(2!)))((4.345/100)^0)((83.789/100)^1)

((9.501/100)^1)((2.365/100)^1)((99.757/100)^0)((0.038/100)^0)((0.205/100)^1)((75.78/100)^0)((24.22/100)^2)=1.36×10^(−6)

the relative molecular mass of the isotopic combination being M=(49.946046)(0)+(51.940510)(1)+(52.940651)(1)+(53.938883)(1)+(15.994915)(0)+(16.999131)(0)+(17.999160)(1)+(34.968853)(0)+(36.965903)(2)=250.751

176. (Cr-52)(Cr-54)(Cr-54)(O-18)(Cl-37)(Cl-37), (aCr-50)=0,(aCr-52)=1,(aCr-53)=0,(aCr-54)=2,(aO-1 6)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(1!)(0!)(2!)(0!)(0!)(1!)(0!)(2!)))((4.345/100)^0)((83.789/100)^1)((9.501/100)^0)((2.365/100)^2)((99.757/100)^0)((0.038/100)^0)((0.205/100)^1)((75.78/100)^0)((24.22/100)^2)=1.69×10^(−7)

the relative molecular mass of the isotopic combination being M=(49.946046)(0)+(51.940510)(1)+(52.940651)(0)+(53.938883)(2)+(15.994915)(0)+(16.999131)(0)+(17.999160)(1)+(34.968853)(0)+(36.965903)(2)=251.749

177. (Cr-53)(Cr-53)(Cr-53)(O-18)(Cl-37)(Cl-37), (aCr-50)=0,(aCr-52)=0,(aCr-53)=3,(aCr-54)=0,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(0!)(3!)(0!)(0!)(0!)(1!)(0!)(2!)))((4.345/100)^0)((83.789/100)^0)((9.501/100)^3)((2.365/100)^0)((99.757/100)^0)((0.038/100)^0)((0.205/100)^1)((75.78/100)^0)((24.22/100)^2)=1.03×10^(−7)

the relative molecular mass of the isotopic combination being M=(49.946046)(0)+(51.940510)(0)+(52.940651)(3)+(53.938883)(0)+(15.994915)(0)+(16.999131)(0) + (17.999160)(1)+(34.968853)(0)+(36.965903)(2)=250.753

178. (Cr-53)(Cr-53)(Cr-54)(O-18)(Cl-37)(Cl-37), (aCr-50)=0,(aCr-52)=0,(aCr-53)=2,(aCr-54)=1,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(0!)(2!)(1!)(0!)(0!)(1!)(0!)(2!)))((4.345/100)^0)((83.789/100)^0)((9.501/100)^2)((2.365/100)^1)((99.757/100)^0)((0.038/100)^0)((0.205/100)^1)((75.78/100)^0)((24.22/100)^2)=7.70×10)^(−8)

the relative molecular mass of the isotopic combination being M=(49.946046)(0)+(51.940510)(0)+(52.940651)(2)+(53.938883)(1)+(15.994915)(0)+(16.999131)(0)+(17.999160)(1)+(34.968853)(0)+(36.965903)(2)=251.751

179. (Cr-53)(Cr-54)(Cr-54)(O-18)(Cl-37)(Cl-37), (aCr-50)=0,(aCr-52)=0,(aCr-53)=1,(aCr-54)=2,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(0!)(1!)(2!)(0!)(0!)(1!)(0!)(2!)))((4.345/100)^0)((83.789/100)^0)((9.501/100)^1)((2.365/100)^2)((99.757/100)^0)((0.038/100)^0)((0.205/100)^1)((75.78/100)^0)((24.22/100)^2)=1.92×10)^(−8)

the relative molecular mass of the isotopic combination being M=(49.946046)(0)+(51.940510)(0)+(52.940651)(1)+(53.938883)(2)+(15.994915)(0)+(16.999131)(0) + (17.999160)(1)+(34.968853)(0)+(36.965903)(2)=252.749

180. (Cr-54)(Cr-54)(Cr-54)(O-18)(Cl-37)(Cl-37), (aCr-50)=0,(aCr-52)=0,(aCr-53)=0,(aCr-54)=3,(aO-16)=0,(aO-17)=0,(aO-18)=1,(aCl-35)=0,(aCl-37)=2 with the probability of finding this isotopic combination in a beam of $Cr_3OCl_2$ being p=((3!)(1!)(2!)/((0!)(0!)(0!)(3!)(0!)(0!)(1!)(0!)(2!)))((4.345/100)^0)((83.789/100)^0)((9.501/100)^0)((2.365/100)^3)((99.757/100)^0)((0.038/100)^0)((0.205/100)^1)((75.78/100)^0)((24.22/100)^2)=1.59×10^(−9)

the relative molecular mass of the isotopic combination being M=(49.946046)(0)+(51.940510)(0)+(52.940651)(0)+(53.938883)(3)+(15.994915)(0)+(16.999131)(0) + (17.999160)(1)+(34.968853)(0)+(36.965903)(2)=253.748.

Example 9

In one embodiment of the present invention a system for managing electronic data relating to chemical compounds for the determination of identity of subject chemical compounds comprising: a mass spectrometer adapted to the subject accepts chemical compound and outputs experimental data; a computer having at least a processor unit, a storage device, a user input interface, an output device, a set of instructions for configuring the computer, and an input/output port coupled to the mass spectrometer through the input/output port; wherein, the storage device is configured to accept and store a plurality of natural abundance data relating to one or more chemical compounds, referred to as theoretical data; the user input interface is adapted for selecting the subject chemical compound; the instruction is being adapted to configure the processor to calculate an occurrence probability for each of a plurality of isotope species relating to said subject chemical compound by utilizing said theoretical data from the storage device, and the instruction is being adapted to configure the processor to assign a probability threshold, and the computer is being adapted to generate a graphical display of said isotope species exceeding said probability threshold; and the computer is being adapted to compare the theoretical data forming the basis of said graphical display to the experimental data taken from a mass spectrometer to determine the identity of the subject chemical compound.

In another embodiment of the present invention, a method of managing electronic data relating to chemical compounds comprising for determining the identity of a subject chemical the steps of: storing a plurality of natural abundance data upon a storage device, said abundance data relating to one or more chemical compounds; selecting the subject chemical compound; utilizing said natural abundance data, calculating an occurrence probability for each of a plurality of isotope species relating to the subject chemical compound; assigning a probability threshold; generating a graphical display of said isotope species exceeding said probability threshold; and comparing said graphical display to experimental data taken from a mass spectrometer to determine the identity of the subject chemical compound.

Accordingly, the invention described herein is capable of efficiently calculating isotopic distribution in order to simulate mass spectra data for any known chemical compound and reduces the errors in computation to zero. The simulated spectra considers the various isotopes of the compound based upon a probability calculation that takes into consideration the natural abundance of each isotope of individual elements of the compound. The probability calculation generates a relative probability associated with each isotope species of the subject compound. The simulated spectra are displayed on an x-y coordinate illustrating the calculated formula weight on the abscissa (x-axis) and the intensity of the specific species on the ordinate (y-axis).

In one embodiment, this theoretical data display is compared to experimental mass spectra data provided by a mass spectrometer in order to determine the experimental compound at issue.

Example 10

In the preferred embodiment, a means for signal processing is programmed to obtain the desired information in Mathematica by methods known to those of skill in the art. Mathematica is a software package distributed by Wolfram Research, Inc. (Champaign, Ill.). The Mathematica software programming language was used for prototype expediency, but those of skill in the art will appreciate that other methods may be used (for example, by hardware means such as preprogrammed ASICS or by embedding the software in microcontrollers).

The instructions below enable the Mathmatica software to simulate mass spectra for species with molecular masses of about 1000. Probability for an isotope means natural abundance/100 throughout this program; mais stands for the most abundant isotope species, i.e. the species containing only the most abundant isotopes for each element within the assignment (the so called M species). The following is the list of elements used in writing the program followed each by the atomic number H 1, He 2, Li 3, Be 4, B 5, C 6, N 7, O 8, F 9, Ne 10, Na 11, Mg 12, Al 13, Si 14, P 15, S 16, Cl 17, Ar 18, K 19, Ca 20, Sc 21, Ti 22, V 23, Cr 24, Mn 25, Fe 26, Co 27, Ni 28, Cu 29, Zn 30, Ga 31, Ge 32, As 33, Se 34, Br 35, Kr 36, Rb 37, Sr 38, Y 39, Zr 40, Nb 41, Mo 42, Ru 44, Rh 45, Pd 46, Ag 47, Cd 48, In 49, Sn 50, Sb 51, Te 52, 153, Xe 54, Cs 55, Ba 56, La 57, Ce 58, Pr 59, Nd 60, Sm 62, Eu 63, Gd 64, Tb 65, Dy 66, Ho 67, Er 68, Tm 69, Yb 70, Lu 71, Hf 72, Ta 73, W 74, Re 75, Os 76, Ir 77, Pt 78, Au 79, Hg 80, Ti 81, Pb 82, Bi 83, Th 90, U 92. The program for the simulation of mass spectra has as input data from Lange's Handbook of Chemistry, J. A. Dean (ed.), 13th edition, McGraw-Hill Book Company, 1985, p. 3–16. If the number of species after the first pruning is >105 the computing time may exceed ½ hour.

Additionally, an experimental spectrum can be exported from a mass spectrometer to the computer of the invention and input as a list of values/numbers {mass/charge 1, intensity 1, mass/charge 2, intensity 2, . . . , mass/charge i, intensity i, . . . }. The value for the intensity of the assignment needs to be input. The value for the probability threshold ptr dictates how many species to be included in the computations, for example, only those with the probability over the chosen threshold will be considered. The value $10^{-4}=0.0001$ may be excellent in many cases.

If the synthesis of an analyzed chemical sample contains elements with isotopic composition different from that found in nature, it is possible to input new probabilities for those elements. The instructions enable the Mathmatica software program to plot the experimental data versus simulated data wherein the tables contain simulated data. The first table contains the species in decreasing order of their probability. The second table contains the same species with the absolute probability p, scaled probability ps and residual probability pres (1-sum of probabilities seen in table).

If other than known tabulated values for the probabilities for the elements that were used in the preparation of the chemical sample they can be input. Additionally, if other data is required for displaying the simulation results properly, these values can also be input. Finally the computation can be performed with all input data in place by selecting the calculator function.

An example of a modified Mathematica notebook file containing instructions that enable the Mathematica software to determine simulated mass spectra data is shown below (button techniques are in use to make the software user friendly—the following instructions when in use with Mathematica will have the appearance of a web browser window and instructions will be displayed whenever the user tries to click on buttons, throughout the calculation procedures.

EXAMPLE 11

Figure 4:
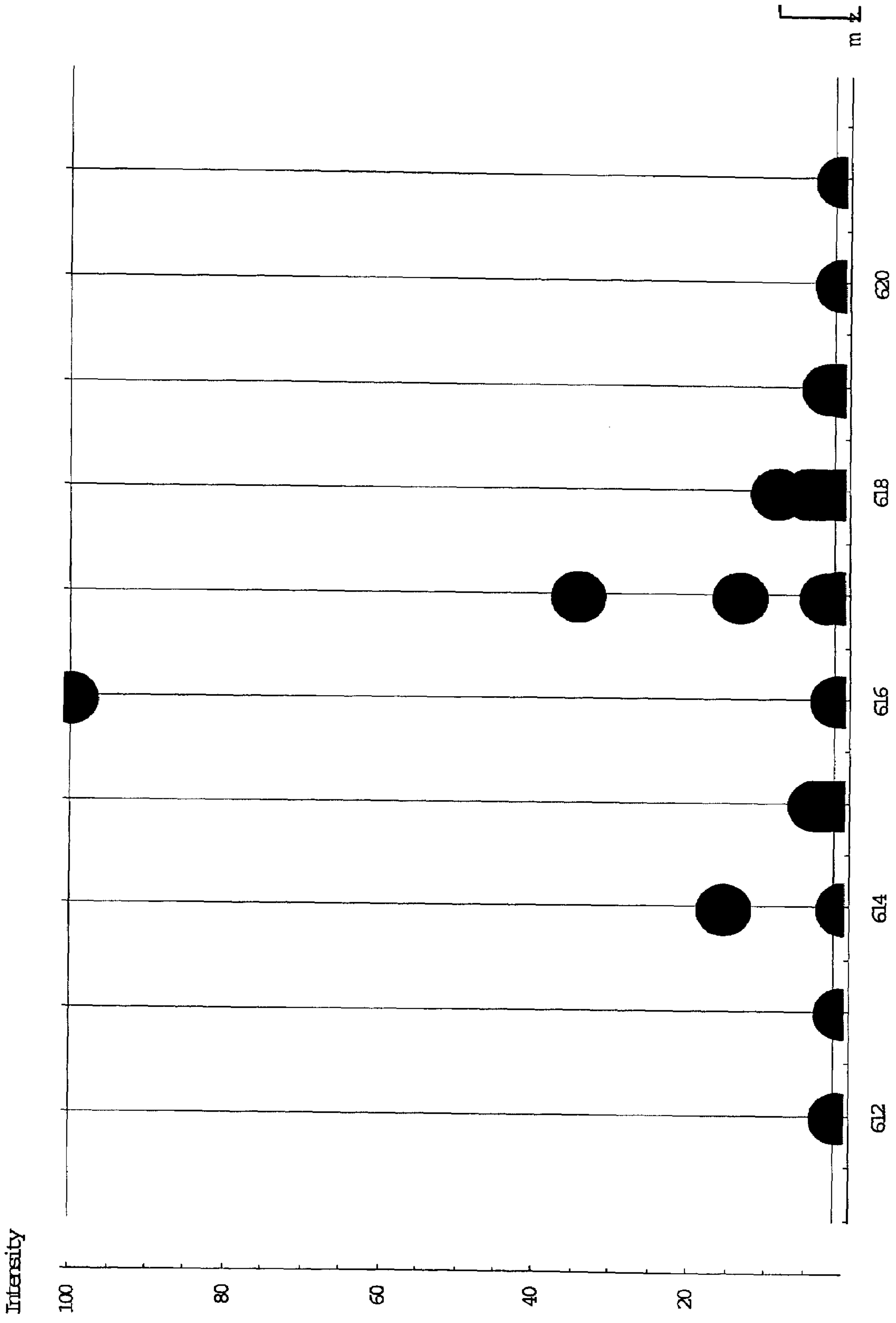
FIG. 4 shows a simulated a mass spectrum for the composition ($H_{24}C_{12}N_6O_{13}Cr_3$) that was generated from the modified Mathmatica notebook file explained in Example 10.

The instructions from the modified Mathematica notebook file explained in Example 10 above enabled the Mathematica software to simulate a mass spectrum, FIG. 4, for the composition ($H_{24}Cl_2N_6O_{13}Cr_3$). The total number of isotopic combinations for the assignment was 4,777,500. The number of species that resulted after the first pruning step was 2,040. The molecular mass for mais was 615.961678. The absolute probability for mais was 0.48566. The value for the probability threshold (ptr) was chosen to be 0.0001. FIG. 5A shows the composition of the isotopic combinations after the final pruning. FIG. 5B shows the numerical values for mass/charge and probabilities for the species listed with 4 decimal digits being used for the absolute probabilities and 2 decimal digits being used for the scaled probability. FIG. 5C shows the numerical values for mass/charge and probabilities for the species listed with more significant figures being used for the absolute probabilities and scaled probability than reported in FIG. 5B.

Although the invention has been described with reference to using specific chemical compounds as the theoretical data, this description is not meant to be construed in a limited sense. Alternative chemical compounds and various modifications of the disclosed embodiments will be apparent to persons skilled in the art upon the reference to the description of the invention. It is, therefore, contemplated that the claims will cover such alternatives variations and modifications that fall within the scope of the invention.

REFERENCES CITED

The following references, to the extent that they provide exemplary procedural or other details supplementary to those set forth herein, are specifically incorporated herein by reference.

U.S. Patent Documents:

U.S. Pat. No. 2,769,910

U.S. Pat. No. 2,818,507

U.S. Pat. No. 2,939,952

U.S. Pat. No. 2,950,389

U.S. Pat. No. 3,334,225; and

U.S. Pat. No. 5,089,702.

OTHER REFERENCES

Lange's Handbook Of Chemistry; Dean, J. A. Ed.; McGraw-Hill, 1985.

Wentzel, E.; Ovcharov, L.; *Applied Problems In Probability Theory*; Mir: Moscow, 1986; pp 30–31.

Reid, C. E.; *Chemical Thermodynamics*; McGraw-Hill; 1990; p 278.

Davis, C. M.; Royer, A. C.; Vincent, J. B.; *Inorg. Chem.* 1997, 36, 5316–5320.

Pavia, D. L.; Lampman, G. M.; Kriz, G. S.; *Introduction To Spectroscopy—A Guide For Students Of Organic Chemistry*; Saunders College Publishing, 1996; Chapter 7.4.
Platzner, I. T.; Habfart, K.; Walder, A. J.; Goetz, A.; *Modern Isotope Ratio Mass Spectrometry; Wiley,* 1997; p 450.
Davis, R.; Frearson, M.; *Mass Spectrometry*; Wiley, 1987; p 155.
Mullica, D. F.; Pennington, D. E.; Bradshaw, J. E.; Sappenfield, E. L.; *Inorg. Chim. Acta* 1992, 191, 3–6.
Genty, C.; *Anal. Chem.* 1973, 45,505–511.
Brownawell, M. L.; San Filippo, J.; *J. Chem. Educ.* 1982, 59, 663–665.
Rockwood, A. L.; Van Orden, S. L.; Smith, R. D.; *Anal. Chem.* 1995, 67, 2699–2704.
Rockwood, A. L.; Van Orden, S. L.; *Anal. Chem.* 1996, 68, 2027–2030.
Frevel, L. K.; Lee, W.-L.; Tecklenburg, R. E.; *J. Am. Soc. Mass Spectrom.* 1999, 10, 231–240.
Florin Neacsu; *Investigations Of Di—And Trinuclear Amino Acid Complexes Of Chromium* (*III*), Ph. D. Thesis, Baylor University, Waco, Tex., U.S.A., 2000.

What is claimed is:

1. A method of obtaining analytical mass spectrum data that is free from computational errors for a chemical compound comprising:

(a) selecting an isotope abundance value for each elemental isotope of a molecular formula representing the chemical compound; wherein the molecular formula comprises one or more elemental atoms and each elemental atom having at least one elemental isotope forming an elemental isotope combination;

(b) calculating a relative occurrence probability for each elemental isotope combination of the molecular formula, wherein the relative occurrence probability comprises formula (I):

$$p = \frac{\prod_{i}^{n}(ai!)}{\prod_{i}^{n}\prod_{j}^{nAi}(aij!)}\prod_{i}^{n}\prod_{j}^{nAi}\left(\frac{p_{Aij}}{100}\right)^{aij} \qquad \text{(I)}$$

wherein p represents the relative occurrence probability; ai represents a number of elemental atoms in the molecular formula and $ai=n^{Ai}$; aij represents a number of elemental isotopes in the molecular formula; and $p_{Aij}$ represents the isotope abundance value expressed as a percentage for the elemental isotope;

(c) determining a relative molecular mass for the elemental isotope combination; wherein the relative molecular mass comprises the arithmetic sum of atomic masses for each elemental isotope present in the elemental isotope combination; and (d) recording onto a retrievable media source: (i) the relative occurrence probability for each elemental isotope combination; and (ii) the relative molecular mass corresponding to each elemental isotope combination, wherein the relative occurrence probability and the relative molecular mass together comprises the analytical mass spectrum data that is free from computational errors for the chemical compound.

2. The method of claim 1, further comprising: plotting onto a X-Y coordinate system the relative molecular mass corresponding to each elemental isotope combination as a x-coordinate of the X-Y coordinate system and plotting the relative occurrence probability for each elemental isotope combination as a y-coordinate of the X-Y coordinate system, a resultant plot forming a simulated mass spectra for the chemical compound that is free from computational errors.

3. The method of claim 1, further comprising: preparing a columnar table having at least a first column containing the relative molecular mass corresponding to each elemental isotope combination and a second column containing the occurrence probability for each elemental isotope combination, wherein the first column and second column are correspondingly linked for each elemental isotope combination.

4. The method of claim 1, further comprising:

(e) obtaining experimental mass spectrum data of an unknown compound, wherein the experimental mass spectrum data comprises at least a mass/charge ratio and a relative abundance value;

(f) retrieving the analytical mass spectrum data from the retrievable media source;

(g) comparing the mass/charge ratio vs. the relative abundance value to a superimposed value of the relative molecular mass vs. the relative occurrence probability;

(h) determining whether the superimposed value comprises a potential match, wherein the superimposed value comprises a potential match if the relative molecular mass is less than or equal to the mass/charge ratio, and the superimposed value is not matched if the relative molecular mass is greater than the mass/charge ratio, and wherein the determination of whether the superimposed value comprises a potential match is useful for determining the unknown compound's chemical structure; and (i) recording onto a retrievable media source information related to said determination.

5. The method of claim 1, further comprising assigning a probability threshold, wherein a sum probability of the isotopes having a value below the assigned probability threshold is referred to as a residual probability and the residual probability can be selected or discarded.

6. The method of claim 1, wherein the chemical composition has a molecular weight up to about 1,000 AMU.

7. The method of claim 1, wherein analytical mass spectrum data that is free from computational errors for a chemical compound was determined using a software program.

8. A machine for identifying an unknown compound from experimental mass spectrum data, the machine comprising:

(a) a memory which is able to store a series of analytical mass spectrum data that is free from computational errors at a first memory address, wherein the analytical mass spectrum data comprises at least a relative molecular mass value and a relative occurrence probability value;

(b) a mass spectrum data input means that enables a series of experimental mass spectrum data for the unknown compound to be stored at a second memory address, wherein the experimental mass spectrum data comprises at least a mass/charge ratio and a relative abundance value;

(c) a data calculation means that enables a mathematical comparison of the series of analytical mass spectrum data stored in the first memory address to the series of experimental mass spectrum data stored in the second memory address, wherein a result from the mathematical comparison is stored at a third memory address;

(d) a display that is operatively connected to said memory for displaying any information stored in any addresses of the memory; and (e) a data input means that an operator can use to manipulate any series of data stored in any addresses of the memory, wherein the memory, the mass spectrum data input means, the data calculation means, the display and the data input means are collectively part of a computer, the computer having a microprocessor unit, a storage device, a keyboard, a monitor, a set of instructions for configuring the computer, a software program which is able to perform relative occurrence probability calculations, and parallel, USB or serial ports for input/output functions, and wherein the software program is able to obtain analytical mass spectrum data that is free from computational errors for a chemical compound, wherein the software program will:

(i) select an isotope abundance value for each elemental isotope of a molecular formula representing the chemical compound; wherein the molecular formula comprises one or more elemental atoms and each elemental atom having at least one elemental isotope forming an elemental isotope combination;

(ii) calculate a relative occurrence probability for each elemental isotope combination of the molecular formula, wherein the relative occurrence probability comprises formula (I):

$$p = \frac{\prod_{i}^{n}(ai!)}{\prod_{i}^{n}\prod_{j}^{n^{Ai}}(aij!)}\prod_{i}^{n}\prod_{j}^{n^{Ai}}\left(\frac{p_{Aij}}{100}\right)^{aij} \quad \text{(I)}$$

wherein p represents the relative occurrence probability; ai represents a number of elemental atoms in the molecular formula and $ai=n^{Ai}$; aij represents a number of elemental isotopes in the molecular formula; and $p_{Aij}$ represents the isotope abundance value expressed as a percentage for the elemental isotope;

(iii) determine a relative molecular mass for the elemental isotope combination; wherein the relative molecular mass comprises the arithmetic sum of atomic masses for each elemental isotope present in the elemental isotope combination; and (iv) store in the memory: (A) the relative occurrence probability for each elemental isotope combination; and (B) the relative molecular mass corresponding to each elemental isotope combination, wherein the relative occurrence probability and the relative molecular mass together comprises the analytical mass spectrum data that is free from computational errors for the chemical compound.

9. The machine of claim 8, wherein the chemical composition has a molecular weight up to about 1,000 AMU (Atomic Mass Units).

10. The machine of claim 9, wherein the software program is able to:

(i) retrieve the analytical mass spectrum data from the first memory address;

(ii) retrieve the experimental mass spectrum data from the second memory address, wherein the experimental mass spectrum data comprises at least a mass/charge ratio and a relative abundance value;

(iii) compare a plot of the mass/charge ratio vs. the relative abundance value to a superimposed plot of the relative molecular mass vs. the relative occurrence probability, wherein the superimposed plot comprises a potential match if the relative molecular mass is less than or equal to the mass/charge ratio, and the superimposed plot is not matched if the relative molecular mass is greater than the mass/charge ratio; and (iv) send a graphic representation of the superimposed plot of the potential match to the display.

11. The machine of claim 8, wherein the software program is able to plot onto a X-Y coordinate system the relative molecular mass corresponding to each elemental isotope combination as a x-coordinate of the X-Y coordinate system and plot the relative occurrence probability for each elemental isotope combination as a y-coordinate of the X-Y coordinate system, a resultant plot forming a simulated mass spectra for the chemical compound that is free from computational errors.

12. The machine of claim 8, wherein the software program is able to prepare a columnar table having at least a first column containing the relative molecular mass corresponding to each elemental isotope combination and a second column containing the occurrence probability for each elemental isotope combination, wherein the first column and second column are correspondingly linked to each elemental isotope combination.

* * * * *